US006887286B1

(12) United States Patent
Taki et al.

(10) Patent No.: US 6,887,286 B1
(45) Date of Patent: May 3, 2005

(54) FUEL REFORMER DEVICE

(75) Inventors: Masayoshi Taki, Konan (JP); Seiji Mizuno, Toyota (JP); Toshiaki Ozaki, Toyota (JP); Tatsuya Kawahara, Toyota (JP); Katsuhiko Kinoshita, Nissin (JP); Yoshimasa Negishi, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/720,568

(22) PCT Filed: Jul. 2, 1999

(86) PCT No.: PCT/JP99/03603

§ 371 (c)(1),
(2), (4) Date: Jan. 26, 2001

(87) PCT Pub. No.: WO00/02812

PCT Pub. Date: Jan. 20, 2000

(30) Foreign Application Priority Data

Jul. 8, 1998 (JP) .......................................... 10-210354

(51) Int. Cl.$^7$ ................................................. B01J 8/00
(52) U.S. Cl. ................................................... 48/197 R
(58) Field of Search ........................... 48/127.9, 197 R, 48/198.6, 198.7, 214 R, 215, 214 A; 429/12, 34, 40

(56) References Cited

U.S. PATENT DOCUMENTS

| 4,581,157 A | 4/1986 | Twigg |
| 4,620,940 A | 11/1986 | Quang et al. |
| 5,368,835 A | 11/1994 | Choudhary et al. |
| 6,165,633 A | 12/2000 | Negishi |
| 6,641,625 B1 * | 11/2003 | Clawson et al. ............. 48/127.9 |

FOREIGN PATENT DOCUMENTS

| EP | 0 112 613 | 7/1984 |
| EP | 0 217 532 | 4/1987 |
| GB | 1 570 223 | 6/1980 |
| GB | 2 199 841 A | 7/1988 |
| JP | A 1-186570 | 7/1989 |
| JP | A 2-160603 | 6/1990 |
| JP | A 4-160003 | 6/1992 |
| JP | A 9-315801 | 12/1997 |
| KR | 1998-024908 | 7/1998 |

OTHER PUBLICATIONS

Taki, Masayoshi et al., "High Efficient and Compact Methanol Reformer for Fuel Cells," Toyota Technical Review, vol. 47, No. 2, (1997), pp. 76–81 w/Abstract.
Recupero, Vincenzo et al., "Hydrogen generator, via catalytic partial oxidation of methane for fuel cells," Journal of Power Sources, vol. 71, (1998), pp. 208–214.

* cited by examiner

Primary Examiner—Samuel M. Heinrich
(74) Attorney, Agent, or Firm—Oliff & Berridge, PLC

(57) ABSTRACT

The present invention is directed to a fuel reformer device that produces a hydrogen rich gas from a hydrocarbon and steam. The steam reforming reaction that produces the hydrogen rich gas from the hydrocarbon and steam is endothermic. A known technique supplies heat required for the steam reforming reaction by an exothermic oxidation reaction proceeding in parallel with the steam reforming reaction. This known technique may, however, cause an excessive temperature rise in an area of the vigorous oxidation reaction in the fuel reformer device.

A reformer unit 34 including a Cu—Zn catalyst receives a supply of a crude fuel gas containing the air flown through a second fuel supply conduit 64. The crude fuel gas is subjected to the steam reforming reaction and the oxidation reaction proceeding inside the reformer unit 34. A resulting hydrogen rich gaseous fuel is discharged to a third fuel supply conduit 65. The reformer unit 34 includes an upper stream reaction unit 80 and a lower stream reaction unit 81. Both the reaction units 80 and 81 have honeycomb structures, wherein the total sectional area of the flow path in the upper stream reaction unit 80 is made smaller than the total sectional area of the flow path in the lower stream reaction unit 81. This arrangement causes the gas flowing through the reformer unit 34 to have the higher flow velocity on the upstream side than on the downstream side. The higher flow velocity on the upstream side extends the area of the vigorous oxidation reaction to the lower stream portion and enables the heat generated on the upstream side to be effectively transmitted to the lower stream portion. This arrangement thus effectively prevents an excessive temperature rise on the upstream side.

18 Claims, 23 Drawing Sheets

UPPER UNIT
(SMALLER CROSS SECTIONS OF CELLS)

WALL THICKNESS OF
CERAMIC HONEYCOMB 0.4 mm

UPPER UNIT
(SMALLER NUMBER OF CELLS)

WALL THICKNESS OF
CERAMIC HONEYCOMB 0.7 mm

LOWER UNIT

WALL THICKNESS OF
CERAMIC HONEYCOMB 0.1 mm

FUEL REFORMER DEVICE

TECHNICAL FIELD

The present invention relates to a fuel reformer device, and more specifically a fuel reformer device that produces a hydrogen rich gas from a hydrocarbon and steam.

BACKGROUND ART

The fuel reformer device that produces the hydrogen rich gas from a hydrocarbon and steam is a known device used to supply a gaseous fuel to fuel cells. The fuel cells convert the chemical energy of a fuel into electrical energy not via mechanical energy or thermal energy but directly, and thus attain a high energy efficiency. In the fuel cells, a gaseous fuel containing hydrogen is supplied to anodes thereof, whereas an oxidizing gas containing oxygen is supplied to cathodes thereof. The fuel cells generate an electromotive force through electrochemical reactions proceeding at both the electrodes. The following equations define the electrochemical reactions proceeding in the fuel cells. Equation (1) represents a reaction proceeding at the anodes, and Equation (2) represents a reaction proceeding at the cathodes. The reaction expressed by Equation (3) accordingly proceeds in the fuel cells as a whole.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

An oxidizing gas and a gaseous fuel containing carbon dioxide are usable in polymer electrolyte fuel cells, phosphate fuel cells, and molten carbonate electrolyte fuel cells among a diversity of fuel cells, because of the properties of their electrolytes. In such fuel cells, the air is generally used for the oxidizing gas, and a hydrogen rich gas produced by steam reforming a hydrocarbon like methanol or natural gas is used for the gaseous fuel. A fuel-cells system using such fuel cells has the fuel reformer device, in which the steam reforming reaction proceeds to produce the gaseous fuel. The following describes the reforming reaction proceeding inside the fuel reformer device. The description regards a case using methanol as the hydrocarbon subjected to the reforming reaction. The following equation represents a reaction of steam reforming methanol:

$$CH_3OH + H_2O \rightarrow CO_2 + 3H_2 - 49.5 \text{ (kJ/mol)} \quad (4)$$

As shown by this Equation (4), the steam reforming reaction is endothermic. A supply of thermal energy is accordingly required for the progress of the reforming reaction. A known method for supplying thermal energy required for the reforming reaction externally applies heat by means of a burner or a heater installed in the fuel reformer device. Another known method causes an exothermic oxidation reaction to proceed in addition to the steam reforming reaction in the fuel reformer device and utilizes the heat generated by the oxidation reaction for the progress of the steam reforming reaction. Among these known methods, the method of causing the oxidation reaction to proceed in parallel with the steam reforming reaction in the fuel reformer device is discussed below.

$$CH_3OH + (\tfrac{1}{2})O_2 \rightarrow CO_2 + 2H_2 + 189.5 \text{ (kJ/mol)} \quad (5)$$

Equation (5) represents an example of the oxidation reaction of methanol (partial oxidation reaction). In the structure that introduces a supply of oxygen into the fuel reformer device and causes the oxidation reaction of methanol to proceed in parallel with the steam reforming reaction expressed by Equation (4), the thermal energy generated by the oxidation reaction is utilized for the steam reforming reaction. Regulating the flow rate of oxygen supplied to the fuel reformer device enables the amount of heat required for the steam reforming reaction to balance the amount of heat generated by the oxidation reaction. Theoretically the quantity of heat generated by the oxidation reaction may compensate for the quantity of heat required for the steam reforming reaction. Compared with the external heating method, this method of making the amount of heat generated by the oxidation reaction supply the amount of heat required for the steam reforming reaction has the less energy loss due to heat dissipation and attains the higher energy efficiency. Compared with the external heating method, this method simplifies the structure of the fuel reformer device and enables the size reduction of the whole fuel cells system.

The method of supplying oxygen as well as methanol and steam to the fuel reformer device and utilizing the thermal energy generated by the oxidation reaction for the steam reforming reaction, however, has a drawback, that is, an uneven temperature distribution inside the fuel reformer device. FIG. 38 is a graph showing a temperature distribution inside the fuel reformer device that receives supplies of oxygen as well as methanol and steam and causes the oxidation reaction to proceed in parallel with the steam reforming reaction. When a supply of oxygen is introduced together with supplies of methanol and steam into the fuel reformer device, since the oxidation reaction has the higher reaction rate than the steam reforming reaction, the amount of heat generated by the oxidation reaction exceeds the amount of heat required for the steam reforming reaction on the upper stream side in the fuel reformer unit (that is, the side receiving a supply of the gas containing methanol, steam, and oxygen). As shown in the graph of FIG. 38, the internal temperature abruptly rises on the upper stream side to form a peak in the temperature distribution. After the consumption of oxygen by the oxidation reaction, only the steam reforming reaction proceeds. The internal temperature of the fuel reformer device thus continuously decreases towards the lower stream side (that is, the side outputting the hydrogen rich gas) after the peak in the temperature distribution.

Formation of the peak in the temperature distribution or the excessive temperature rise inside the fuel reformer device results in some drawbacks, for example, deterioration of the catalyst and formation of by-products. One problem is deterioration of the catalyst. It is here assumed that a Cu—Zn catalyst is used for the catalyst of accelerating the steam reforming reaction and the oxidation reaction of methanol. The use of the Cu—Zn catalyst at high temperatures over 300° C. lowers the durability of the catalyst and may cause sintering. Sintering is the phenomenon that the catalyst carried on the surface of the carrier aggregates. The Cu—Zn catalyst is generally formed by dispersing copper fine particles on the surface of zinc particles. The occurrence of sintering causes the copper fine particles to aggregate and form giant particles. This phenomenon decreases the surface area of the copper particles and reduces the area of the catalytic activity, thereby lowering the performance of the fuel reformer device.

Another problem due to the excessive rise of the catalytic temperature is formation of by-products. A side reaction other than the normal reforming reaction discussed above occurs in parallel with the reforming reaction at preset high temperatures to form methane. Gaseous nitrogen included in the supply of the pressurized gas undergoes a side reaction to produce nitrogen oxides. These by-produces are not decomposed in the temperature range of the reforming reaction in the fuel reformer device, but are supplied to the fuel cells as part of the gaseous fuel. An increase in quantity of the by-products like methane unfavorably lowers the hydrogen partial pressure of the gaseous fuel.

The decrease in internal temperature on the lower stream side of the fuel reformer device disadvantageously lowers the activity of the steam reforming reaction. The lowered activity of the steam reforming reaction may cause the non-reformed gas, that is, methanol, to remain and give a resulting gas having an insufficiently low concentration of hydrogen. In order to ensure the completion of the reforming reaction even under the condition of the low internal temperature on the lower stream side, a sufficiently large fuel reformer device is required.

The object of the present invention is thus to solve such drawbacks and to keep the internal temperature of the fuel reformer device within a preset temperature range.

DISCLOSURE OF THE INVENTION

The present invention is directed to a first fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The first fuel reformer device includes: a catalytic section that includes a catalyst for accelerating the steam reforming reaction and the oxidation reaction; a crude fuel gas supply unit that flows a supply of a crude fuel gas containing the hydrocarbon, steam, and oxygen into the catalytic section; a gaseous fuel output unit that causes a hydrogen rich gaseous fuel, which is produced through the steam reforming reaction and the oxidation reaction proceeding in the catalytic section, to be output from the catalytic section; and a gas flow velocity regulation unit that regulates a flow velocity of the crude fuel gas to be higher in an area on a side receiving the supply of the crude fuel gas than in an area on a side outputting the gaseous fuel in the catalytic section, so as to enable the heat generated by the oxidation reaction proceeding in the area on the side receiving the supply of the crude fuel gas to be sufficiently transmitted to the area on the side outputting the gaseous fuel.

In the first fuel reformer device of the present invention thus constructed, the crude fuel gas containing the hydrocarbon, steam, and oxygen is supplied to the catalytic section including the catalyst for accelerating the steam reforming reaction and the oxidation reaction. Both the steam reforming reaction, which is endothermic and produces hydrogen from the hydrocarbon and steam, and the oxidation reaction, which is exothermic and oxidizes the hydrocarbon, proceed in the catalytic section. The heat generated by the oxidation reaction is utilized for the progress of the steam reforming reaction. The resulting hydrogen rich gaseous fuel is output from the catalytic section. In the catalytic section, the flow velocity of the crude fuel gas is regulated to be higher in the area on the side receiving the supply of the crude fuel gas than in the area on the side outputting the gaseous fuel. This enables the heat generated by the oxidation reaction occurring in the area on the side receiving the supply of the crude fuel gas to be sufficiently transmitted to the area on the side outputting the gaseous fuel.

In the fuel reformer device of this configuration, the heat generated by the oxidation reaction occurring in the area on the side receiving the supply of the crude fuel gas is sufficiently transmitted to the lower stream side. This effectively prevents an excessive temperature rise in the area on the side receiving the supply of the crude fuel gas. This arrangement thus prevents the potential problems due to the excessive temperature rise, that is, deterioration of the catalyst and formation of by-products, and significantly improves the durability of the reformer unit. The heat generated by the oxidation reaction is sufficiently transmitted to the area on the side outputting the gaseous fuel. This arrangement ensures the sufficiently high activity of the steam reforming reaction on the lower stream side, thus enabling size reduction of the fuel reformer device.

It is not necessary that the hydrocarbon, steam, and oxygen, which constitute the crude fuel gas, are mixed prior to the supply of the crude fuel gas. At least one component or part of the crude fuel gas may be supplied separately. The above effects are attained as long as the components of the crude fuel gas, which may not be mixed in advance, are all supplied from the upper stream side of the catalytic section on the flow of the gas. The catalyst for accelerating the steam reforming reaction may be identical with or different from the catalyst for accelerating the oxidation reaction. Namely a single catalyst may be used for accelerating both the steam reforming reaction and the oxidation reaction. Different catalysts may alternatively be used for respectively accelerating the steam reforming reaction and the oxidation reaction. In the latter case, it is desirable to sufficiently mix the different catalysts with each other in the reformer unit.

In the first fuel reformer device of the present invention, it is preferable that the gas flow velocity regulation unit makes a total sectional area of a flow path, through which the crude fuel gas flows, smaller on the side receiving the supply of the crude fuel gas than on the side outputting the gaseous fuel in the catalytic section. This arrangement enables the flow velocity of the crude fuel gas to be higher in the area on the side receiving the supply of the crude fuel gas than in the area on the side outputting the gaseous fuel, thereby ensuring the above effects.

The present invention is also directed to a second fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The second fuel reformer device includes: a catalytic section that includes a catalyst for accelerating the steam reforming reaction and the oxidation reaction; a crude fuel gas supply unit that flows a supply of a crude fuel gas containing the hydrocarbon, steam, and oxygen into the catalytic section; and a gaseous fuel output unit that causes a hydrogen rich gaseous fuel, which is produced through the steam reforming reaction and the oxidation reaction proceeding in the catalytic section, to be output from the catalytic section. The catalyst in the catalytic section is carried on a carrier mainly composed of a material having a relatively high thermal conductivity.

In the second fuel reformer device of the present invention thus constructed, the crude fuel gas containing the hydrocarbon, steam, and oxygen is supplied to the catalytic section including the catalyst for accelerating the steam reforming reaction and the oxidation reaction. Both the steam reforming reaction, which is endothermic and produces hydrogen from the hydrocarbon and steam, and the oxidation reaction, which is exothermic and oxidizes the hydrocarbon, proceed in the catalytic section. The resulting hydrogen rich gaseous fuel is output from the catalytic section. The catalyst is carried on a carrier that is mainly composed of a material having a relatively high thermal conductivity. The heat generated by the oxidation reaction is thus quickly transmitted to the periphery by means of the carrier and is utilized for the steam reforming reaction.

In the fuel reformer device of this configuration, the heat generated by the oxidation reaction is quickly diffused. This effectively prevents an excessive temperature rise in the area on the side receiving the supply of the crude fuel gas, that is, the area of the vigorous oxidation reaction. This arrangement thus prevents the potential problems due to the excessive temperature rise, that is, deterioration of the catalyst and formation of by-products, and significantly improves the durability of the reformer unit. The heat generated by the oxidation reaction is diffused and transmitted to the lower stream side. This arrangement ensures the sufficiently high activity of the steam reforming reaction on the lower stream side, thus enabling size reduction of the fuel reformer device.

The present invention is further directed to a third fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The third fuel reformer device includes: a catalytic section that includes a catalyst for accelerating the steam reforming reaction and a catalyst for accelerating the oxidation reaction; a crude fuel gas supply unit that flows a supply of a crude fuel gas containing the hydrocarbon and steam into the catalytic section; an oxidizing gas supply unit that flows a supply of an oxidizing gas containing oxygen into the catalytic section; a gaseous fuel output unit that causes a hydrogen rich gaseous fuel, which is produced through the steam reforming reaction and the oxidation reaction proceeding in the catalytic section, to be output from the catalytic section; and an oxidation reaction suppression unit that suppresses a progress of the oxidation reaction in an area on a side receiving the supply of the oxidizing gas in the catalytic section.

In the third fuel reformer device of the present invention thus constructed, the crude fuel gas containing the hydrocarbon and steam and the oxidizing gas containing oxygen are supplied to the catalytic section including the catalyst for accelerating the steam reforming reaction and the catalyst for accelerating the oxidation reaction. Both the steam reforming reaction, which is endothermic and produces hydrogen from the hydrocarbon and steam, and the oxidation reaction, which is exothermic and oxidizes the hydrocarbon, proceed in the catalytic section. The heat generated by the oxidation reaction is utilized for the progress of the steam reforming reaction. The resulting hydrogen rich gaseous fuel is output from the catalytic section. In the catalytic section, the progress of the oxidation reaction is suppressed in the area on the side receiving the supply of the oxidizing gas.

In the fuel reformer device of this configuration, the progress of the oxidation reaction is suppressed in the area on the side receiving the supply of the oxidizing gas. This effectively prevents an excessive temperature rise on the side receiving the supply of the oxidizing gas. This arrangement thus prevents the potential problems due to the excessive temperature rise, that is, deterioration of the catalyst and formation of by-products, and significantly improves the durability of the reformer unit. The suppressed oxidation reaction on the side receiving the supply of the oxidizing gas advantageously extends the area of the vigorous oxidation reaction to the lower stream portion. This heightens the temperature on the lower stream side and ensures the sufficiently high activity of the steam reforming reaction on the lower stream side, thus enabling size reduction of the fuel reformer device.

In the third fuel reformer device of the present invention, it is preferable that the oxidation reaction suppression unit makes an existing quantity of the catalyst for accelerating the oxidation reaction smaller in the area on the side receiving the supply of the oxidizing gas than in an area on a side outputting the gaseous fuel in the catalytic section.

In the third fuel reformer device of the present invention, it is also preferable that the catalyst for accelerating the steam reforming reaction is identical with the catalyst for accelerating the oxidation reaction, and that the oxidation reaction suppression unit makes an existing quantity of the identical catalyst smaller in the area on the side receiving the supply of the oxidizing gas than in the area on the side outputting the gaseous fuel.

The present invention is also directed to a fourth fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The fourth fuel reformer device includes: a catalytic section that includes a catalyst for accelerating the steam reforming reaction and a catalyst for accelerating the oxidation reaction; a crude fuel gas supply unit that flows a supply of a crude fuel gas containing the hydrocarbon and steam into the catalytic section; an oxidizing gas supply unit that flows a supply of an oxidizing gas containing oxygen into the catalytic section; a gaseous fuel output unit that causes a hydrogen rich gaseous fuel, which is produced through the steam reforming reaction and the oxidation reaction proceeding in the catalytic section, to be output from the catalytic section; and a reaction state detection unit that detects a degree of progress of the reaction proceeding in the catalytic section. The oxidizing gas supply unit has an oxygen concentration regulation unit that keeps a flow rate of oxygen per unit time supplied to the catalytic section at a desired level and regulates a concentration of oxygen included in the oxidizing gas supplied to the catalytic section, based on the degree of progress of the reaction detected by the reaction state detection unit.

In the fourth fuel reformer device of the present invention thus constructed, the crude fuel gas containing the hydrocarbon and steam and the oxidizing gas containing oxygen are supplied to the catalytic section including the catalyst for accelerating the steam reforming reaction and the catalyst for accelerating the oxidation reaction. Both the steam reforming reaction, which is endothermic and produces hydrogen from the hydrocarbon and steam, and the oxidation reaction, which is exothermic and oxidizes the hydrocarbon, proceed in the catalytic section. The heat generated by the oxidation reaction is utilized for the progress of the steam reforming reaction. The resulting hydrogen rich gaseous fuel is output from the catalytic section. The degree of progress of the reaction proceeding in the catalytic section is detected. While the flow rate of oxygen per unit time supplied to the catalytic section is kept at a desired level, the concentration of oxygen included in the oxidizing gas supplied to the catalytic section is regulated, based on the detected degree of progress of the reaction.

In the fuel reformer device of this configuration, the concentration of oxygen included in the oxidizing gas is regulated to control the rate of the oxidation reaction proceeding on the side receiving the supply of the oxidizing gas. This effectively prevents an excessive temperature rise on the side receiving the supply of the oxidizing gas. This arrangement thus prevents the potential problems due to the excessive temperature rise, that is, deterioration of the catalyst and formation of by-products, and significantly improves the durability of the reformer unit. The controlled rate of the oxidation reaction through the regulation of the concentration of oxygen included in the oxidizing gas advantageously extends the area of the vigorous oxidation reaction to the lower stream portion. This heightens the temperature on the lower stream side and ensures the sufficiently high activity of the steam reforming reaction on the lower stream side, thus enabling size reduction of the fuel reformer device.

In the fourth fuel reformer device of the present invention, it is preferable that the catalytic section includes a plurality of reaction units including the catalyst, and that the oxidizing gas supply unit flows the supply of the oxidizing gas into each of the plurality of reaction units. The arrangement of receiving the supply of the oxidizing gas at a plurality of places further enhances the effect of homogenizing the temperature inside the catalytic section.

The present invention is further directed to a fifth fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The fifth fuel reformer device includes: a catalytic section that includes a catalyst for accelerating the steam reforming reaction and the oxidation reaction; a crude fuel gas supply unit that flows a supply of a crude fuel gas containing the hydrocarbon, steam, and oxygen into the catalytic section; a gaseous fuel output unit that causes a hydrogen rich gaseous fuel, which is produced through the steam reforming reaction and the oxidation reaction proceeding in the catalytic section, to be output from the catalytic section; and a gas flow direction inversion unit that changes a site receiving the supply of the crude fuel gas by means of the crude fuel gas supply unit and a site outputting the gaseous fuel by means of the gaseous fuel output unit with each other in the catalytic section, so as to invert a gas flow in the catalytic section.

In the fifth fuel reformer device of the present invention thus constructed, the crude fuel gas containing the hydrocarbon, steam, and oxygen is supplied to the catalytic section including the catalyst for accelerating the steam reforming reaction and the oxidation reaction. Both the steam reforming reaction, which is endothermic and produces hydrogen from the hydrocarbon and steam, and the oxidation reaction, which is exothermic and oxidizes the hydrocarbon, proceed in the catalytic section. The heat generated by the oxidation reaction is utilized for the progress of the steam reforming reaction. The resulting hydrogen rich gaseous fuel is output from the catalytic section. In the course of the progress of such reactions, the site receiving the supply of the crude fuel gas is changed with the site outputting the gaseous fuel in the catalytic section.

In the fuel reformer device of this configuration, the site receiving the supply of the crude fuel gas is changed with the site outputting the gaseous fuel in the catalytic section. This effectively prevents an excessive temperature rise in a specific area on the side receiving the supply of the crude fuel gas. This arrangement thus prevents the potential problems due to the excessive temperature rise, that is, deterioration of the catalyst and formation of by-products, and significantly improves the durability of the reformer unit. There is no significant temperature drop in a specific area on the lower stream side. This ensures the sufficiently high activity of the steam reforming reaction in the whole catalytic section, thus enabling size reduction of the fuel reformer device.

In the fifth fuel reformer device of the present invention, it is preferable that the catalytic section has an end temperature measurement unit that measures a temperature at a preset position in the site receiving the supply of the crude fuel gas by means of the crude fuel gas supply unit in the catalytic section, and that the gas flow direction inversion unit changes the site receiving the supply of the crude fuel gas by means of the crude fuel gas supply unit and the site outputting the gaseous fuel by means of the gaseous fuel output unit with each other, based on the observed temperature by the end temperature measurement unit. This arrangement effectively prevents the excessive temperature rise on the side receiving the crude fuel gas.

The present invention is also directed to a sixth fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The sixth fuel reformer device includes: a catalytic section which particles with a catalyst for accelerating the steam reforming reaction and the oxidation reaction are sealed in; a crude fuel gas supply unit that flows a supply of a crude fuel gas containing the hydrocarbon, steam, and oxygen into the catalytic section; a gaseous fuel output unit that causes a hydrogen rich gaseous fuel, which is produced through the steam reforming reaction and the oxidation reaction proceeding in the catalytic section, to be output from the catalytic section; and a catalyst stirrer unit that stirs the particles with the catalyst in the catalytic section.

In the sixth fuel reformer device of the present invention thus constructed, the crude fuel gas containing the hydrocarbon, steam, and oxygen is supplied to the catalytic section that is filled with the particles with the catalyst for accelerating the steam reforming reaction and the oxidation reaction. Both the steam reforming reaction, which is endothermic and produces hydrogen from the hydrocarbon and steam, and the oxidation reaction, which is exothermic and oxidizes the hydrocarbon, proceed in the catalytic section, while the particles with the catalyst are stirred. The heat generated by the oxidation reaction is utilized for the progress of the steam reforming reaction. The resulting hydrogen rich gaseous fuel is output from the catalytic section.

In the fuel reformer device of this configuration, the particles with the catalyst are stirred in the catalytic section. The catalyst carried on the particles is thus successively involved in the oxidation reaction. This effectively prevents an excessive temperature rise in a specific area on the side receiving the supply of the crude fuel gas. This arrangement thus prevents the potential problems due to the excessive temperature rise, that is, deterioration of the catalyst and formation of by-products, and significantly improves the durability of the reformer unit. There is no significant temperature drop in a specific area on the lower stream side. This ensures the sufficiently high activity of the steam reforming reaction in the whole catalytic section, thus enabling size reduction of the fuel reformer device.

In the sixth fuel reformer device of the present invention, it is preferable that the catalyst stirrer unit is disposed in the crude fuel gas supply unit and injects a gas containing at least one of the hydrocarbon, steam, and oxygen into the catalytic section, so as to stir the particles with the catalyst in the catalytic section. This arrangement enables the action of supplying the crude fuel gas to the catalytic section to be carried out simultaneously with the action of stirring the particles with the catalyst.

The present invention is also directed to a seventh fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The seventh fuel reformer device includes: a catalytic section that includes a catalyst for accelerating the steam reforming reaction and the oxidation reaction; a crude fuel gas supply unit that flows a supply of a crude fuel gas containing the hydrocarbon and steam into the catalytic section; an oxidizing gas supply unit that flows a supply of an oxidizing gas containing oxygen into the catalytic section; a gaseous fuel output unit that causes a hydrogen rich gaseous fuel, which is produced through the steam reforming reaction and the oxidation reaction proceeding in the catalytic section, to be output from the catalytic section; and a flow site changing unit that changes with time a site receiving the supply of the oxidizing gas by means of the oxidizing gas supply unit in the catalytic section.

In the seventh fuel reformer device of the present invention thus constructed, the crude fuel gas containing the hydrocarbon and steam and the oxidizing gas containing oxygen are supplied to the catalytic section including the catalyst for accelerating the steam reforming reaction and the oxidation reaction. Both the steam reforming reaction, which is endothermic and produces hydrogen from the hydrocarbon and steam, and the oxidation reaction, which is exothermic and oxidizes the hydrocarbon, proceed in the catalytic section. The site receiving the supply of the oxidizing gas is changed with time in the catalytic section. The heat generated by the oxidation reaction that proceeds with the oxidizing gas supplied in this manner is utilized for the progress of the steam reforming reaction. The resulting hydrogen rich gaseous fuel is output from the catalytic section.

In the fuel reformer device of this configuration, the site receiving the supply of the oxidizing gas is changed with time in the catalytic section. This effectively prevents an excessive temperature rise in a specific area on the side receiving the supply of the oxidizing gas. This arrangement thus prevents the potential problems due to the excessive temperature rise, that is, deterioration of the catalyst and formation of by-products, and significantly improves the durability of the reformer unit.

The present invention is further directed to an eighth fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The eighth fuel reformer device includes: a catalytic section that includes a catalyst for accelerating the steam reforming reaction and the oxidation reaction; a crude fuel gas supply unit that flows a supply of a crude fuel gas containing the hydrocarbon and steam into the catalytic section; an oxidizing gas supply unit that flows a supply of an oxidizing gas containing oxygen into the catalytic section; a gaseous fuel output unit that causes a hydrogen rich gaseous fuel, which is produced through the steam reforming reaction and the oxidation reaction proceeding in the catalytic section, to be output from the catalytic section; and a heat homogenization unit that makes a feeding side receiving the supply of the crude fuel gas and the supply of the oxidizing gas adjoin to an output side outputting the gaseous fuel in the catalytic section, so as to enable heat exchange between the feeding side and the output side.

In the eighth fuel reformer device of the present invention thus constructed, the crude fuel gas containing the hydrocarbon and steam and the oxidizing gas containing oxygen are supplied to the catalytic section including the catalyst for accelerating the steam reforming reaction and the oxidation reaction. Both the steam reforming reaction, which is endothermic and produces hydrogen from the hydrocarbon and steam, and the oxidation reaction, which is exothermic and oxidizes the hydrocarbon, proceed in the catalytic section. In the catalytic section, the feeding side receiving the supply of the crude fuel gas and the supply of the oxidizing gas is arranged to be adjacent to the output side outputting the gaseous fuel. Heat exchange is accordingly performed between the feeding side and the output side. The heat generated by the oxidation reaction is thus utilized for the progress of the steam reforming reaction. The resulting hydrogen rich gaseous fuel is output from the catalytic section.

In the fuel reformer device of this configuration, heat exchange is performed between the feeding side receiving the supply of the crude fuel gas and the supply of the oxidizing gas and the output side outputting the gaseous fuel in the catalytic section. This effectively prevents an excessive temperature rise in a specific area on the side receiving the supply of the oxidizing gas. This arrangement thus prevents the potential problems due to the excessive temperature rise, that is, deterioration of the catalyst and formation of by-products, and significantly improves the durability of the reformer unit. There is no significant temperature drop in a specific area on the lower stream side. This ensures the sufficiently high activity of the steam reforming reaction in the whole catalytic section, thus enabling size reduction of the fuel reformer device.

In the eighth fuel reformer device of the present invention, it is preferable that the catalytic section includes at least two reaction units that respectively include the catalyst and have the feeding side and the output side mutually located at opposite positions, and that the at least two reaction units are arranged to make the feeding side of one reaction unit adjacent to the output side of the other reaction unit.

In the eighth fuel reformer device of the present invention, it is also preferable that the catalytic section includes a turning area in a flow conduit of the crude fuel gas formed inside thereof, and that an inlet and an outlet of the flow conduit are arranged to be adjacent to each other.

The present invention is further directed to a ninth fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The ninth fuel reformer device includes: a catalytic section that includes a catalyst for accelerating the steam reforming reaction and the oxidation reaction; a crude fuel gas supply unit that flows a supply of a crude fuel gas containing the hydrocarbon and steam into the catalytic section; an oxidizing gas supply unit that flows a supply of an oxidizing gas containing oxygen into the catalytic section; a gaseous fuel output unit that causes a hydrogen rich gaseous fuel, which is produced through the steam reforming reaction and the oxidation reaction proceeding in the catalytic section, to be output from the catalytic section; and a heating unit that heats a part other than an area on a side receiving the supply of the oxidizing gas by means of a specific fluid that transmits heat produced in a predetermined member, which is a constituent of a system including the fuel reformer device.

In the ninth fuel reformer device of the present invention thus constructed, the crude fuel gas containing the hydrocarbon and steam and the oxidizing gas containing oxygen are supplied to the catalytic section including the catalyst for accelerating the steam reforming reaction and the oxidation reaction. Both the steam reforming reaction, which is endothermic and produces hydrogen from the hydrocarbon and steam, and the oxidation reaction, which is exothermic and oxidizes the hydrocarbon, proceed in the catalytic section. In the area of the catalytic section where the oxidation reaction proceeds with the supply of the oxidizing gas, the heat generated by the oxidation reaction is utilized for the progress of the steam reforming reaction. The heat produced in the predetermined member, which is the constituent of the system including the fuel reformer device, is transmitted to the part other than the area on the side receiving the supply of the oxidizing gas by means of the specific fluid, and is utilized for the steam reforming reaction. The resulting hydrogen rich gaseous fuel is output from the catalytic section.

In the fuel reformer device of this configuration, in the part other than the area on the side receiving the supply of the oxidizing gas, the oxidation reaction proceeds with the heat evolved in the predetermine member, which is the constituent of the system including the fuel reformer device. This arrangement enables the flow rate of the oxidizing gas supplied to the catalytic section to be reduced relative to the flow rate of the crude fuel gas supplied to the catalytic section. This effectively prevents an excessive temperature rise in a specific area on the side receiving the supply of the oxidizing gas. This arrangement thus prevents the potential problems due to the excessive temperature rise, that is, deterioration of the catalyst and formation of by-products, and significantly improves the durability of the reformer unit. The heat evolved in the predetermined member, which is the constituent of the system including the fuel reformer device, is transmitted to the part other than the area on the side receiving the supply of the oxidizing gas. There is accordingly no significant temperature drop to lower the activity of the steam reforming reaction. This ensures the sufficiently high activity of the steam reforming reaction in the whole catalytic section, thus enabling size reduction of the fuel reformer device. This structure utilizes the heat evolved in the predetermined member, which is the constituent of the system including the fuel reformer device, to heat the part other than the area on the side receiving the supply of the oxidizing gas, thus effectively preventing a decrease in energy efficiency of the whole system.

In the ninth fuel reformer device of the present invention, it is preferable that the heating unit heats the part other than the area on the Bide receiving the supply of the oxidizing gas by means of a hot gas discharged from the predetermined member, which is the constituent of the system including the fuel reformer device.

The present invention is also directed to a tenth fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The tenth fuel reformer device includes: a catalytic section that includes a catalyst for accelerating the steam reforming reaction and the oxidation reaction; a crude fuel gas supply unit that flows a supply of a crude fuel gas containing the hydrocarbon and steam into the catalytic section; an oxidizing gas supply unit that flows a supply of an oxidizing gas containing oxygen into the catalytic section; a gaseous fuel output unit that causes a hydrogen rich gaseous fuel, which is produced through the steam reforming reaction and the oxidation reaction proceeding in the catalytic section, to be output from the catalytic section; and an end cooling unit that sprays a liquid containing at least one of the hydrocarbon and water into an area on a side receiving the supply of the crude fuel gas and the supply of the oxidizing gas.

In the tenth fuel reformer device of the present invention thus constructed, the crude fuel gas containing the hydrocarbon and steam and the oxidizing gas containing oxygen are supplied to the catalytic section including the catalyst for accelerating the steam reforming reaction and the oxidation reaction. Both the steam reforming reaction, which is endothermic and produces hydrogen from the hydrocarbon and steam, and the oxidation reaction, which is exothermic and oxidizes the hydrocarbon, proceed in the catalytic section. In the area of the catalytic section where the oxidation reaction proceeds with the supply of the oxidizing gas, the heat generated by the oxidation reaction is utilized for the progress of the steam reforming reaction. The liquid containing at least one of the hydrocarbon and water is sprayed into the area on the side receiving the supply of the crude fuel gas and the supply of the oxidizing gas, so as to cool down the area. The resulting hydrogen rich gaseous fuel is output from the catalytic section.

In the fuel reformer device of this configuration, the liquid containing at least one of the hydrocarbon and water is sprayed into the area on the side receiving the supply of the crude fuel gas and the supply of the oxidizing gas. Part of the heat generated by the oxidation reaction is accordingly consumed as the heat of vaporization. This effectively prevents an excessive temperature rise in a specific area on the side receiving the supply of the oxidizing gas. This arrangement thus prevents the potential problems due to the excessive temperature rise, that is, deterioration of the catalyst and formation of by-products, and significantly improves the durability of the reformer unit.

The present invention is further directed to an eleventh fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The eleventh fuel reformer device includes: a catalytic section that comprises a first reaction unit including a catalyst for accelerating the steam reforming reaction and the oxidation reaction and a second reaction unit including a catalyst for accelerating the steam reforming reaction; a crude fuel gas supply unit that flows a supply of a crude fuel gas containing the hydrocarbon and steam into the catalytic section; an oxidizing gas supply unit that flows a supply of an oxidizing gas containing oxygen into the first reaction unit; and a gaseous fuel output unit that causes a hydrogen rich gaseous fuel, which is produced through the steam reforming reaction and the oxidation reaction proceeding in the catalytic section, to be output from the catalytic section. The first reaction unit and the second reaction unit are arranged to be adjacent to each other in the catalytic section, and heat exchange is performed between the first reaction unit and the second reaction unit.

In the eleventh fuel reformer device of the present invention thus constructed, the crude fuel gas containing the hydrocarbon and steam and the oxidizing gas containing oxygen are supplied to the first reaction unit including the catalyst for accelerating the steam reforming reaction and the oxidation reaction. Both the steam reforming reaction, which is endothermic and produces hydrogen from the hydrocarbon and steam, and the oxidation reaction, which is exothermic and oxidizes the hydrocarbon, proceed in the first reaction unit. The crude fuel gas is also supplied to the second reaction unit including the catalyst for accelerating the steam reforming reaction. The steam reforming reaction then also proceeds in the second reaction unit. In the first reaction unit, the heat generated by the oxidation reaction is utilized for the progress of the steam reforming reaction. The heat exchange performed between the second reaction unit and the adjoining first reaction unit enables the heat generated by the oxidation reaction in the first reaction unit to be utilized for the progress of the steam reforming reaction in the second reaction unit. The resulting hydrogen rich gaseous fuel is output from the catalytic section.

In the fuel reformer device of this configuration, the heat generated by the oxidation reaction in the area of the first reaction unit where the oxidation reaction proceeds with the supply of the oxidizing gas is not only utilized for the steam reforming reaction proceeding in the first reaction unit but transmitted to the adjoining second reaction unit and utilized for the steam reforming reaction proceeding in the second reaction unit. This arrangement effectively prevents the potential problems due to an excessive temperature rise in the catalytic section with the heat generated by the oxidation reaction, that is, deterioration of the catalyst and formation of by-products, and significantly improves the durability of the reformer unit.

In any of the first, the second, and the fifth through the tenth fuel reformer devices of the present invention, the hydrocarbon may be methanol, and the catalyst for accelerating the steam reforming reaction and the oxidation reaction may be a single copper-containing catalyst.

In either of the third and the fourth fuel reformer devices of the present invention, the hydrocarbon may be methanol, and the catalyst for accelerating the steam reforming reaction and the catalyst for accelerating the oxidation reaction may be an identical copper-containing catalyst.

In the eleventh fuel reformer device of the present invention, the hydrocarbon may be methanol, and the catalyst included in the first reaction unit may be a single copper-containing catalyst.

In the fuel reformer device of this arrangement, the single copper-containing catalyst is used to accelerate both the steam reforming reaction and the oxidation reaction of methanol. Unlike the prior art technique that uses platinum or another known oxidation catalyst to accelerate the oxidation reaction, the oxidation reaction of methanol proceeding in the presence of the copper-containing catalyst hardly produces carbon monoxide. This arrangement accordingly gives the resulting gaseous fuel having the lower concentration of carbon monoxide.

The present invention is also directed to a twelfth fuel reformer device in which a steam reforming reaction, which is endothermic and produces hydrogen from a hydrocarbon and steam, and an oxidation reaction, which is exothermic and oxidizes the hydrocarbon, proceed and heat generated by the oxidation reaction is utilized for a progress of the steam reforming reaction. The twelfth fuel reformer device includes: a catalytic section that includes a catalyst for accelerating the steam reforming reaction and the oxidation reaction; a crude fuel gas supply unit that flows a supply of a crude fuel gas containing the hydrocarbon, steam, and oxygen into the catalytic section; and a gaseous fuel output unit that causes a hydrogen rich gaseous fuel, which is produced through the steam reforming reaction and the oxidation reaction proceeding in the catalytic section, to be output from the catalytic section. The catalyst accelerates the oxidation reaction that is not via a reaction pathway of producing carbon monoxide.

In the fuel reformer device of this configuration, the catalyst accelerates the oxidation reaction that is not via the reaction pathway of producing carbon monoxide. This arrangement effectively reduces the quantity of carbon monoxide produced by the reactions proceeding in the catalytic section, thus giving the resulting gaseous fuel having the lower concentration of carbon monoxide.

In the twelfth fuel reformer device of the present invention, the hydrocarbon may be methanol, and the catalyst for accelerating the steam reforming reaction and the oxidation reaction may be a single copper-containing catalyst.

In the fuel reformer device of this arrangement, the copper-containing catalyst is used to accelerate the oxidation reaction of methanol. Unlike the prior art technique that uses platinum or another known oxidation catalyst to accelerate the oxidation reaction, the oxidation reaction proceeding in the presence of the copper-containing catalyst hardly produces carbon monoxide. This arrangement accordingly gives the resulting gaseous fuel having the lower concentration of carbon monoxide. The use of the single copper-containing catalyst to accelerate both the steam reforming reaction and the oxidation reaction of methanol simplifies the structure of the fuel reformer device.

BEST MODES OF CARRYING OUT THE INVENTION

Figure 1:
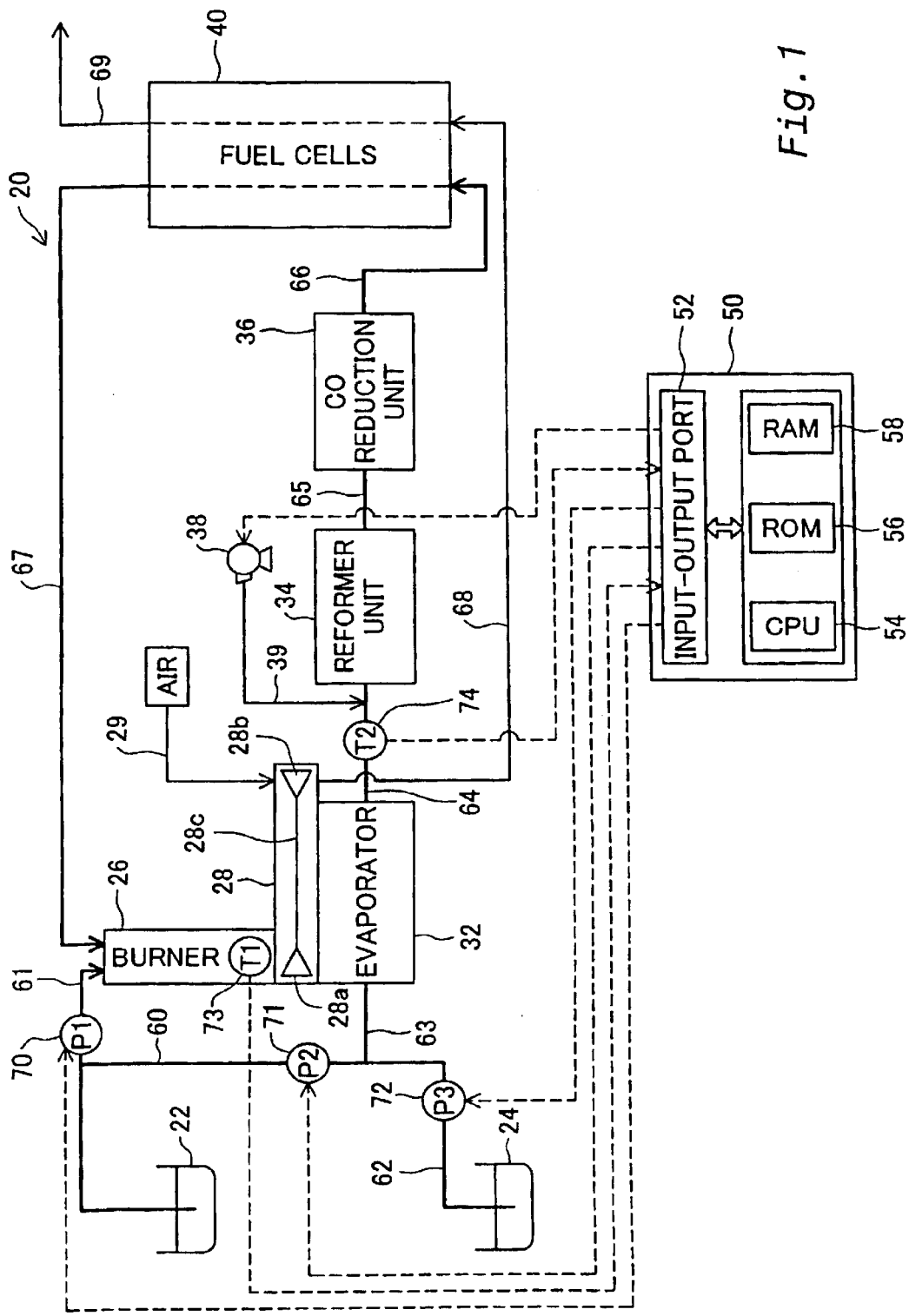
FIG. 1 is a block diagram schematically illustrating the structure of a fuel cells system 20 in one preferred embodiment of the present invention.

In order to clarify the configurations, the functions, and the advantages of the present invention discussed above, some modes of carrying out the present invention are described below as preferred embodiments. FIG. 1 schematically illustrates the structure of a fuel cells system 20 including a reformer unit in a first embodiment of the present invention. The fuel cells system 20 includes, as primary constituents, a methanol reservoir 22 that stores methanol therein, a water reservoir 24 that stores water therein, a burner 26 that generates a combustion gas, a compressor unit 28 that compresses the air, an evaporator 32 that is coupled with the burner 26 and the compressor unit 28, a reformer unit 34 that produces a gaseous fuel through a reforming reaction, a CO reduction unit 36 that reduces concentration of carbon monoxide (CO) included in the gaseous fuel, fuel cells 40 that generate an electromotive force through electrochemical reactions, and a control unit 50 that is constructed by a computer. The following first describes the fuel cells 40, which mainly function to generate electric power in the fuel cells system 20.

Figure 2:
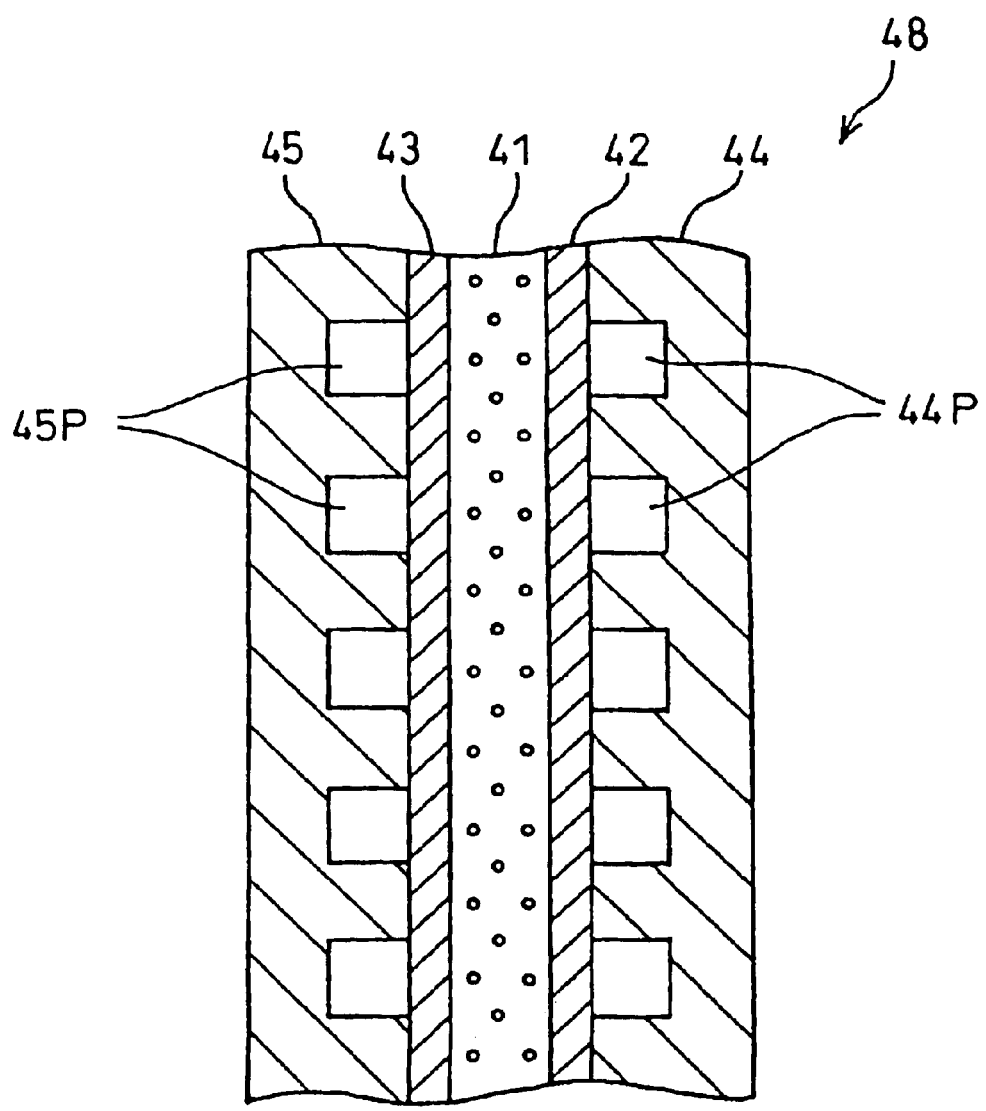
FIG. 2 is a sectional view schematically illustrating the structure of a unit cell 48 of a fuel cells stack 40.

The fuel cells 40 are polymer electrolyte fuel cells and have a stack structure obtained by laying a plurality of construction units or unit cells one upon another. FIG. 2 is a sectional view illustrating the structure of a unit cell 48 of the fuel cells stack 40. The unit cell 48 includes an electrolyte membrane 41, an anode 42, a cathode 43, and a pair of separators 44 and 45.

The anode 42 and the cathode 43 are gas diffusion electrodes that are disposed across the electrolyte membrane 41 to form a sandwich structure. The pair of separators 44 and 45 are further disposed across this sandwich structure and are respectively combined with the anode 42 and the cathode 43 to define flow paths of a gaseous fuel and an oxidizing gas. Gaseous fuel flow conduits 44P are defined by the anode 42 and the separator 44, whereas oxidizing gas flow conduits 45P are defined by the cathode 43 and the separator 45. Although the flow conduits are illustrated in only a single face of each of the separators 44 and 45 in FIG. 2, ribs are actually formed in both faces of each of the separators 44 and 45. One face of the separator is combined with the anode 42 to define the gaseous fuel flow conduits 44P, whereas the other face of the separator is combined with the cathode 43 of the adjoining unit cell to define the oxidizing gas flow conduits 45P. The separators 44 and 45 are combined with the adjoining gas diffusion electrodes to define the gas flow conduits, while functioning to separate the flow of gaseous fuel from the flow of oxidizing gas between each pair of adjoining unit cells. In the stack structure obtained by laying the plurality of unit cells 48 one upon another, the two separators located on both ends of the stack structure may have ribs only in the respective single faces thereof that are in contact with the gas diffusion electrodes.

The electrolyte membrane 41 is a proton-conductive ion exchange membrane composed of a solid polymer material, for example, a fluororesin, and shows favorable electrical conductivity in the wet state. In this embodiment, a Nafion (manufactured by du Pont) film is applied for the electrolyte membrane 41. Platinum or a platinum alloy consisting of platinum and another metal is applied as a catalyst on the surface of the electrolyte membrane 41.

The anode 42 and the cathode 43 are made of carbon cloth that is woven of carbon fiber yarns. The anode 42 and the cathode 43 may be made of carbon paper or carbon felt that also consists of carbon fibers, instead of the carbon cloth of this embodiment.

The separators 44 and 45 are composed of a gas-impermeable electrically conductive material, for example, gas-impermeable dense carbon obtained by compacting carbon powder. Each of the separators 44 and 45 has a plurality of ribs that are arranged in parallel on both faces thereof and are combined with the surface of the anode 42 to define the gaseous fuel flow conduits 44P while being combined with the surface of the cathode 43 of the adjoining unit cell to define the oxidizing gas flow conduits 45P. It is, however, not necessary to form the ribs in parallel on both faces of each separator, but the ribs formed on one face may be arranged at a predetermined angle to the ribs formed on the other face, for example, parallel to the ribs on the other face. The shape of the ribs may not be restricted to the parallel grooves, but the ribs may have any shape that allow supplies of the gaseous fuel and the oxidizing gas to the gas diffusion electrodes.

The unit cell 48, which is the construction unit of the fuel cells 40, has the structure discussed above. In the actual assembly of the fuel cells 40, plural sets (100 sets in this embodiment) of the unit cells 48, each including the separator 44, the anode 42, the electrolyte membrane 41, the cathode 43, and the separator 45 in this sequence, are laid one upon another to form a cell laminate. The stack structure is completed by arranging a pair of collector plates, which are composed of dense carbon or copper plates, across the cell laminate.

The constituents of the fuel cells system 20 other than the fuel cells 40 and their connections are discussed below. The evaporator 32 receives supplies of methanol and water from the methanol reservoir 22 and the water reservoir 24 and vaporize the methanol and water. The evaporator 32 is coupled with the burner 26 and the compressor unit 28 as mentioned previously. A combustion exhaust discharged from the burner 26 is led via the compressor unit 28 as discussed later, and the heat of combustion is transmitted to a non-illustrated heat exchange unit of the evaporator 32 to boil and vaporize methanol and water supplied to the evaporator 32.

A second pump 71 is disposed in a methanol flow conduit 60, through which a supply of methanol as a crude fuel is flown from the methanol reservoir 22 to the evaporator 32, in order to regulate the quantity of methanol supplied to the evaporator 32. The second pump 71 is connected with the control unit 50 and is driven in response to signals output from the control unit 50 to regulate the flow rate of methanol supplied to the evaporator 32.

A third pump 72 is disposed in a water flow conduit 62, through which a supply of water is flown from the water reservoir 24 to the evaporator 32, in order to regulate the quantity of water supplied to the evaporator 32. Like the second pump 71, the third pump 72 is connected with the control unit 50 and is driven in response to signals output from the control unit 50 to regulate the flow rate of water supplied to the evaporator 32. The methanol flow conduit 60 joins the water flow conduit 62 to form a first fuel supply conduit 63, which connects with the evaporator 32. Since the flow rate of methanol and the flow rate of water are regulated by the second pump 71 and the third pump 72, the mixture of a preset quantity of the methanol and a preset quantity of water is fed to the evaporator 32 via the fist fuel supply conduit 63.

The compressor unit 28 coupled with the evaporator 32 takes in the air from the outside of the fuel cells system 20, compresses the intake air, and feeds the compressed air to the cathodes of the fuel cells 40. The compressor unit 28 includes a turbine 28a and a compressor 28b formed in an impeller. The turbine 28a and the compressor 28b are linked with each other via a coaxial shaft 28c. The compressor 28b is driven and rotated by driving and rotating the turbine 28a. The burner 26 is also coupled with the evaporator 32. The turbine 28a is driven by the hot combustion gas led from this burner 26. The compressor 28b rotates with the rotation of the turbine 28a and compresses the air as mentioned previously. The air is taken from the outside into the compressor 28b via an air flow conduit 29. The air compressed by the compressor unit 28 is fed to the fuel cells 40 via an oxidizing gas supply conduit 58 and is subjected to the electrochemical reactions proceeding in the fuel cells 40.

The turbine 28a is actuated by the hot combustion gas led from the burner 26 and is composed of a refractory alloy or ceramic to have the heat resistance and durability. In this embodiment, a nickel-based alloy (Inconel 700 manufactured by Inconel Corporation) is used for the turbine 28a. The compressor 28b is composed of a light-weight aluminum alloy.

The burner 26 that functions to drive the turbine 28a receives the fuel for combustion from the anodes of the fuel cells 40 and the methanol reservoir 22. The fuel cells 40 use, as the fuel, a hydrogen rich gas produced by reforming methanol in the reformer unit 34 for the electrochemical reactions proceeding therein. All the hydrogen supplied to the fuel cells 40 is not consumed by the electrochemical reactions, but a gaseous fuel exhaust including the non-consumed, remaining hydrogen is discharged to a fuel exhaust conduit 67. The burner 26 connected to this fuel exhaust conduit 67 receives a supply of the gaseous fuel exhaust and causes the non-consumed, remaining hydrogen to undergo the complete combustion, so as to improve the utilization rate of the fuel. The fuel exhaust is generally not sufficient for the fuel for combustion in the burner 26. A supply of methanol is accordingly fed from the methanol reservoir 22 to the burner 26 to supplement such an insufficiency or to be used as the fuel for combustion in the burner 26 when no fuel exhaust is fed from the fuel cells 40, for example, at the starting time of the fuel cells system 20. A methanol branch conduit 61 is formed to feed the supply of methanol to the burner 26. The methanol branch conduit 61 branches off from the methanol flow conduit 60, through which the supply of methanol is flown from the methanol reservoir 22 to the evaporator 32.

The burner 26 has a first temperature sensor 73 that measures the temperature of combustion in the burner 26 and inputs the result of the measurement to the control unit 50. The control unit 50 outputs a driving signal to the first pump 70 based on the input from the first temperature sensor 73, so as to regulate the quantity of methanol fed to the burner 26 and maintain the temperature of combustion in the burner 26 within a predetermined range (approximately 800° C. to 1000° C.). The combustion gas in the burner 26 works to drive and rotate the turbine 28a and is then led to the evaporator 32. The efficiency of heat exchange in the turbine 28a is relatively low (not higher than approximately 10%). The combustion exhaust gas led to the evaporator 32 accordingly has the temperature of approximately 600 to 700° C. and is sufficient for the heat source of the evaporator 32 The solution mixture of methanol and water supplied via the first fuel supply conduit 63 as described previously is vaporized by the hot combustion exhaust gas led from the burner 26 to the evaporator 32. A crude fuel gas of methanol and water vaporized by the evaporator 32 is flown through a second fuel supply conduit 64 to the reformer unit 34.

The reformer unit 34 reforms the crude fuel gas of methanol and water to produce a hydrogen rich gaseous fuel. The configuration of the reformer unit 34 and the reforming reaction proceeding in the reformer unit 34 are the essential part of the present invention and will be discussed in detail later. A second temperature sensor 74 is disposed in the second fuel supply conduit 64, through which the crude fuel gas of methanol and water is flown to the reformer unit 34, and measures the temperature of the crude fuel gas of methanol and water fed to the reformer unit 34. The observed temperature of the crude fuel gas is input into the control unit 50. In the process of outputting the driving signal to the first pump 70 based on the input from the first temperature sensor 73, the control unit 50 corrects the driving amount of the first pump 70 based on the input from the second temperature sensor 74 and regulates the quantity of methanol fed to the burner 26. Regulating the temperature of the combustion gas in the burner 26 in this manner adjusts the temperature of the crude fuel gas vaporized in the evaporator 32. The crude fuel gas led from the evaporator 32 is generally heated to approximately 250° C.

As described later, oxygen is involved in the reforming reaction proceeding in the reformer unit 34. The reformer unit 34 has a blower 38 to taken in oxygen required for the reforming reaction. The blower 38 compresses the externally intake air and feeds the compressed intake air to the reformer unit 34 via an air supply conduit 39. In the structure of this embodiment, the air supply conduit 39 joins the second fuel supply conduit 64, and the intake air by the blower 38 is fed into the reformer unit 34 together with the crude fuel gas led from the evaporator 32. The blower 38 is connected with the control unit 50, which controls the driving state of the blower 38.

The CO reduction unit 36 reduces the concentration of carbon monoxide included in the gaseous fuel led from the reformer unit 34 via a third fuel supply conduit 65. The general reforming reaction of methanol is expressed by Equation (4) given previously. In the actual state, however, the reforming reaction does not proceed in the ideal manner as expressed by this equation, but the gaseous fuel produced in the reformer unit 34 includes a certain amount of carbon monoxide. The CO reduction unit 36 functions to reduce the concentration of carbon monoxide included in the gaseous fuel supplied to the fuel cells 40.

The fuel cells 40 of this embodiment are polymer electrolyte fuel cells and have the platinum or platinum alloy catalyst to accelerate the cell reactions (in this embodiment, the platinum catalyst is applied on the surface of the electrolyte membrane 41). Carbon monoxide included in the gaseous fuel is adsorbed by the platinum catalyst to lower its catalytic action and interfere with the reaction of Equation (1) proceeding at the anodes, so as to deteriorate the performance of the fuel cells. In the course of power generation with the polymer electrolyte fuel cells like the fuel cells 40, it is accordingly essential to sufficiently reduce the concentration of carbon monoxide included in the supply of gaseous fuel and prevent deterioration of the cell performances. In the polymer electrolyte fuel cells, the allowable limit of the concentration of carbon monoxide included in the supply of gaseous fuel is generally not greater than several ppm.

The gaseous fuel led to the CO reduction unit 36 is a hydrogen rich gas containing the certain amount of carbon monoxide as mentioned above. The CO reduction unit 36 oxidizes carbon monoxide in preference to hydrogen included in the gaseous fuel. The CO reduction unit 36 is filled with a carrier having any of platinum, ruthenium, palladium, gold, and alloys of these metals as the primary element carried thereon as a carbon monoxide selective oxidation catalyst. The concentration of carbon monoxide included in the gaseous fuel processed by this CO reduction unit 36 depends upon the driving temperature of the CO reduction unit 36, the concentration of carbon monoxide originally included in the supply of gaseous fuel, and the flow rate of the gaseous fuel fed to the CO reduction unit 36 per unit volume of the catalyst. The CO reduction unit 36 has a non-illustrated carbon monoxide sensor. The driving temperature of the CO reduction unit 36 and the flow rate of the gaseous fuel fed to the CO reduction unit 36 are regulated according to the result of the measurement with the carbon monoxide sensor, so as to make the concentration of carbon monoxide included in the processed gaseous fuel not greater than several ppm.

The gaseous fuel having the reduced concentration of carbon monoxide is led from the CO reduction unit 36 through a fourth fuel supply conduit 66 to the fuel cells 40 and is subjected to the cell reaction at the anodes. The gaseous fuel exhaust after the cell reaction in the fuel cells 40 is discharged to the fuel exhaust conduit 67 and led to the burner 26 as mentioned previously. The remaining hydrogen in the gaseous fuel exhaust is consumed as the fuel for combustion. The oxidizing gas involved in the cell reaction at the cathode of the fuel cells 40, on the other hand, is supplied as the compressed air from the compressor unit 28 through the oxidizing gas supply conduit 68 as described above. The oxidizing gas exhaust after the cell reaction is discharged outside via an oxidizing gas exhaust conduit 69.

The control unit 50 is constructed as a logic circuit including a microcomputer. In a concrete structure, the control unit 50 includes a CPU 54 that executes a variety of arithmetic and logic operations according to preset control programs, a ROM 56 in which control programs and control data required for the execution of the various arithmetic and logic operations by the CPU 54 are stored in advance, a RAM 58 which a diversity of data required for the execution of the various arithmetic and logic operations by the CPU 54 are temporarily written in and read from, and an input-output port 52 that inputs detection signals from the temperature sensors described above and outputs driving signals to the pumps and the blower 38 described above according to the results of the arithmetic and logic operations executed by the CPU 54.

Figure 3:
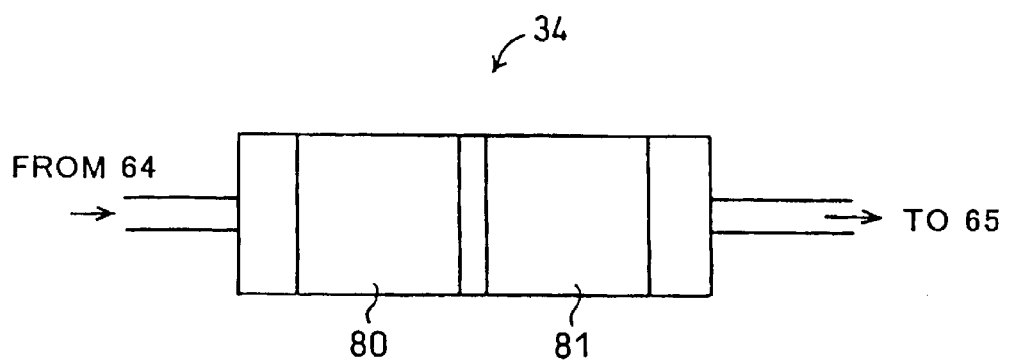
FIG. 3 schematically illustrates the structure of a reformer unit 34.

The following describes the configuration of the reformer unit 34, which is characteristic of the present invention. FIG. 3 schematically illustrates the structure of the reformer unit 34. The reformer unit 34 of this embodiment receives the supplies of the crude fuel gas and the air from an end connecting with the second fuel supply conduit 64. The supplied crude fuel gas and the air pass through the inside of the reformer unit 34 and are subjected to the steam reforming reaction and the oxidation reaction (the partial oxidation reaction). The hydrogen rich gaseous fuel produced through the steam reforming reaction expressed by Equation (4) and the oxidation reaction expressed by Equation (5) in the reformer unit 34 is discharged from the other end to the third fuel supply conduit 65. The reformer unit 34 includes a first reaction unit 80 and a second reaction unit 81. The first reaction unit 80 and the second reaction unit 81 are constructed as metal honeycombs with a Cu—Zn catalyst carried on the surface thereof. The first reaction unit 80 disposed on the upper stream side (that is, the side close to the connection with the second fuel supply conduit 64) is designed to have a smaller number of cells discussed later than the second reaction unit 81 disposed on the lower stream side (that is, the side close to the connection with the third fuel supply conduit 65).

Figure 4:
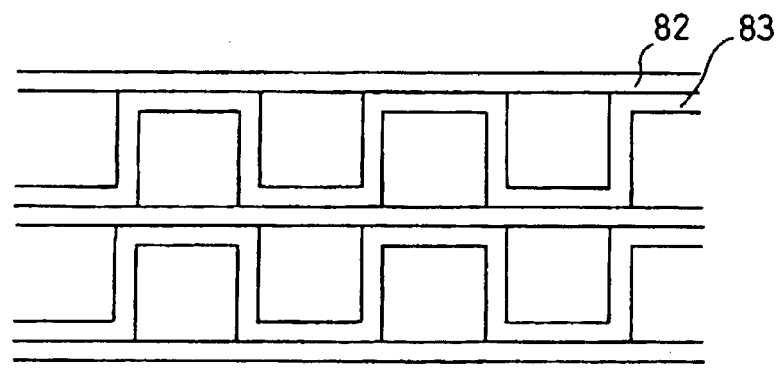
FIG. 4 schematically illustrates the cross section of the honeycomb structure that forms the reformer unit 34.

FIG. 4 schematically illustrates part of the cross section of the metal honeycomb that defines the first reaction unit 80 and the second reaction unit 81. The metal honeycomb is formed by laying stainless steel plates 82 and 83 one upon the other. More specifically the metal honeycomb is formed by alternately laying the flat stainless steel plates 82 and the corrugated stainless steel plates 83 one upon another. The stainless steel plate 83 is corrugated at the intervals of 1 mm. The alternate arrangement of the corrugated stainless steel plates 83 and the flat stainless steel plates 82 accordingly gives the honeycomb structure of cells having a substantially square cross section of 1 mm in length of each side.

The difference between the first reaction unit 80 and the second reaction unit 81 is the thickness of the stainless steel plates 82 and 83 used to form the metal honeycomb structure. The different thickness results in a difference between the number of cells included in the first reaction unit 80 and the number of cells included in the second reaction unit 81. The first reaction unit 80 has the honeycomb structure formed by the stainless steel plates 82 and 83 of 0.1 mm in thickness, whereas the second reaction unit 81 has the honeycomb structure formed by the stainless steel plates 82 and 83 of 0.03 mm in thickness. Namely the first reaction unit 80 includes about 75 cells per 1 cm2 of the cross section, and the second reaction unit 81 includes about 91 cells per 1 cm2 of the cross section. The reformer unit 34 has a fixed cross section. The honeycomb structures composed of the stainless steel plates of different thicknesses accordingly make the total sectional area of the gas flow path in the first reaction unit 80 (that is, the sum of the cross sections of the respective cells included in the first reaction unit 80) smaller than the total sectional area of the gas flow path in the second reaction unit 81 (that is, the sum of the cross sections of the respective cells included in the second reaction unit 80).

The catalyst is respectively carried on the surface of the honeycomb structures of the first reaction unit 80 and the second reaction unit 82. The flow of the crude fuel gas passing through the surface of the honeycomb structures is subjected to the steam reforming reaction and the oxidation reaction to produce a hydrogen rich gaseous fuel. In this embodiment, the catalyst carried on the surface of the honeycomb structure is manufactured from copper and zinc oxide by coprecipitation. The Cu—Zn catalyst obtained by coprecipitation is crushed, is mixed with a binder like an alumina sol, and is carried on the surface of the honeycomb, for example, by application.

The flow of the crude fuel gas fed to the reformer unit 34 constructed as discussed above first passes through the first reaction unit 80 having the less number of cells, that is, having the smaller total sectional area of the gas flow path, and then the second reaction unit 81 having the greater number of cells, that is, having the greater total sectional area of the gas flow path. Since the preset flow rate of the crude fuel gas passes through the honeycomb structure having the smaller total sectional area of the gas flow path and the honeycomb structure having the greater total sectional area of the gas flow path in this sequence, the flow velocity of the crude fuel gas is higher in the first reaction unit 80 of the reformer unit 34 than in the second reaction unit 81.

Figure 5:
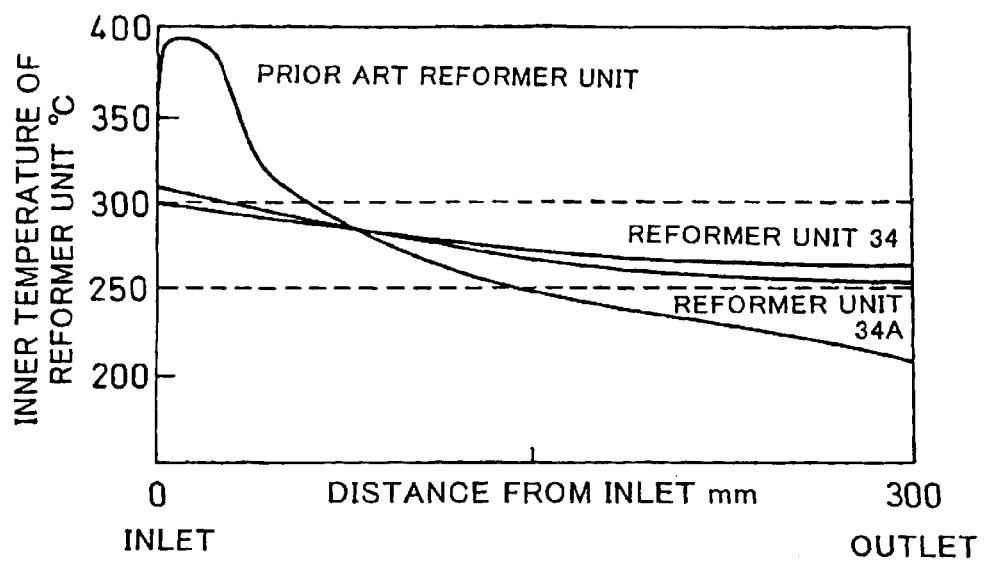
FIG. 5 is a graph showing internal temperature distributions of the reformer unit 34 and a prior art reformer unit.

In the reformer unit 34 of the first embodiment, the higher flow velocity of the crude fuel gas on the upstream side effectively prevents an abrupt temperature rise on the upstream side and substantially keeps the temperature distribution in the whole reformer unit 34 in the temperature range of 250 to 300° C., which is suitable for the reforming reaction. FIG. 5 is a graph showing the internal temperature distributions along the flow of the gas with regard to the reformer unit 34 of this embodiment and a prior art reformer unit having a fixed cross section of the honeycomb structure. As described previously, the oxidation reaction has the higher reaction rate than the steam reforming reaction. In the prior art reformer unit, the oxidation reaction vigorously proceeds in the vicinity of the inlet of the crude fuel gas. This raises the temperature to approximately 400° C. in the neighborhood of the inlet. In the reformer unit 34 of this embodiment, on the other hand, the crude fuel gas has the high flow velocity on the upstream side, so that the heat produced by the oxidation reaction proceeding on the upstream side is quickly transmitted to the downstream portion by the fast flow of the gas. The higher flow velocity of the crude fuel gas on the upstream side prevents the oxidation reaction from being completed in a narrow area on the upstream side but extends the area of the vigorous oxidation reaction to the lower stream portion. This effectively prevents an abrupt temperature rise in the neighborhood of the inlet. The first reaction unit 80 disposed on the upper stream side has the honeycomb structure formed by the thick stainless steel plates and accordingly has a large heat capacity. The heat generated by the oxidation reaction thus tends to be transmitted to the lower stream portion by the flow of the gas, prior to be transmitted to the honeycomb structure and increase the temperature of the honeycomb structure.

In the reformer unit 34 of this embodiment, there is no abrupt temperature rise in the vicinity of the inlet. This advantageously prevents the potential troubles due to the temperature rise, for example, deterioration of the catalyst and formation of by-products. The reduced deterioration of the catalyst significantly improves the durability of the reformer unit. The reformer unit 34 of this embodiment is durable over 5000 hours, whereas the prior art reformer unit whose temperature distribution is shown in FIG. 5 has the duration of approximately 200 hours.

As described above, in the reformer unit 34 of this embodiment, the area of the vigorous oxidation reaction is extended to the lower stream portion, and the heat produced by the oxidation reaction proceeding on the upper stream side is quickly transmitted to the lower stream portion. Unlike the prior art reformer unit, there is accordingly no excessive temperature drop in the downstream portion of the reformer unit 34. Namely the lower stream portion of the reformer unit 34 is kept in the highly active state of the steam reforming reaction. This ensures the sufficient utilization of the catalyst present on the lower stream side and enhances the rate of the steam reforming reaction. The enhanced activity of the steam reforming reaction on the downstream side enables size reduction of the reformer unit.

Figure 6A:
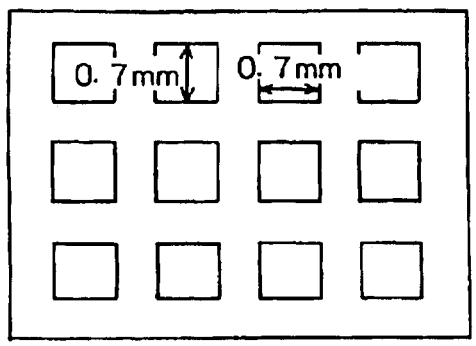
FIG. 6 illustrates the cross sections of another honeycomb structure in one modified example of the first embodiment.
Figure 6B:
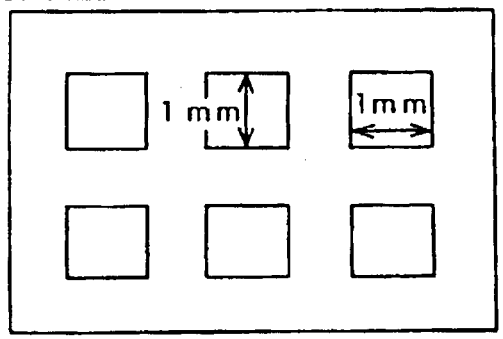
Figure 6C:
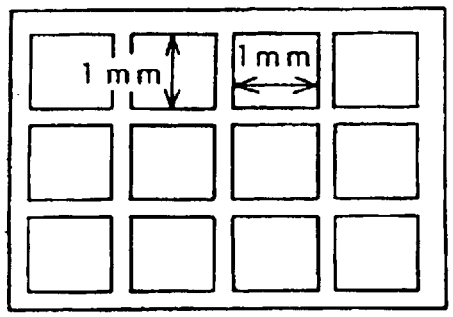

The reformer unit 34 of the first embodiment discussed above has the metal honeycomb structure. A ceramic honeycomb may, however, be applicable for the reformer unit. The ceramic honeycomb structure is described below as a modified example of the first embodiment. Like the reformer unit 34 of the first embodiment, the reformer unit of the modified example has the first reaction unit 80 and the second reaction unit 81. FIG. 6 schematically illustrates the cross sections of the first reaction unit 80 and the second reaction unit 81 of the ceramic honeycomb structure. FIG. 6(A) shows an example of the first reaction unit 80 of the ceramic honeycomb structure. FIG. 6(B) shows another example of the first reaction unit 80 of the ceramic honeycomb structure. FIG. 6(C) shows an example of the second reaction unit 81 of the ceramic honeycomb structure.

The example of FIG. 6(A) reduces the cross section of each cell included in the honeycomb structure and the example of FIG. 6(B) reduces the total number of cells included in the honeycomb structure, in order to reduce the total sectional area of the gas flow conduit compared with the honeycomb structure shown in FIG. 6(C). The reformer unit 34 constructed by combining the first reaction unit 80 having the structure of either FIG. 6(A) or FIG. 6(B) with the second reaction unit 81 shown in FIG. 6(C) exerts the similar effects to those discussed in the first embodiment.

In the embodiment discussed above, the reformer unit 34 is divided into the two internal sections, that is, the first reaction unit 80 and the second reaction unit 81, and the flow velocity of the crude fuel gas in the former section is made different from that in the latter section. The reformer unit may alternatively be divided into three or more internal sections. In this case, the arrangement of making the flow velocity of the gas higher on the upper stream side than on the lower stream side ensures the similar effects to those discussed in the above embodiment.

Figure 7:
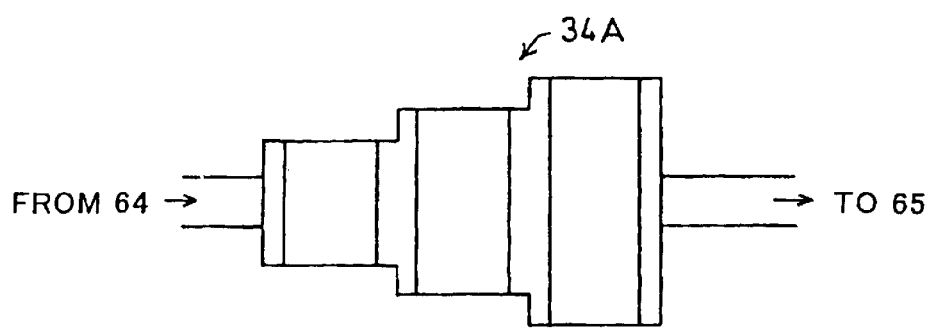
FIG. 7 schematically illustrates the structure of a reformer unit in another modified example of the first embodiment.

In the embodiment discussed above, the total sectional area of the gas flow conduit on the upper stream side is made smaller than the total sectional area on the lower stream side by reducing the number of cells per unit cross section or by reducing the cross section of each cell in the honeycomb structure arranged on the upper stream side of the reformer unit. Other than the structures discussed above, the structure of expanding the sectional area in the reformer unit along the flow of the gas may be applied to make the flow velocity of the gas higher on the upper stream side than on the lower stream side in the reformer unit. FIG. 7 illustrates a reformer unit 34A having such a structure. The reformer unit 34A has three honeycombs having different total sectional areas. The honeycomb structure located on the upper stream side has the smaller total sectional area. This arrangement also makes the flow velocity of the gas higher on the upper stream side than on the lower stream side, thus ensuring the similar effects to those discussed in the above embodiment. The internal temperature distribution of the reformer unit 34A is shown in the graph of FIG. 5. In the arrangement of gradually expanding the total sectional area in the reformer unit like the reformer unit 34A, it is not necessary to vary the number of cells per unit cross section or to vary the cross section of each cell. This arrangement is not restricted to the three sections, but the reformer unit may have any plural number of sections having different total sectional areas to exert the above effects, as long as the total sectional area of the flow conduit gradually expands along the flow of the gas.

Figure 8:
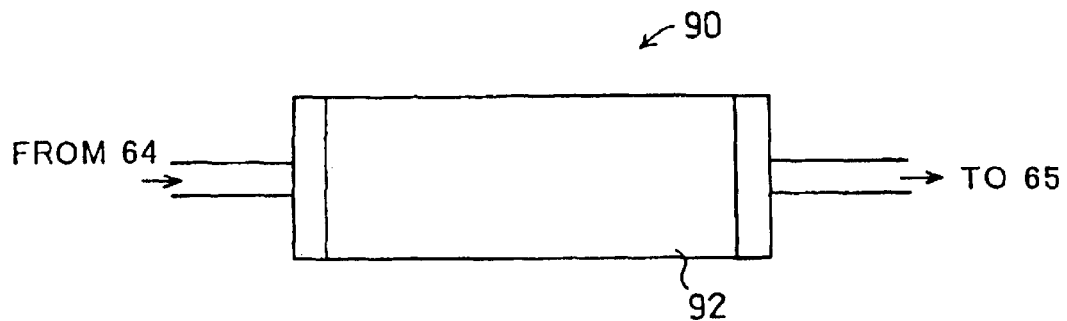
FIG. 8 schematically illustrates the structure of a reformer unit 90 in a second embodiment.
Figure 9A:
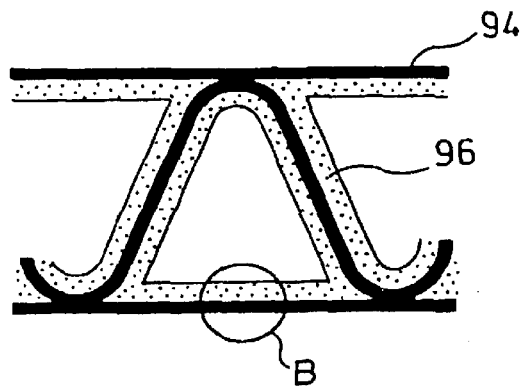
FIG. 9(A) is a sectional view schematically illustrating part of the honeycomb structure of a reaction unit 92.
Figure 9B:
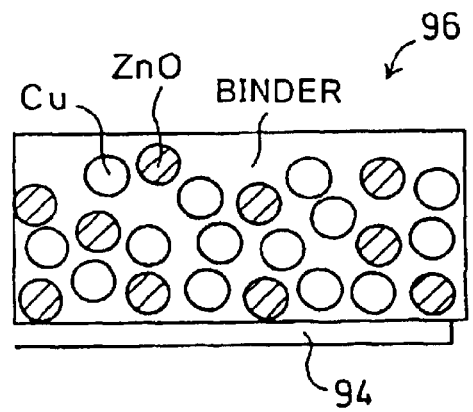
FIG. 9(B) is an enlarged view schematically illustrating part of the surface of the honeycomb structure.

Another structure applied to actively transmit the heat generated by the oxidation reaction proceeding on the upstream side of the reformer unit to the lower stream portion makes the catalyst for accelerating the steam reforming reaction and the oxidation reaction carried on a carrier that is mainly composed of a material having a relatively high thermal conductivity. This structure is described below as a second embodiment. FIG. 8 schematically illustrates the structure of a reformer unit 90 in the second embodiment. The reformer unit 90 of the second embodiment is included in a fuel cells system having a similar structure to that of the fuel cells system 20 shown in FIG. 1. As shown in FIG. 8, the reformer unit 90 has a single reaction unit 92 of a honeycomb structure. FIG. 9(A) is a sectional view schematically illustrating part of the honeycomb structure of the reaction unit 92. FIG. 9(B) is an enlarged view schematically illustrating part of the surface of the honeycomb structure shown in FIG. 9(A) (that is, an encircled area B in FIG. 9(A)).

Like the reformer unit 34 of the first embodiment, the reformer unit 90 of this embodiment is composed of a metal honeycomb. In this embodiment, a stainless steel plate 94 having a thickness of 0.05 mm is used for the honeycomb structure. A catalytic layer 96 having a thickness of approximately 0.05 mm and containing a catalyst for accelerating the steam reforming reaction and the oxidation reaction is formed on the surface of the stainless steel plate 94. In the catalytic layer 96, copper molecules and zinc oxide molecules, which form the Cu—Zn catalyst, are dispersed and carried in a binder having a high thermal conductivity.

The following describes the method of preparing the catalytic layer 96. The process first prepares CuO—ZnO powder as the catalyst material by the known coprecipitation technique, and mixes 5% of an alumina sol as a binder and a material having the higher thermal conductivity than aluminum oxide with the CuO—ZnO powder. Available examples of the material having the higher thermal conductivity include nitrides, for example, aluminum nitride (AlN) and titanium nitride (TiN), carbides, for example, silicon carbide (SiC) and boron carbide ($B_4C$), and graphite. The preferable load ranges from 5 to 30%. Among these materials having the high thermal conductivity, AlN, SiC, and graphite respectively show the thermal conductivities of 0.07 cal/cm/s/° C., 0.1 cal/cm/s/° C., and 0.301 cal/cm/s° C., which are all higher than the thermal conductivity of aluminum oxide conventionally used (0.02 cal/cm/s/° C.).

The process then adds water to the mixture, grinds and blends the mixture with a ball mill, applies the ground mixture onto the stainless steel plate 94, and causes the stainless steel plate 94 with the mixture thereon to undergo the heating process and the reduction process. This procedure produces the Cu—Zn catalyst mainly consisting of copper molecules and zinc oxide molecules from the catalyst material. The Cu—Zn catalyst is dispersed and carried in the binder containing the material having the high thermal conductivity to form the catalytic layer 96.

The reformer unit 90 of the above configuration is applied to the fuel cells system 20. When a supply of the crude fuel gas is flown into the reformer unit 90, the oxidation reaction vigorously proceeds to generate a large quantity of heat on the upstream side receiving the supply of oxygen as described previously. The heat generated by the oxidation reaction is not only utilized for the steam reforming reaction proceeding on the upper stream side but quickly transmitted through the binder containing the material having the high thermal conductivity. Part of the beat transmitted through the binder is further transmitted to the honeycomb base member composed of stainless steel having the high thermal conductivity. The heat transmitted to the honeycomb base member of stainless steel passes through the honeycomb base member to the lower stream portion. The residual heat not transmitted to the honeycomb base member passes through the binder to the lower stream portion. The heat is transmitted to the lower stream side in the reformer unit 90 in this manner and is utilized for the steam reforming reaction proceeding on the lower stream side.

Figure 10:
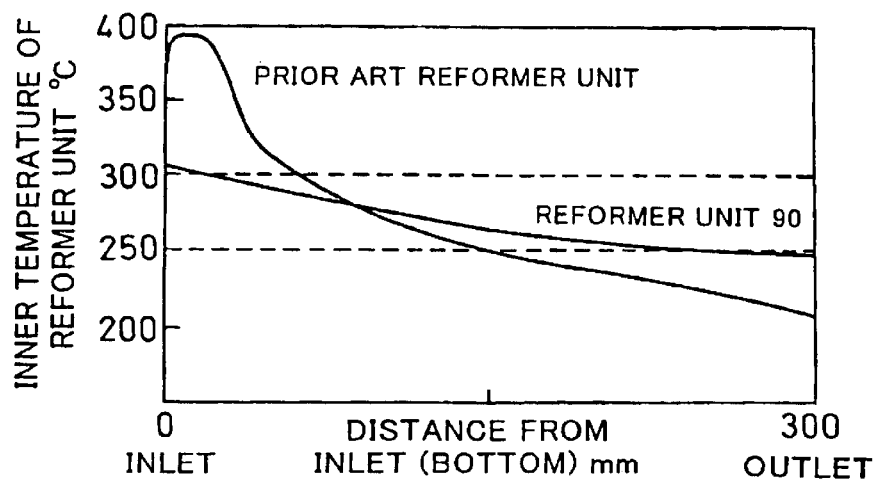
FIG. 10 is a graph showing internal temperature distributions of the reformer unit 90 and a prior art reformer unit.

In the reformer unit 90 of this embodiment, the catalyst is carried in the binder having the high thermal conductivity, so that the heat generated by the oxidation reaction on the upstream side is quickly transmitted to the lower stream portion to prevent an abrupt temperature rise on the upstream side. FIG. 10 is a graph showing the internal temperature distributions along the flow of the gas with regard to the reformer unit 90 of this embodiment and a prior art reformer unit using a binder that does not contain the material having the high thermal conductivity. Unlike the prior art reformer unit, in the reformer unit 90 of this embodiment, the heat generated by the oxidation reaction proceeding on the upstream side is quickly transmitted to the lower stream portion. There is accordingly no abrupt temperature rise on the upper stream side, and the internal temperature of the reformer unit is favorably kept in the temperature range of 250 to 300° C. In the reformer unit 90 of this embodiment, there is no abrupt temperature rise in the vicinity of the inlet. This advantageously prevents the potential troubles due to the temperature rise, for example, deterioration of the catalyst and formation of by-products. The reduced deterioration of the catalyst significantly improves the durability of the reformer unit. The reformer unit 90 of this embodiment is durable over 5000 hours, whereas the prior art reformer unit whose temperature distribution is shown in FIG. 10 has the duration of approximately 200 hours.

As described above, in the reformer unit 90 of this embodiment, the heat produced by the oxidation reaction proceeding on the upper stream side is quickly transmitted to the lower stream portion. Unlike the prior art reformer unit, there is accordingly no excessive temperature drop in the downstream portion of the reformer unit 90. Namely the lower stream portion of the reformer unit 90 is kept in the highly active state of the steam reforming reaction. This ensures the sufficient utilization of the catalyst present on the lower stream side and enhances the rate of the steam reforming reaction. This arrangement enables size reduction of the reformer unit.

In the structure of the second embodiment, the catalytic layer 96 using the binder that contains the material having the high thermal conductivity is formed on the honeycomb base member made of the stainless steel plate having the excellent thermal conductivity. Both the catalytic layer 96 and the stainless steel plate 94 conduct heat from the upper stream side to the lower stream side. This effectively attains the high efficiency of heat conduction. In one modified structure, the catalytic layer 96 may be formed on the ceramic honeycomb base member. In another modified structure, the catalyst may be mixed with a binder having the high thermal conductivity, formed to pellets, and packed into the reformer unit. These modified structures also assure the effects caused by the enhanced thermal conductivity from the upper stream side to the lower stream side.

Figure 11:
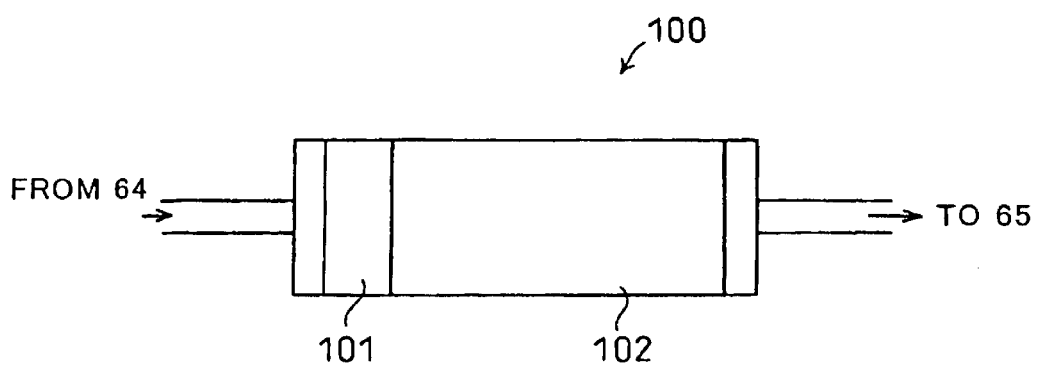
FIG. 11 schematically illustrates the structure of a reformer unit 100 in a third embodiment.

The structure of suppressing the activity of the oxidation reaction on the upper stream side by making the existing quantity of the catalyst carried on the upper stream side smaller than that carried on the lower stream side in the reformer unit is described below as a third embodiment. FIG. 11 schematically illustrates the structure of a reformer unit 100 in the third embodiment. The reformer unit 100 of the third embodiment is included in a fuel cells system having a similar structure to that of the fuel cells system 20 shown in FIG. 1. As shown in FIG. 11, the reformer unit 100 has a first reaction unit 101 and a second reaction unit 102. The first reaction unit 101 and the second reaction unit 102 have the honeycomb structures of a similar shape. The Cu—Zn catalyst is carried on the surface of the honeycomb structure as discussed in the above embodiments. The quantity of the catalyst carried on the honeycomb structure of the second reaction unit 102 is greater than that carried on the honeycomb structure of the first reaction unit 101. The first reaction unit 101 has the Cu—Zn catalyst carried thereon at the rate of 50 g/l (the quantity of the catalyst per unit volume of the honeycomb), whereas the second reaction unit 102 has the Cu—Zn catalyst carried thereon at the rate of 180 g/l.

In the reformer unit 100 of the above configuration, since the first reaction unit 101 on the upper stream side has a smaller quantity of the catalyst carried thereon, the progress of the oxidation reaction is suppressed on the side receiving the supply of the crude fuel gas and the supply of the air. This arrangement prevents the oxidation reaction from abruptly proceeding on the upper stream side of the reformer unit but extends the area of the vigorous oxidation reaction to the lower stream portion. This effectively prevents an abrupt temperature rise on the upper stream side.

Figure 12:
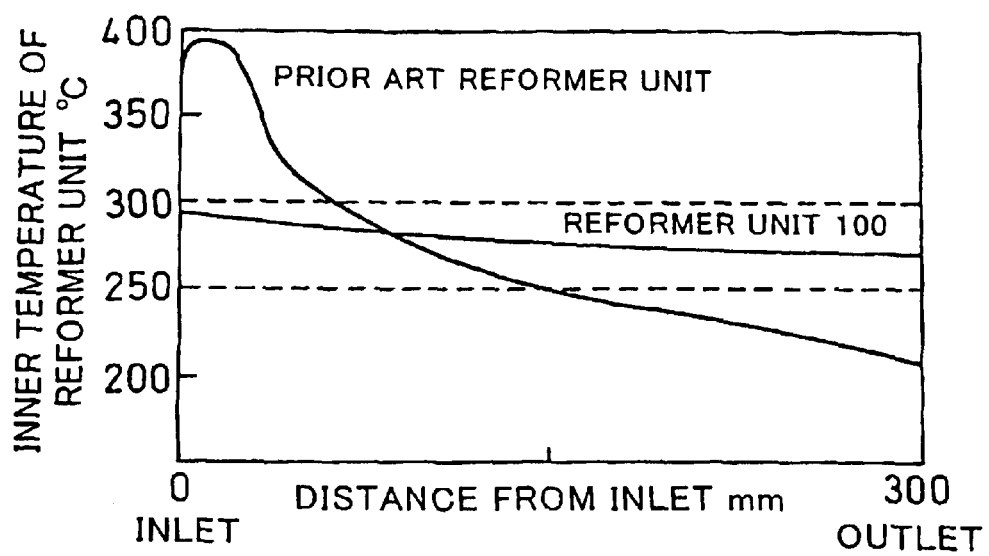
FIG. 12 is a graph showing internal temperature distributions of the reformer unit 100 and a prior art reformer unit.

FIG. 12 is a graph showing the internal temperature distributions along the flow of the gas with regard to the reformer unit 100 of this embodiment and a prior art reformer unit of the honeycomb structures that have an identical quantity of the catalyst carried both on the upper stream side and on the lower stream side. Unlike the prior art reformer unit, in the reformer unit 100 of this embodiment, the progress of the oxidation reaction is suppressed on the upper stream side. There is accordingly no abrupt temperature rise on the upper stream side, and the internal temperature of the reformer unit is favorably kept in the temperature range of 250 to 300° C. In the reformer unit 100 of this embodiment, there is no abrupt temperature rise in the vicinity of the inlet. This advantageously prevents the potential troubles due to the temperature rise, for example, deterioration of the catalyst and formation of by-products. The reduced deterioration of the catalyst significantly improves the durability of the reformer unit. The reformer unit 100 of this embodiment is durable over 5000 hours, whereas the prior art reformer unit whose temperature distribution is shown in FIG. 12 has the duration of approximately 200 hours.

As described above, in the reformer unit 100 of this embodiment, the area of the vigorous progress of the exothermic oxidation reaction is extended to the lower stream portion. Unlike the prior art reformer unit, there is accordingly no excessive temperature drop in the downstream portion of the reformer unit 100. Namely the lower stream portion of the reformer unit 100 is kept in the highly active state of the steam reforming reaction. This ensures the sufficient utilization of the catalyst present on the lower stream side and enhances the rate of the steam reforming reaction. This arrangement enables size reduction of the reformer unit.

In the structure of the third embodiment, the quantity of the catalyst carried on the reformer unit 100 is varied in two stages. The quantity of the catalyst may, however, be varied in three or more stages. The effects discussed above are attained by reducing the quantity of the catalyst carried on the upper stream side. The arrangement of making the smaller quantity of the catalyst carried on the upper stream side and regulating the number of the stages in which the quantity of the catalyst is varied enables the further homogenization of the internal temperature of the reformer unit and enhances the effects discussed above.

In the structure of the third embodiment, the steam reforming reaction and the oxidation reaction are accelerated by the identical Cu—Zn catalyst. In a modified structure, the steam reforming reaction and the oxidation reaction may be accelerated by different catalyst. In the latter case, the arrangement reduces only the quantity of the catalyst for accelerating the oxidation reaction on the upper stream side, instead of varying the total quantity of the catalysts between the upper stream side and the lower stream side.

Figure 13:
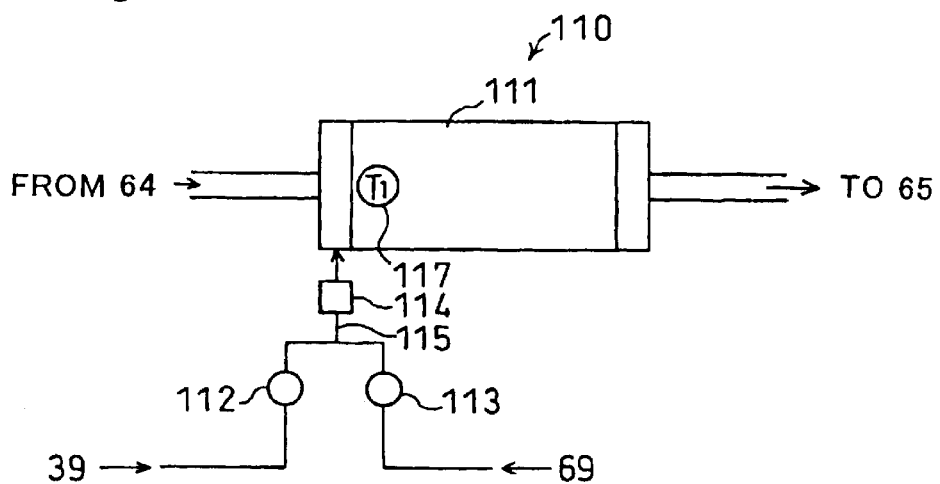
FIG. 13 schematically illustrates the structure of a reformer unit 110 in a fourth embodiment.

The structure of lowering the concentration of oxygen included in the gas supplied to the reformer unit to suppress the activity of the oxidation reaction on the upper stream side and increasing the flow velocity of the gas supply to transmit the heat generated by the oxidation reaction on the upper stream side to the lower stream portion is described as a fourth embodiment. FIG. 13 schematically illustrates the structure of a reformer unit 110 in the fourth embodiment. The reformer unit 110 of the fourth embodiment is included in a fuel cells system having a similar structure to that of the fuel cells system 20 shown in FIG. 1 except some differences. In the following description, the like numerals denote the like constituents.

In the structure of the embodiment discussed above, the air supply conduit 39, through which the air is fed from the blower 38 to the reformer unit, joins the second fuel supply conduit 64. The crude fuel gas is accordingly mixed with the air before being supplied to the reformer unit. In the fuel cells system including the reformer unit 110 of the fourth embodiment, on the other hand, the air supply conduit 39 is directly connected to the reformer unit 110. In the fuel cells system including the reformer unit 110 of this embodiment, the oxidizing gas exhaust discharged from the fuel cells 40 to the oxidizing gas exhaust conduit 69 is also flown into the reformer unit 110, together with the air taken in by the blower 38. The normal air contains oxygen of approximately 20%. Since a certain amount of oxygen is consumed by the electrochemical reactions in the fuel cells, the oxidizing gas exhaust discharged from the fuel cells has the less content of oxygen than the air. The concentration of oxygen included in the oxidizing gas exhaust depends upon the excess ratio of oxygen (that is, the ratio of the quantity of oxygen included in the air actually supplied to the quantity of oxygen theoretically required) in the oxidizing gas supplied to the fuel cells. In the fuel cells system of this embodiment, the concentration of oxygen included in the oxidizing gas exhaust is approximately 10%. The mixed supply of the air and the oxidizing gas exhaust to the reformer unit 110 thus enables the concentration of oxygen supplied to the reformer unit 110 to be regulated in the range of approximately 10% to approximately 20%.

The structure of the reformer unit 110 is described in detail with referring to FIG. 13. The reformer unit 110 includes a single reaction unit 111 of the honeycomb structure that has the Cu—Zn catalyst carried on the surface thereof. The air supply conduit 39 joins the oxidizing gas exhaust conduit 69 to form a second air supply conduit 115. The gaseous mixture of the air and the oxidizing gas exhaust (hereinafter referred to as the air mixture) flows through the second air supply conduit 115 and is supplied to the upper stream side of the reformer unit 110, which receives the supply of the crude fuel gas flown through the second fuel supply conduit 64. A mass flow controller 112 is provided in the air supply conduit 39 at a specific position in the vicinity of the meeting point to the second air supply conduit 115, and regulates the quantity of the air flown to the second air supply conduit 115. In a similar manner, a mass flow controller 113 is provided in the oxidizing gas exhaust conduit 69 at a specific position in the vicinity of the meeting point to the second air supply conduit 115, and regulates the quantity of the oxidizing gas exhaust flown to the second air supply conduit 115. These mass flow controllers 112 and 113 are connected to the control unit 50 described previously. The control unit 50 regulates the mixing ratio of the air supplied through the air supply conduit 39 to the oxidizing gas exhaust supplied through the oxidizing gas exhaust conduit 69. An oxygen concentration sensor 114 is disposed in the second air supply conduit 115. The oxygen concentration sensor 114 is also connected to the control unit 50. Information regarding the concentration of oxygen included in the air mixture is input into the control unit 50. A temperature sensor 117 is disposed in the reaction unit 111 at a predetermined position apart from the upstream end thereof. The temperature sensor 117 is also connected to the control unit 50. Information regarding the temperature in the reaction unit 111 is input into the control unit 50.

The arrangement of this embodiment lowers the concentration of oxygen included in the oxygen-containing air mixture supplied to the reformer unit 110, while enhancing the flow velocity of the gas flowing through the reaction unit 111. This arrangement effectively prevents an abrupt temperature rise on the upper stream side of the reformer unit 110. The lowered concentration of oxygen included in the air mixture supplied to the reformer unit 110 lowers the concentration of oxygen included in the gas flowing through the inside of the reaction unit 111 and suppresses the activity of the oxidation reaction on the upper stream side, thus preventing an abrupt temperature rise on the upper stream side. The lowered concentration of oxygen included in the oxygen-containing air mixture increases the flow rate of the air mixture supplied to the reaction unit 111 and thereby enhances the flow velocity of the gas flowing through the inside of the reaction unit 111. This arrangement enables oxygen to be carried to the lower stream portion before oxygen is used up by the oxidation reaction proceeding on the upstream side and accordingly extends the area of the vigorous oxidation reaction to the lower stream portion. The enhanced flow velocity of the gas flowing through the inside of the reaction unit 111 enables the heat evolved by the oxidation reaction proceeding on the upstream side to be quickly transmitted to the lower stream portion and thus effectively prevents an excessive temperature rise on the upper stream side of the reaction unit.

Figure 14:
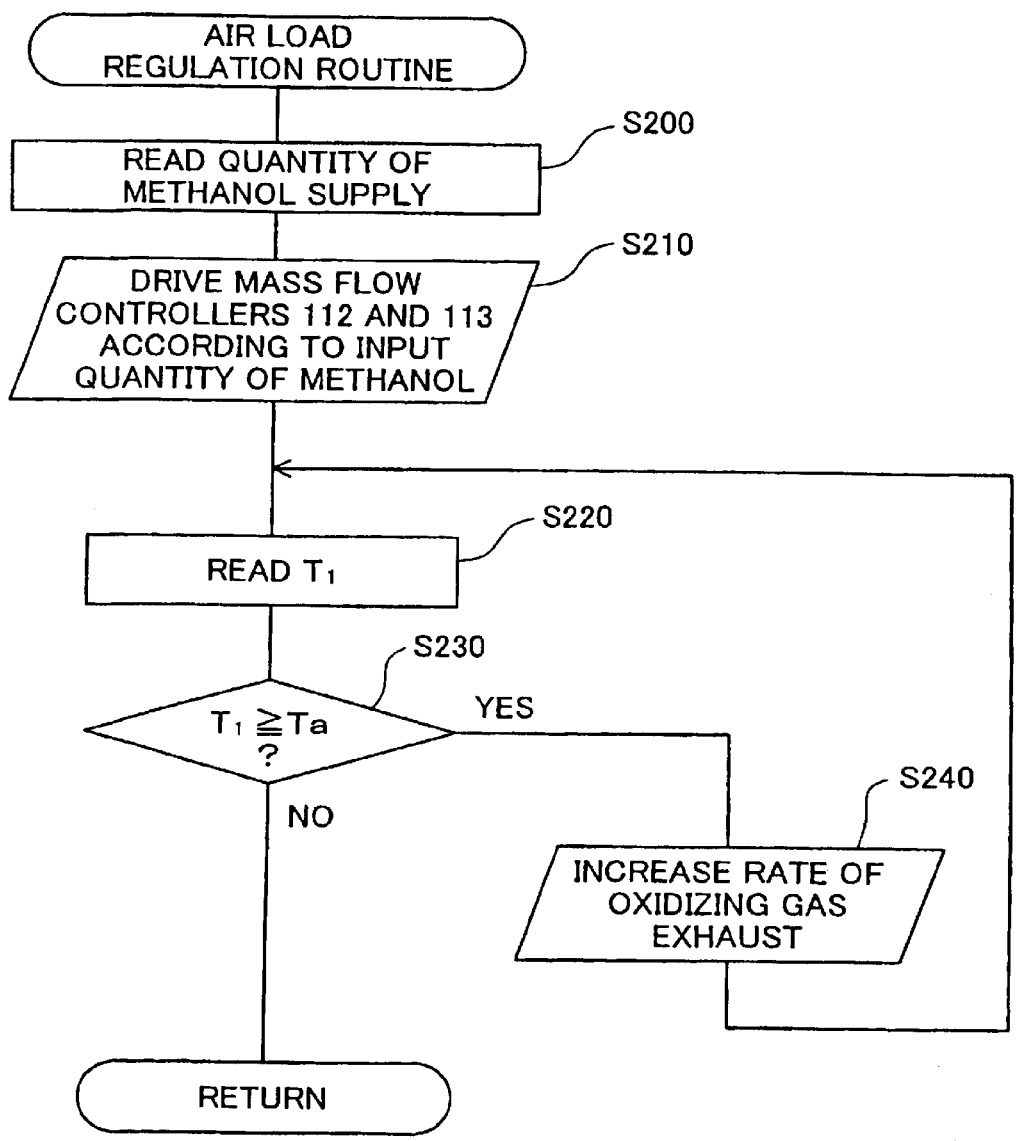
FIG. 14 is a flowchart showing an air load regulation routine executed in a fuel cells system including the reformer unit 110.

FIG. 14 is a flowchart showing an air load regulation routine executed in the fuel cells system including the reformer unit 110 of this embodiment. In the fuel cells system including the reformer unit 110, when it is determined that the internal temperature of the reformer unit 110 sufficiently rises to the stationary state after an operation of a non-illustrated start switch to give an instruction of starting the fuel cells system, this routine is repeatedly executed at predetermined time intervals.

When the program enters this routine, the CPU 54 first reads the quantity of methanol included in the crude fuel gas supplied to the reformer unit 110, based on the driving amount of the second pump 71 disposed in the methanol flow conduit 60 (step S200). The CPU 54 subsequently calculates the quantity of oxygen to be supplied to the reformer unit 110 corresponding to the input quantity of methanol and drives the mass flow controllers 112 and 113 to enable a supply of the required quantity of oxygen (step S210). The specification of the quantity of methanol supplied to the reformer unit determines the quantity of oxygen required to make the amount of heat required for the steam reforming reaction balance the amount of heat evolved by the oxidation reaction. The mass flow controllers 112 and 113 are accordingly driven to supply the air containing the calculated quantity of oxygen to the reformer unit 110. The driving amount of each mass flow controller to supply the required quantity of oxygen is set in advance as a reference driving amount corresponding to each quantity of oxygen supply and is stored in the control unit 50.

After driving the mass flow controllers 112 and 113 to start a supply of the air mixture containing the required quantity of oxygen to the reformer unit 110, the CPU 54 reads an internal temperature T1 on the upstream side of the reaction unit 111 from the temperature sensor 117 (step S220). The internal temperature T1 is then compared with a predetermined reference temperature Ta (step S230). The predetermined reference temperature Ta is set in advance as an upper limit of the internal temperature T1 on the upstream side and is stored in the control unit 50. In this embodiment, the predetermined reference temperature Ta is set equal to 300° C.

In the case where the observed internal temperature T1 on the upper stream side is lower than the predetermined reference temperature Ta at step S230, it is determined that the internal temperature T1 on the upstream side of the reaction unit 111 is a sufficiently low level. The program then exits from this routine. In the case where the observed internal temperature T1 on the upper stream side is not lower than the predetermined reference temperature Ta, on the other hand, the CPU 54 decreases the driving amount of the mass flow controller 112 while increasing the driving amount of he mass flow controller 113. This increases the fraction of the oxidizing gas exhaust included in the air mixture supplied to the reformer unit 110 without changing the flow rate of oxygen supply per unit time (step S240). The technique of this embodiment sets in advance a minimum unit of variation with regard to the fraction of the oxidizing gas exhaust, that is, with regard to the concentration of oxygen included in the air mixture supplied to the reformer unit 110. The procedure of step S240 lowers the concentration of oxygen by every minimum unit of variation. Another applicable procedure may regulate the fraction of the oxidizing gas exhaust according to the difference between the internal temperature T1 and the predetermined reference temperature Ta. The increased fraction of the oxidizing gas exhaust lowers the total concentration of oxygen included in the gas supplied to the reformer unit 110, thus suppressing the oxidation reaction proceeding on the upper stream side. The increased fraction of the oxidizing gas exhaust without changing the flow rate of oxygen supply per unit time increases the flow rate of the air mixture supplied to the reformer unit 110 and enhances the flow velocity of the gas passing through the inside of the reformer unit 110. This enables the heat evolved by the oxidation reaction proceeding on the upstream side to be more quickly transmitted to the lower stream portion. Namely the execution of the processing at step S240 effectively lowers the internal temperature T1 on the upper stream side of the reaction unit 111.

After varying the fraction of the oxidizing gas exhaust at step S240, the program returns to the series of processing of and after step S220 to read the observed internal temperature T1 and compare the internal temperature T1 with the predetermined reference temperature Ta. When the internal temperature T1 is lower than the predetermined reference temperature Ta at step S230, it is determined that the fraction of the oxidizing gas exhaust included in the air mixture supplied to the reformer unit 110 is an adequate level and that the internal temperature T1 on the upper stream side of the reaction unit 111 is a sufficiently low level. The program then exits from this routine.

In the fuel cells system including the reformer unit 110 of this embodiment, the oxygen concentration sensor 114 is disposed in the second air supply conduit 115 as described above. The concentration of oxygen included in the air mixture supplied to the reformer unit 110 is corrected, based on the measurement of the oxygen concentration sensor 114. In accordance with a concrete procedure, when the mass flow controllers are driven either at step S210 or at step S240 in the air load regulation routine, the concentration of oxygen included in the air mixture supplied to the reformer unit 110 is measured with the oxygen concentration sensor 114. The driving amounts of the mass flow controllers are corrected, based on the result of the measurement.

The fuel cells system including the reformer unit 110 of the fourth embodiment thus constructed regulates the concentration of oxygen included in the air mixture supplied to the reformer unit 110. The decrease in concentration of oxygen included in the air mixture effectively suppresses the progress of the oxidation reaction on the feeding side that receives the supply of the crude fuel gas and the supply of the air mixture. This prevents an abrupt temperature rise on the upper stream side. The arrangement of lowering the concentration of oxygen included in the air mixture while keeping a fixed quantity of oxygen supply per unit time to the reformer unit 110 increases the flow rate of the air mixture and enhances the flow velocity of the gas flowing through the inside of the reaction unit 111. This enables the heat produced by the oxidation reaction proceeding on the upstream side to be quickly transmitted to the lower stream portion, thus preventing an excessive temperature rise on the upper stream side.

The suppressed oxidation reaction on the upper stream side extends the area of the vigorous oxidation reaction to the lower stream portion. Unlike the prior art reformer unit, there is accordingly no excessive temperature drop in the downstream portion of the reformer unit 110. The enhanced flow velocity of the gas flowing through the inside of the reaction unit 111 enables the heat evolved on the upstream side to be quickly transmitted to the lower stream portion. This also contributes to prevention of a temperature drop in the lower stream portion. Namely the lower stream portion of the reformer unit 110 is kept in the highly active state of the steam reforming reaction. This ensures the sufficient utilization of the catalyst present on the lower stream side and enhances the rate of the steam reforming reaction. This arrangement enables size reduction of the reformer unit.

The arrangement of the fourth embodiment specifies the quantity of methanol included in the crude fuel gas supplied to the reformer unit 110 based on the driving amount of the second pump 71 disposed in the methanol flow conduit 60, and determines whether or not the oxidation reaction excessively proceeds on the upper stream side based on the result of the measurement of the temperature sensor 117. The specification of the quantity of methanol supplied to the reformer unit 110 and the determination regarding the progress of the oxidation reaction and the steam reforming reaction in the reformer unit 110 may be carried out by utilizing the results of measurements other than those mentioned above or in addition to those mentioned above. For example, a sensor that analyzes a component of the gas flowing through the third fuel supply conduit 65 may be disposed in the third fuel supply conduit 65, in order to determine the progress of the steam reforming reaction and the oxidation reaction in the reformer unit 110. The sensor measures the quantity of, for example, methanol, hydrogen, carbon dioxide, or oxygen included in the gaseous fuel discharged from the reformer unit 110. The progress of the steam reforming reaction and the oxidation reaction in the reformer unit 110 may be determined by additionally utilizing the results of this measurement.

Figure 15:
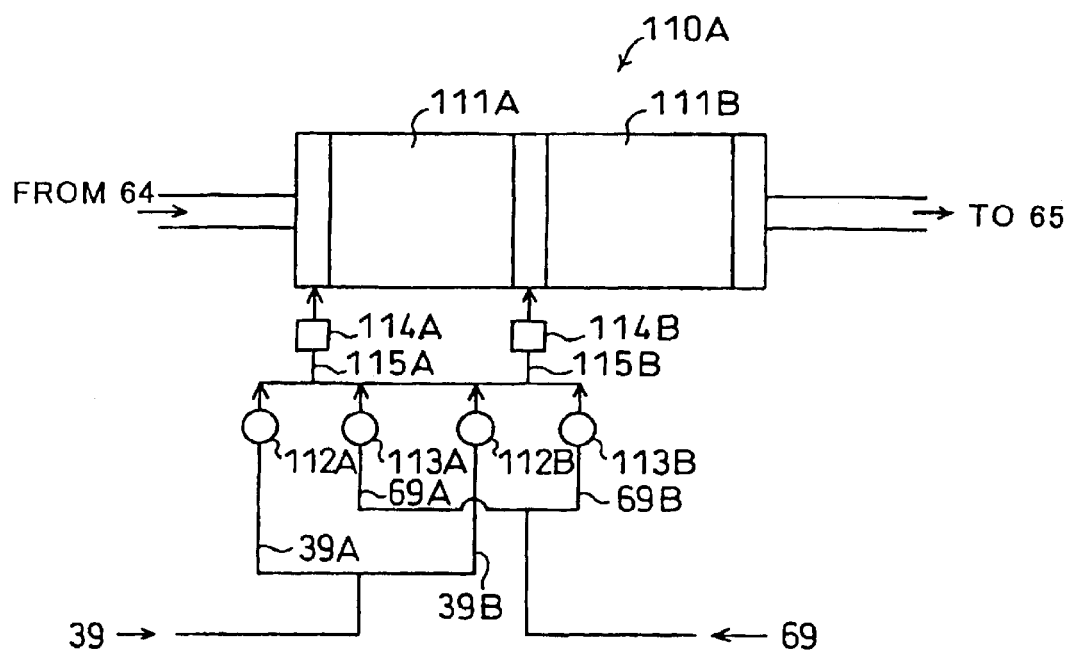
FIG. 15 schematically illustrates the structure of a reformer unit 110A in a modified example of the fourth embodiment.

In the structure of the fourth embodiment, the air mixture is supplied only to the upstream side of the reformer unit 110. Another preferable structure feeds the supply of the air mixture to a plurality of different places. This structure is described below as a modified example of the fourth embodiment. FIG. 15 schematically illustrates the structure of a reformer unit 110A in the modified example of the fourth embodiment. The reformer unit 110A includes two reaction units 111A and 111B, each receiving a supply of the air mixture. The flow of the crude fuel gas supplied to the reformer unit 110A passes through the reaction units 111A and 111B in this sequence. The air supply conduit 39 and the oxidizing gas exhaust conduit 69, through which the air and the oxidizing gas exhaust are flown into the reformer unit 110A, respectively branch off to air branch paths 39A and 39B and to oxidizing gas exhaust branch paths 69A and 69B. The air branch path 39A joins the oxidizing gas exhaust branch path 69A to form a second air supply conduit 115A, through which the air mixture is supplied to the reaction unit 111A on the upper stream side. The air branch path 39B, on the other hand, joins the oxidizing gas exhaust branch path 69B to form a second air supply conduit 115B, through which the air mixture is supplied to the reaction unit 111B on the lower stream side. In the same manner as discussed in the fourth embodiment, the flow rates and the concentrations of oxygen included in the supplies of the air mixture to the respective reaction units are regulated by adjusting the driving amounts of mass flow controllers 112A, 112B, 113A, and 113B, based on the quantity of methanol supplied to the reformer unit 110A and the temperatures on the upper stream side of the respective reaction units.

The reformer unit 110A of this configuration supplies the air mixture in a divisional manner and decreases the quantity of oxygen included in each supply of the gas, thus more effectively preventing a local excessive temperature rise. The reformer unit is divided into the plurality of reaction units, and the supply of the air mixture is flown into each reaction unit. This regulates the temperature distribution in the reformer unit with the higher accuracy and enables the inside of the reformer unit to be more readily kept in the desirable temperature range.

Figure 16:
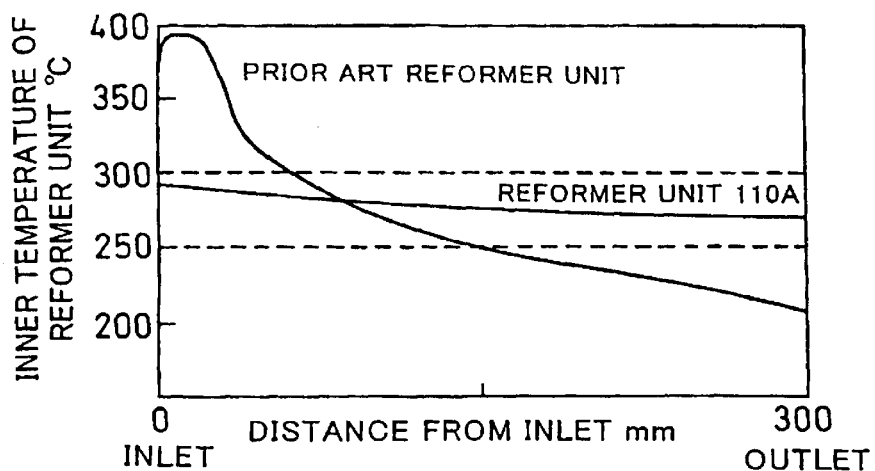
FIG. 16 is a graph showing internal temperature distributions of the reformer unit 110A and a prior art reformer unit.

FIG. 16 is a graph showing the internal temperature distributions along the flow of the gas with regard to the reformer unit 110A described above and a prior art reformer unit that receives a supply of the normal air as an oxygen source required for the oxidation reaction. Unlike the prior art reformer unit, in the reformer unit 110A, the progress of the oxidation reaction on the upstream side is suppressed. There is accordingly no abrupt temperature rise on the upper stream side, and the internal temperature of the reformer unit is favorably kept in the temperature range of 250 to 300° C. As described above, in the reformer units 110 and 110A of this embodiment, there is no abrupt temperature rise in the vicinity of the inlet. This advantageously prevents the potential troubles due to the temperature rise, for example, deterioration of the catalyst and formation of by-products. Like the embodiments discussed above, this arrangement significantly improves the durability of the reformer unit.

The reformer units 110 and 110A of this embodiment have the reaction units of the honeycomb structures. In a modified structure, the reformer unit may be filled with pellets with the catalyst carried thereon. This modified structure also exerts the similar effects by regulating the concentration of oxygen included in the air mixture supplied to the reformer unit as the oxygen source required for the oxidation reaction.

The third and the fourth embodiments discussed above suppress the activity of the oxidation reaction proceeding on the upper stream side of the reformer unit, in order to prevent an abrupt temperature rise on the upper stream side. In accordance with another possible structure, the area of the vigorous oxidation reaction and the area of the inactive oxidation reaction are changeable in the catalytic section. This arrangement varies the area of heat evolution and thus prevents a local excessive temperature rise. The reformer unit of such structure, in which the inlet receiving the supplies of the crude fuel gas and oxygen is changeable with the outlet outputting the hydrogen rich gaseous fuel, is described below as a fifth embodiment.

Figure 17:
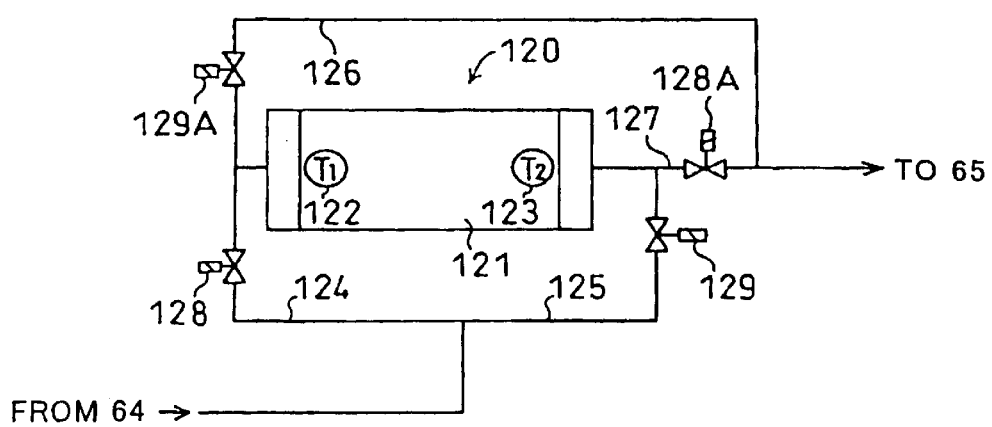
FIG. 17 schematically illustrates the structure of a reformer unit 120 in a fifth embodiment.

FIG. 17 schematically illustrates the structure of a reformer unit 120 in the fifth embodiment. The reformer unit 120 of the fifth embodiment is included in a fuel cells system having a similar structure to that of the fuel cells system 20 shown in FIG. 1. As shown in FIG. 17, the reformer unit 120 has a single reaction unit 121 of a honeycomb structure with the Cu—Zn catalyst carried on the surface thereof. The reaction unit 121 has temperature sensors 122 and 123 that measure the internal temperature at both ends of the reaction unit 121. These temperature sensors are connected to the control unit 50. Pieces of information regarding the internal temperature at both ends of the reaction unit 121 are input into the control unit 50.

In the structure of this embodiment, the second fuel supply conduit 64 branches off to a first supply branch path 124 and a second supply branch path 125, which are connected to the respective ends of the reformer unit 120. One end of the reformer unit 120 connects with a first discharge branch path 126 as well as with the first supply branch path 124. The other end of the reformer unit 120 connects with a second discharge branch path 127 as well as with the second supply branch path 125. The first discharge branch path 126 joins the second discharge branch path 127 to form the third fuel supply conduit 65, which leads to the CO reduction unit 36. Solenoid valves 128, 129, 128A, and 129A are respectively provided in the first supply branch path 124, the second supply branch path 125, the first discharge branch path 126, and the second discharge branch path 127. These solenoid valves 128, 129, 128A, and 129A are connected to the control unit 50, which control the on-off state of these solenoid valves.

In the reformer unit 120 of this structure, the on-off state of the solenoid valves is changeable between a first state, in which the solenoid valves 128 and 128A are in ON position and the solenoid valves 129 and 129A are in OFF position, and a second state, in which the solenoid valves 129 and 129A are in ON position and the solenoid valves 128 and 128A are in OFF position. When the on-off state of the solenoid valves is in the first state, the supply of the crude fuel gas flown from the second fuel supply conduit 64 passes through the reaction unit 121 from left to right in the drawing of FIG. 13. When the on-off state of the solenoid valves is in the second state, on the other hand, the supply of the crude fuel gas passes through the reaction unit 121 from right to left in the drawing of FIG. 13.

Figure 18:
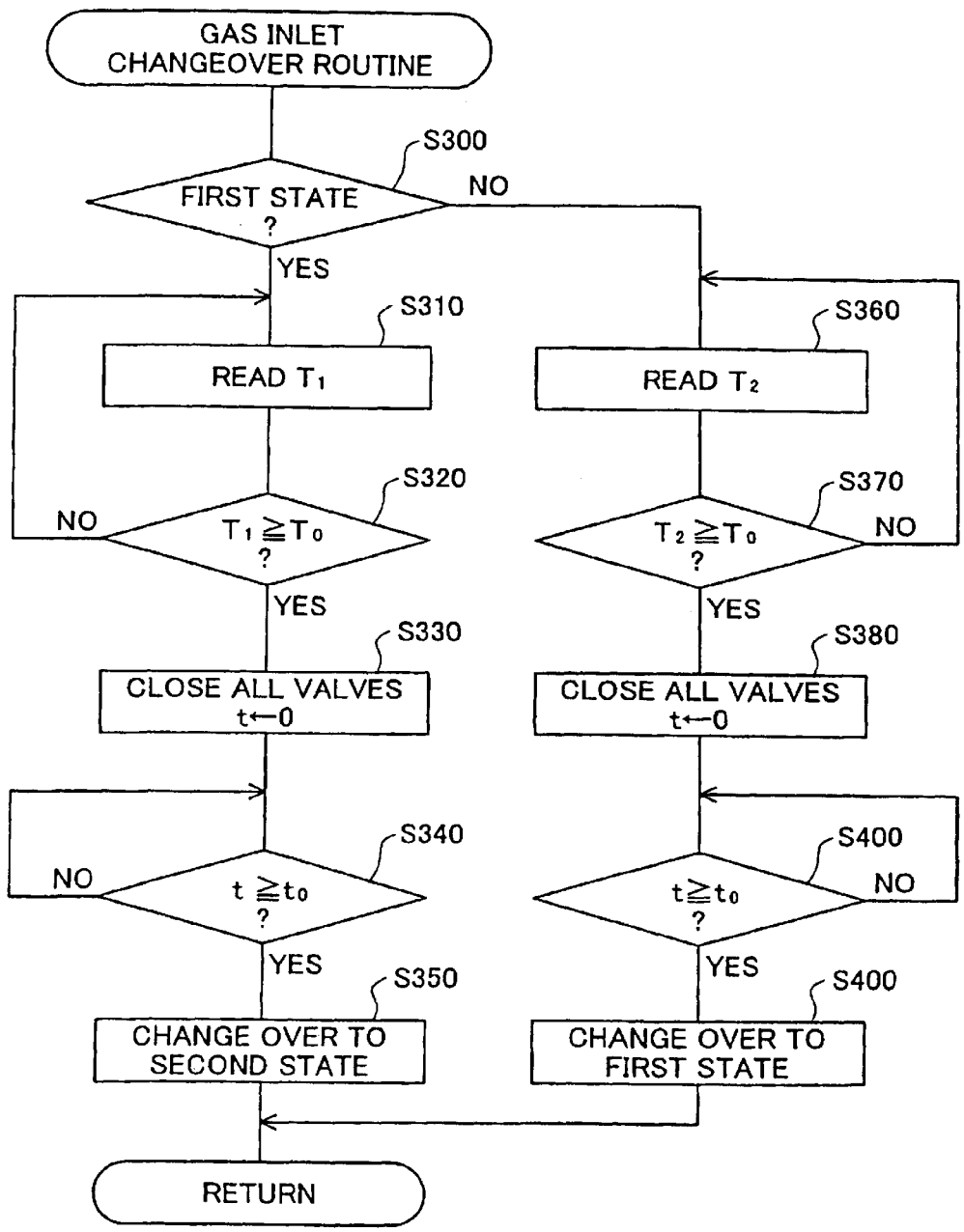
FIG. 18 is a flowchart showing a gas inlet changeover routine executed in the fuel cells system 20.

FIG. 18 is a flowchart showing a gas inlet changeover routine executed in the fuel cells system 20 to change over the inlet of the gas in the reformer unit 120. When a non-illustrated start switch is operated to give an instruction of starting the fuel cells system 20, this routine is repeatedly executed at predetermined time intervals When the program enters this routine, the CPU 54 first determines whether or not the on-off state of the solenoid valves is in the first state (step S300). In the case of the first state, the CPU 54 reads an internal temperature T1 at the upper stream end, which receives the supply of the gas, from the temperature sensor 122 (step S310). The observed internal temperature T1 is compared with a predetermined reference temperature T0

(step S320). The predetermined reference temperature T0 is set in advance as a criterion showing that the internal temperature of the reaction unit 121 is rising to an undesired level, and is stored in the control unit 50. In this embodiment, the predetermined reference temperature T0 is set equal to 300° C. In the case where the internal temperature T1 has not yet reached the reference temperature T0 at step S320, the program returns to step S310 and repeats the process of reading and comparing the internal temperature until the internal temperature T1 reaches the reference temperature T0.

When it is determined at step S320 that the internal temperature T1 is not lower than the reference temperature T0, the CPU 54 sets all the solenoid valves in OFF position and starts measuring an elapse of time t with a non-illustrated timer included in the control unit 50 (step S330). The process of setting all the solenoid valves in OFF position at step S330 stops the gas flow in and out of the reformer unit 120 and causes the steam reforming reaction and the oxidation reaction to continue with the remaining crude fuel gas in the reaction unit 121. The elapse of time t is compared with a predetermined reference time t0 (step S340). The predetermined reference time t0 is set in advance as a time required for completion of the steam reforming reaction and the oxidation reaction using the remaining crude fuel gas in the reformer unit 120 and is stored in the control unit 50. In this embodiment, the predetermined reference time t0 is set equal to 1 sec. In the case where the elapse of time t has not yet reached the predetermined reference time t0 at step S340, the process of step S340 is repeatedly executed until the predetermined reference time t0 elapses. In the case where the elapse of time t reaches the predetermined reference time t0 at step S340, the CPU 54 outputs a driving signal to the selected solenoid valves and sets the on-off state of the solenoid valves in the second state (step S350). The program then exits from this routine.

In the case of the negative answer at step S300, it is determined that the reformer unit 120 is in the second state. The CPU 54 reads an internal temperature T2 at the upper stream end, which receives the supply of the gas, from the temperature sensor 123 (step S360). The program subsequently carries out the processing of steps S370 through S390, which is similar to the processing of steps S320 through S340 discussed above. When the internal temperature T2 reaches the predetermined reference value T0 (300° C. in this embodiment) with the progress of the oxidation reaction, all the solenoid valves are set in OFF position for the predetermined time period (1 sec in this embodiment). The program then sets the on-off state of the solenoid valves in the first state (step S400), and exits from this routine.

As mentioned above, the gas inlet changeover routine is repeatedly executed at preset time intervals, when the non-illustrated start switch is operated to give the instruction of starting the fuel cells system 20. In the initial stage when the instruction is given to actuate the fuel cells system 20, the on-off state of the solenoid valves may be set in either the first state or the second state. For example, the last on-off state of the solenoid valves in the previous actuation of the fuel cells system 20 may be kept as the initial state for the current actuation of the fuel cells system 20. In another example, either the first state or the second state may be fixed to the on-off state of the solenoid valves at the start of the fuel cells system 20.

The fuel cells system including the reformer unit 120 of the fifth embodiment thus constructed, the place of receiving the supply of the air mixture is changeable between the upper stream side and the lower stream side in the reformer unit 120. The direction of the gas flow in the reaction unit 121 is thus reversible. This arrangement effectively prevents an excessive temperature rise on one end of the reformer unit with the heat evolved by the oxidation reaction. There is accordingly no abrupt temperature rise on the upper stream side. The changeover of the direction of the gas flow is based on the observed temperature at the end of the reaction unit 121. This securely prevents an excessive temperature rise at the end of the reaction unit 121.

The changeover of the direction of the gas flow enables the either end of the reaction unit 121 to function as the upper stream side. Unlike the prior art reformer unit, there is accordingly no significant temperature drop in a specific area on the lower stream side. Namely both sides of the reformer unit 120 are kept in the highly active state of the steam reforming reaction. This ensures the sufficient utilization of the catalyst included in the whole reaction unit 121 and enhances the rate of the steam reforming reaction. This arrangement enables size reduction of the reformer unit.

Figure 19:
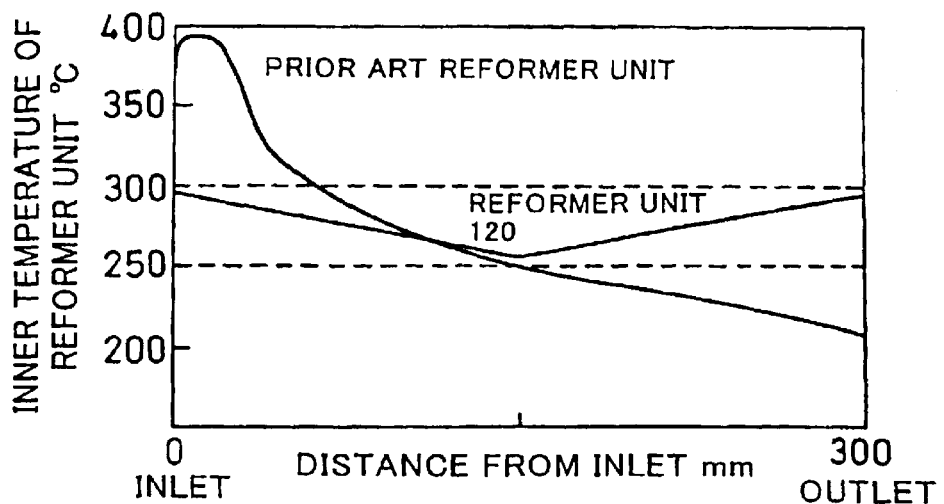
FIG. 19 is a graph showing internal temperature distributions of the reformer unit 120 and a prior art reformer unit.

FIG. 19 is a graph showing the internal temperature distributions from one end to the other end with regard to the reformer unit 120 described above and a prior art reformer unit that has a fixed direction of the internal gas flow. Unlike the prior art reformer unit, the reformer unit 120 effectively suppresses the excessive progress of the oxidation reaction at a specific end. The either end of the reformer unit 120 may function as the upper stream side and the internal temperature of the reformer unit is thus favorably kept in the temperature range of 250 to 300° C. As described above, in the reformer unit 120 of this embodiment, there is no abrupt temperature rise in the vicinity of the inlet. This advantageously prevents the potential troubles due to the temperature rise, for example, deterioration of the catalyst and formation of by-products. Like the embodiments discussed above, this arrangement significantly improves the durability of the reformer unit.

The reformer unit 120 of this embodiment has the reaction unit of the honeycomb structure. In a modified structure, the reformer unit may be filled with pellets with the catalyst carried thereon. This modified structure also exerts the similar effects by changing over the direction of the gas flow that passes through the inside of the reformer unit.

In the reformer unit 120 of this embodiment, the direction of the gas flow is changed over, based on the observed temperature at the end of the reaction unit 121. The direction of the gas flow may, however, be changed over based on another factor. The arrangement of changing over the direction of the gas flow according to the observed temperature at the end of the reaction unit 121 ensures the remarkable effect of keeping the internal temperature of the reformer unit 120 in the predetermined temperature range, even when the flow rate of the crude fuel gas supplied to the reformer unit 120 varies to fluctuate the degree of the progress of the steam reforming reaction and the oxidation reaction proceeding in the reformer unit 120. For example, when there is a sufficiently little variation in flow rate of the crude fuel gas supplied to the reformer unit, the direction of the gas flow may be changed over at preset time intervals.

Figure 20:
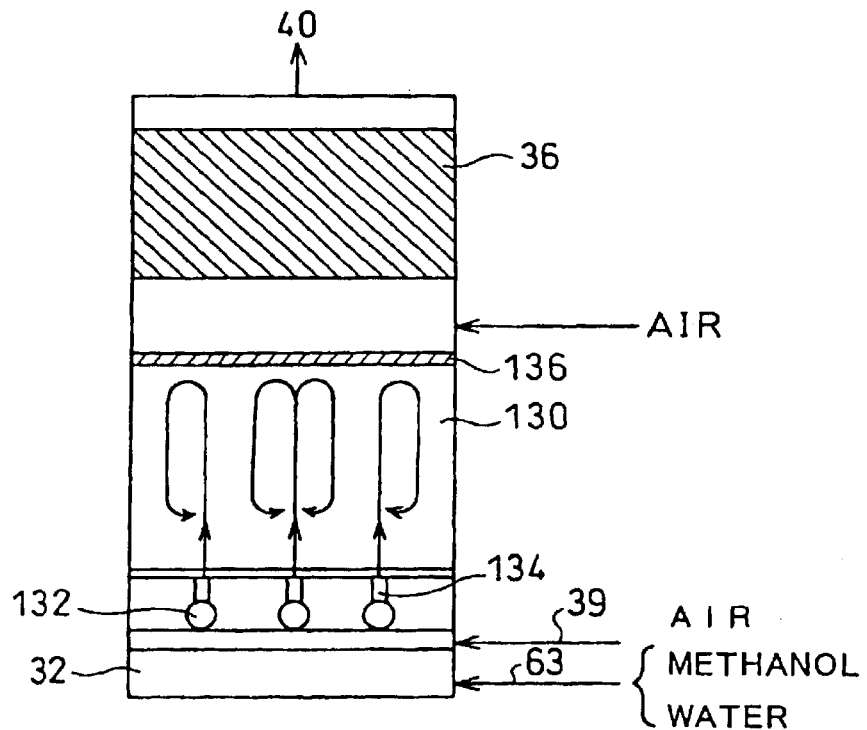
FIG. 20 schematically illustrates the structure of a reformer unit 130 and members connecting with the reformer unit 130 in a sixth embodiment.

The structure of stirring catalytic particles sealed in the reformer unit to prevent an excessive temperature rise in a specific area on the upper stream side of the reformer unit is described below as a sixth embodiment. FIG. 20 schematically illustrates the structure of a reformer unit 130 and members connecting with the reformer unit 130 in the sixth embodiment. The reformer unit 130 of the sixth embodiment is included in a fuel cells system having a similar structure to that of the fuel cells system 20 shown in FIG. 1. In the following description, the like constituents are expressed by the like numerals and are not specifically explained.

Particles of the Cu—Zn catalyst are sealed in the reformer unit 130. The Cu—Zn catalyst prepared by the known coprecipitation technique is granulated to have the mean particle diameter of approximately 500 μm. Another procedure disperses the Cu—Zn catalyst in a selected solvent and sprays the dispersion from a spray drier to form the fine particles of the above mean particle diameter. The catalytic particles may have any size as long as the particles are sufficiently stirred with the gas flow injected into the reformer unit with the catalytic particles sealed therein. For example, the preferable particle diameter ranges from 100 μm to several mm. The catalytic particles may have any shape, but the substantially spherical shape is preferable for the high stirring efficiency.

Like the embodiments discussed above, the supply of the crude fuel gas containing methanol and steam and the supply of the intake air by the blower 38 are flown into the reformer unit 130. In this embodiment, the supplies of the crude fuel gas and the air are led into the reformer unit 130 via pressure control valves 132 and injection nozzles 134. Methanol and water are vaporized and heated in the evaporator 32. The crude fuel gas discharged from the evaporator 32 accordingly has certain temperature and pressure. The flow of the crude fuel gas is mixed with the flow of the air supplied through the air supply conduit 39 and injected into the reformer unit 130 via the pressure control valves 132 and the injection nozzles 134. The catalytic particles are sealed in the reformer unit 130 as mentioned above. The jet of the crude fuel gas containing the air fluidizes and stirs the catalytic particles in the reformer unit 130 as shown by the arrows in FIG. 20. In the reformer unit 130 of this embodiment, the flow of the crude fuel gas containing the air is injected from seven different positions. The gas flow may, however, be injected from any arbitrary number of positions as long as the catalytic particles are sufficiently stirred in the reformer unit. The internal volume of the reformer unit 130 may be determined such that a predetermined amount of the catalytic particles are sufficiently stirred with the gas flow (the crude fuel gas containing oxygen) supplied at a preset flow rate under a predetermined pressure.

A filter 136 composed of foamed nickel is provided on the other end of the reformer unit 130 opposite to the end connecting with the injection nozzles. The filter 136 has a sufficiently fine mesh, which prevents a leakage of the catalytic particles sealed in the reformer unit 130 but allows the flow of the gaseous fuel produced in the reformer unit 130 to the CO reduction unit 36. The gaseous fuel passing through the filter 136 is led into the CO reduction unit 36, which reduces the concentration of carbon monoxide included in the gaseous fuel, and is then supplied to the fuel cells 40.

In the fuel cells system including the reformer unit 130 thus constructed, the catalytic particles sealed in the reformer unit 130 are continuously stirred by the flow of the crude fuel gas containing the air. The catalytic particles located at the positions where the crude fuel gas containing a high concentration of oxygen is supplied are continuously replaced. This arrangement thus effectively prevents an excessive temperature rise in a specific area of the catalyst with the heat produced by the oxidation reaction. The gas injected into the reformer unit to stir the catalytic particles is identical with the gas subjected to the steam reforming reaction and the oxidation reaction proceeding in the reformer unit (the crude fuel gas containing the air). Namely this arrangement enables the action of stirring the catalytic particles to be carried out simultaneously with the action of supplying the crude fuel gas to the reformer unit 130. The gas flow injected into the reformer unit does not affect the reactions proceeding in the reformer unit or the electrochemical reactions proceeding in the fuel cells.

The heat produced by the oxidation reaction is dispersed in the reformer unit 130 by stirring the catalytic particles in the reformer unit 130. Unlike the prior art reformer unit, there is accordingly no significant temperature drop in a specific area on the lower stream side. The whole reformer unit 130 with the catalytic particles is accordingly kept in the highly active state of the steam reforming reaction. This favorably enhances the rate of the steam reforming reaction.

Figure 21:
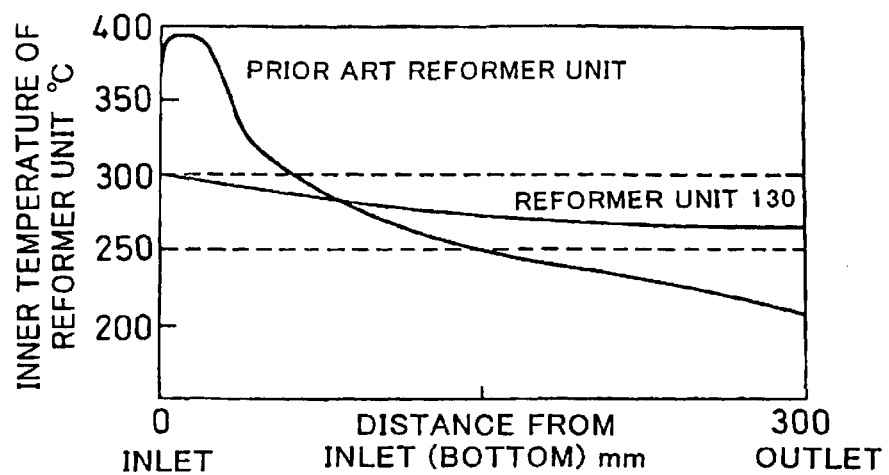
FIG. 21 is a graph showing internal temperature distributions of the reformer unit 130 and a prior art reformer unit.

FIG. 21 is a graph showing the internal temperature distributions from one end to the other end with regard to the reformer unit 130 described above and a prior art reformer unit that has a fixed direction of the internal gas flow. The crude fuel gas having the temperature of 250° C. and the flow rate of 670 l/min is mixed with the air having the flow rate of 140 l/min, and the mixed gas is injected under 5 atmospheric pressure from the injection nozzles 134 into the reformer unit 130. Unlike the prior art reformer unit, the oxidation reaction does not excessively proceed at a specific end of the reformer unit 130. The catalytic particles inside the reformer unit 130 are uniformly involved in the reaction, so that the internal temperature of the reformer unit is favorably kept in the temperature range of 250 to 300° C. As described above, in the reformer unit 130 of this embodiment, there is no abrupt temperature rise in the vicinity of the inlet. This advantageously prevents the potential troubles due to the temperature rise, for example, deterioration of the catalyst and formation of by-products. Like the embodiments discussed above, this arrangement significantly improves the durability of the reformer unit.

In the sixth embodiment discussed above, the crude fuel gas containing the air is used for the gas injected into the reformer unit 130 for the purpose of stirring. A gas composed of at least one of vaporized methanol, steam, and the air may be used for the same purpose. In the latter case, the residual components other than the gas component injected into the reformer unit to stir the catalyst are supplied to a predetermined position (the upper stream side close to the gas jets is desirable) in the reformer unit with the catalytic particles sealed therein.

In the arrangement of the sixth embodiment, the high-pressure gas is injected into the reformer unit 130 to stir the catalytic particles sealed in the reformer unit 130. The catalytic particles may, however, be stirred by any other means. For example, mechanical means may be disposed in the reformer unit to stir the catalytic particles.

Figure 22:
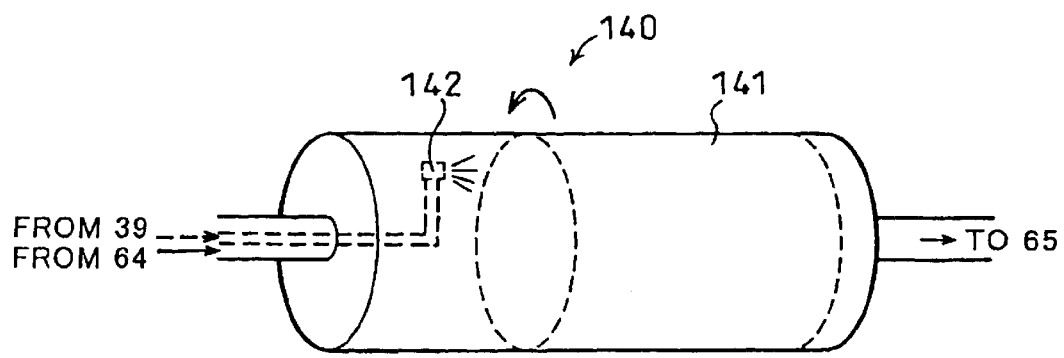
FIG. 22 schematically illustrates the structure of a reformer unit 140 in a seventh embodiment.

The structure of changing the flow site, which receives the supply of the air subjected to the oxidation reaction, with time in the catalytic section is described below as a seventh embodiment. FIG. 22 schematically illustrates the structure of a reformer unit 140 in the seventh embodiment. The reformer unit 140 of the seventh embodiment is included in a fuel cells system having a similar structure to that of the fuel cells system 20 shown in FIG. 1. As shown in FIG. 22, the reformer unit 140 is formed in a substantially cylindrical shape and has a single reaction unit 141 of a honeycomb structure with the Cu—Zn catalyst carried on the surface thereof. The reformer unit 140 is rotatable by means of a non-illustrated motor. Like the embodiments discussed above, the reformer unit 140 receives the supply of the crude fuel gas flown through the second fuel supply conduit 64 and discharges the resulting gaseous fuel to the third fuel supply conduit 65. The second fuel supply conduit 64 and the third fuel supply conduit 65 are connected to the approximate centers of the substantially circular cross sections of the reformer unit 140. The motor is driven to rotate the reformer unit 140 at a rate of one rotation per second around the center of the cross section.

The supply of the crude fuel gas flown through the second fuel supply conduit 64 and the supply of the air flown through the air supply conduit 39 are led into the reformer unit 140. In this embodiment, the end of the air supply conduit 39 connecting with the reformer unit 140 is formed in the second fuel supply conduit 64. The end of the air supply conduit 39 formed in the second fuel supply conduit 64 is bent in a space on the upstream side of the reaction unit 141 in the reformer unit 140 and is open as an air outlet 142. The air outlet 142 is open to the end on the upstream side of the reaction unit 141. In this embodiment, the position of the opening is approximately intermediate between the center and the circumference of the cross section at the end of the reaction unit 141. The air flown through the air supply conduit 39 is sprayed from the air outlet 142 and is supplied to approximately half the cells around those located just opposite to the air outlet 142, among all the cells constituting the honeycomb structure of the reaction unit 141.

In the reformer unit 140 of this embodiment, both the steam reforming reaction and the oxidation reaction proceed in the cells that receive the supply of the air from the air outlet, whereas only the steam reforming reaction proceeds in the cells that do not receive the air supply. The reformer unit 140 is rotated as described above, and the position of the air outlet 142 is fixed irrespective of the rotation of the reformer unit 140. The cells that receive the supply of the air are accordingly changed with time.

In the reformer unit 140 of the seventh embodiment thus constructed, the cells that receive the air supply for the progress of the oxidation reaction are changed with time. There is accordingly no excessive temperature rise in specific cells on the upstream side. In the cells with the air supply where the oxidation reaction proceeds to raise the temperature on the upstream side, the air supply is immediately stopped to inactivate the oxidation reaction. The heat produced by the oxidation reaction is consumed by the steam reforming reaction, and there is no further temperature rise. In the cells with no air supply where the heat is consumed by the steam reforming reaction, on the other hand, the air supply is immediately started to activate the oxidation reaction, which produces heat and prevents a significant temperature drop.

Like the embodiments discussed previously, the ratio of the methanol supply to the air supply to the reformer unit 140 is fixed to make the amount of heat required for the steam reforming reaction balance the amount of heat generated by the oxidation reaction proceeding in the reformer unit. In the reformer unit 140 of this embodiment, almost half the cells among all the cells constituting the honeycomb structure receive the air supply. Namely each cell, to which the air is currently supplied, receives oxygen in excess over the quantity of methanol. The amount of heat generated by the oxidation reaction is accordingly greater than the amount of heat required for steam reforming the methanol supply. As described above, the air supply is immediately stopped to such cells. This arrangement effectively prevents an excessive temperature rise on the upstream side that receives the air supply. The air and the crude fuel gas are supplied in the excess of oxygen. Compared with the standard supply with no excess of oxygen, the area of the vigorous oxidation reaction is extended to the lower stream portion. Unlike the prior art reformer unit, there is accordingly no significant temperature drop in the lower stream side. In the reformer unit 140, the whole reaction unit is kept in the desirable temperature range and is in the highly active state of the steam reforming reaction. This enhances the rate of the steam reforming reaction.

Figure 23:
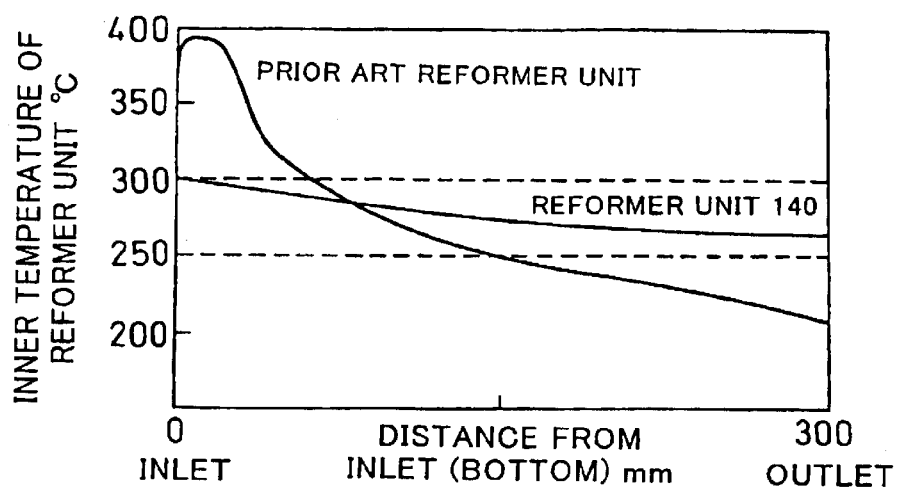
FIG. 23 is a graph showing internal temperature distributions of the reformer unit 140 and a prior art reformer unit.

FIG. 23 is a graph showing the internal temperature distributions from the upper stream side to the lower stream side with regard to the reformer unit 140 described above and a prior art reformer unit that receives a fixed rate of oxygen supply. The measurement of the temperature distribution was carried out while the gas was supplied to the reformer unit 140 under the conditions that LHSV (volume of methanol processed per hour/volume of the catalyst)=3 and the gas contained the air attaining the ratio of oxygen/methanol=11% and water attaining the ratio of water/methanol=2. Unlike the prior art reformer unit, there is no excessive temperature rise on the upstream side of the reformer unit 140. The internal temperature of the reformer unit is thus favorably kept in the temperature range of 250 to 300° C. This advantageously prevents the potential troubles due to the temperature rise, for example, deterioration of the catalyst and formation of by-products. Like the embodiments discussed above, this arrangement significantly improves the durability of the reformer unit. The gaseous fuel produced by the reformer unit 140 under the above conditions contained $H_2$=50%, $CO_2$=23%, $H_2O$=$17.5$%, $N_2$=9%, and CO=0.5% and was favorably used for the fuel cells.

Figure 24:
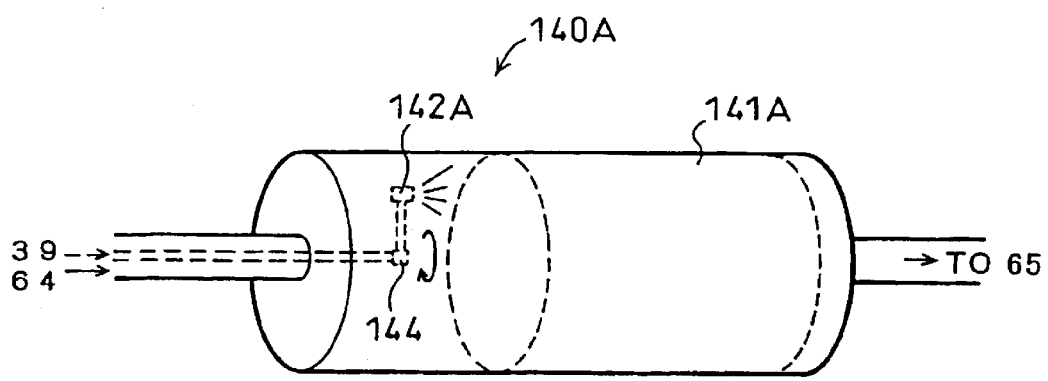
FIG. 24 schematically illustrates the structure of a reformer unit 140A in a modified example of the seventh embodiment.

In the seventh embodiment described above, the reformer unit 140 is rotated, while the air outlet 142 to spray the air flow is fixed, One modified structure rotates the air outlet and fixes the reformer unit. The reformer unit of such structure is described below as a modified example of the seventh embodiment. FIG. 24 schematically illustrates the structure of a reformer unit 140A in the modified example of the seventh embodiment. The reformer unit 140A has a substantially similar structure to that of the reformer unit 140. In the following description, the corresponding constituents are expressed by the like numerals with a suffix A. The reformer unit 140A of this modified example is not rotatable. A specific rotary mechanism 144 is disposed at the bent in the end portion of the air supply conduit 39 leading to an air outlet 142A. The rotary mechanism 144 rotates the end of the air supply conduit 39 with the air outlet 142A to change the flow site at the upper stream end of a reaction unit 141A, which receives the air supply from the air outlet 142A, with time.

The reformer unit 140A of this configuration exerts the similar effects to those of the reformer unit 140 of the seventh embodiment. The rotary mechanism 144 disposed in the vicinity of the end of the air supply conduit 39 supports an end member 143 with the air outlet 142A to be freely rotatable relative to the base of the air supply conduit 39. The end member 143 may be rotated by the reaction force of the air spray from the air outlet 142A or by any external powers.

In the embodiment and its modified example, either of the air outlet and the reformer unit is rotated. Another modified structure provides a plurality of air outlets on the upstream side of the reformer unit and changes over the working air outlet, from which the air is actually sprayed, with time. Any structure may be applicable as long as it changes the flow site in the reaction unit, which receives the air supply, with time. The reformer units 140 and 140A have the reaction unit of the honeycomb structure. In a modified structure, the reaction unit may be filled with pellets with the catalyst carried thereon. This modified structure also exerts the similar effects by changing the flow site in the reaction unit, which receives the air supply, with time.

The reformer units of the sixth and the seventh embodiments discussed above have another effect of making the oxidation reaction vigorously proceed at the initial stage and thus heating the reformer unit quickly to the stationary level. At the initial stage, the temperature of the reformer unit is as low as room temperature, and it is required to quickly heat the reformer unit to the stationary level. One possible technique supplies large quantities of methanol and oxygen to make the oxidation reaction vigorously proceed and thereby internally heat the reformer unit. In the prior art reformer unit, however, the vigorous oxidation reaction with a large quantity of air supply may cause an excessive temperature rise in a specific area on the upper stream side while the average temperature of the reformer unit is still low. In the reformer units of the sixth and the seventh embodiments, the area of the vigorous oxidation reaction (that is, the catalytic site receiving the high concentration of oxygen) is changed with time. The vigorous oxidation reaction with the large quantity of air supply accordingly does not cause an excessive temperature rise in any specific site, but quickly heats the whole reformer unit to the stationary level.

Figure 25:
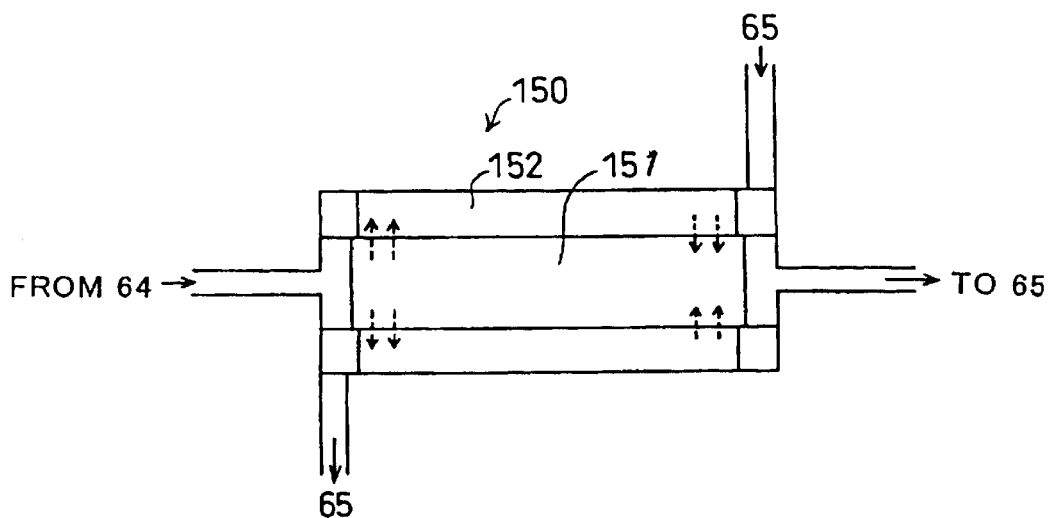
FIG. 25 is a sectional view schematically illustrating the structure of a reformer unit 150 in an eighth embodiment.

The following describes a reformer unit of an eighth embodiment including a plurality of reaction units, where the direction of the gas flow in part of the reaction units is reverse to the direction of the gas flow in the residual reaction units, so as to allow heat exchange between the upper stream side of one reaction unit that receives the supplies of the crude fuel gas and the air and the lower stream side of an adjoining reaction unit that outputs the gaseous fuel. FIG. 25 is a sectional view schematically illustrating the structure of a reformer unit 150 in the eighth embodiment. The reformer unit 150 of the eighth embodiment is included in a fuel cells system having a similar structure to that of the fuel cells system 20 shown in FIG. 1. The reformer unit 150 is formed in a substantially cylindrical shape and has a dual tubular structure including a reaction unit 152 formed along the inner wall thereof and a reaction unit 151 located inside the reaction unit 152. The reaction unit 151 receives the supplies of the crude fuel gas and the air at one end thereof (the left end in FIG. 25) and outputs the gaseous fuel at the other end (the right end in FIG. 25).

The reaction unit 152 also receives the supplies of the crude fuel gas and the air at one end and outputs the gaseous fuel at the other end, but the respective ends are just opposite to those of the reaction unit 151. Namely the direction of the gas flow in the reaction unit 151 is reverse to the direction of the gas flow in the reaction unit 152. Each of the reaction units 151 and 162 may be composed of the honeycomb structure with the Cu—Zn catalyst carried on the surface thereof or may be filled with the pellets of the Cu—Zn catalyst.

In the reformer unit 150 of the eighth embodiment thus constructed, the upper stream side of the inner reaction unit 151 is adjacent to the lower stream side of the outer reaction unit 152, and the lower stream side of the inner reaction unit 151 is adjacent to the upper stream side of the outer reaction unit 152. This arrangement enables heat exchange between the upper stream side of one reaction unit and the lower stream side of the other reaction unit. Heat generated by the oxidation reaction on the upper stream side of one reaction unit is transmitted to the lower stream portion of the other reaction unit adjoining thereto (see the dotted arrows in FIG. 25).

This arrangement effectively prevents an excessive temperature rise on the upper stream side that receives the supplies of the crude fuel gas and the air.

The lower stream portion of each reaction unit included in the reformer unit 150 receives the heat transmitted from the upper stream side of the adjoining reaction unit. Unlike the prior art reformer unit, there is accordingly no significant temperature drop on the lower stream side. Each reaction unit in the reformer unit 150 is thus kept in the highly active state of the steam reforming reaction. This enhances the rate of the steam reforming reaction.

Figure 26:
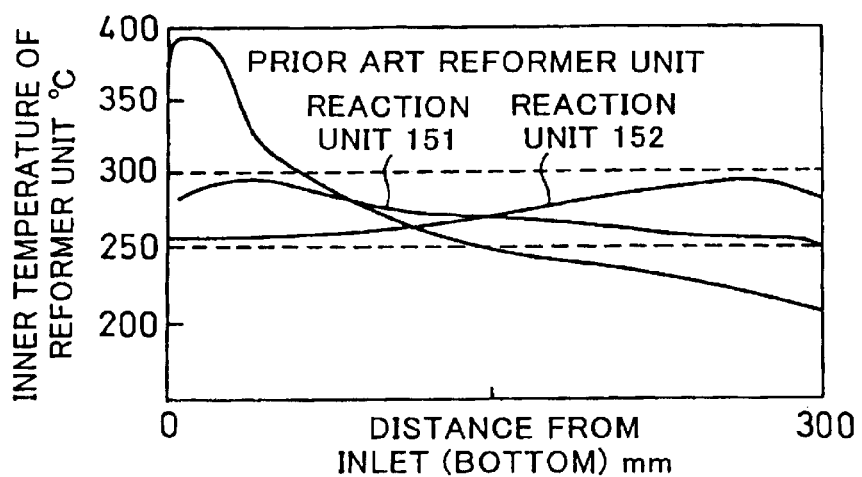
FIG. 26 is a graph showing internal temperature distributions of the reformer unit 150 and a prior art reformer unit.

FIG. 26 is a graph showing the internal temperature distributions from one end to the other end with regard to the respective reaction units of the reformer unit 150 described above and a prior art reformer unit that has a fixed direction of the internal gas flow in reaction units. Unlike the prior art reformer unit, in the reformer unit 150, there is no excessive temperature rise in a specific area on the upper stream side with the heat produced by the oxidation reaction. There is also no significant temperature drop in a specific area on the lower stream side. The internal temperature of the reformer unit is thus favorably kept in the temperature range of 250 to 300° C. As described above, in the reformer unit 150 of this embodiment, there is no abrupt temperature rise in the vicinity of the inlet. This advantageously prevents the potential troubles due to the temperature rise, for example, deterioration of the catalyst and formation of by-products. Like the embodiments discussed above, this arrangement significantly improves the durability of the reformer unit.

The reformer unit 150 of the eighth embodiment discussed above has the dual tubular structure including the inner reaction unit 151 and the outer reaction unit 152, where the direction of the gas flow in one reaction unit is reverse to the direction of the gas flow in the other reaction unit. In the generalized structure, the reformer unit includes a plurality of reaction units, where the direction of the gas flow in part of the reaction units is reverse to the direction of the gas flow in the residual reaction units. This arrangement allows heat exchange between the upper stream portion generating a large amount of heat and the lower stream portion consuming a large amount of heat. This accordingly ensures the same effects as discussed in the eight embodiment. For example, the reformer unit may be formed in a stack structure where a plurality of thin reaction units are laid one upon another, instead of the dual tubular structure. The direction of the gas flow is alternately inverted in the stack of the respective reaction units. In this structure, heat exchange is carried out between the upper stream side of each reaction unit and the lower stream side of an adjoining reaction unit, so as to homogenize the internal temperature.

Figure 27:
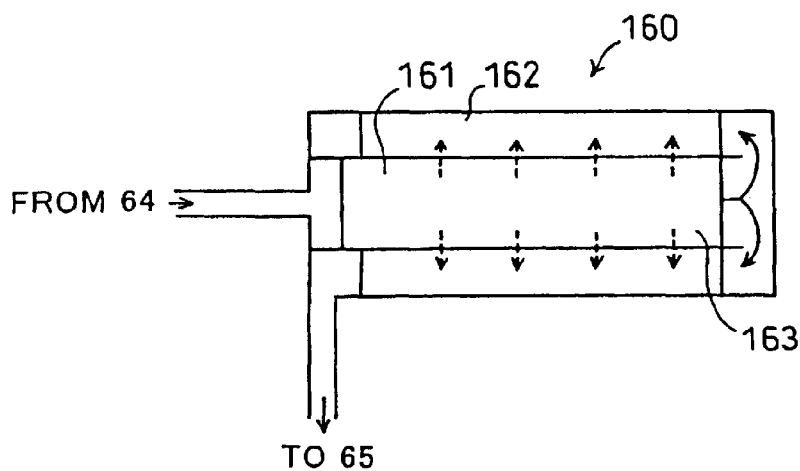
FIG. 27 is a sectional view schematically illustrating the structure of a reformer unit 160 in a ninth embodiment.

The following describes a ninth embodiment that has a turning area provided in the middle of a flow path defined in a reaction unit, where the upper stream portion and the lower stream portion are adjacent to each other in the reaction unit to allow heat exchange therebetween. FIG. 27 is a sectional view schematically illustrating the structure of a reformer unit 160 in the ninth embodiment. The reformer unit 160 of the ninth embodiment is included in a fuel cells system having a similar structure to that of the fuel cells system 20 shown in FIG. 1. Like the reformer unit 150 of the eighth embodiment, the reformer unit 160 is formed in a substantially cylindrical shape and has a dual tubular structure including an inner section 161 and an outer section 162. The inner section 161 and the outer section 162 are continuous with each other and form a single reaction unit 163.

The second fuel supply conduit 64 connects with one end of the inner section 161. The supplies of the crude fuel gas and the air flown through the second fuel supply conduit 64 move from one end to the other end in the inner section 161. The other end of the inner section 161 connects with the outer section 162. The gas passing through the inside of the inner section 161 is led from the other end thereof to the outer section 162 (see the solid arrows in FIG. 27). The gas introduced into the outer section 162 passes through the inside of the outer section 162 and is connected to the third fuel supply conduit 65 at an end corresponding to the one end of the inner section 161. The resulting gaseous fuel produced from the gas passing through the reaction unit 163 is discharged to the third fuel supply conduit 65. The inner section 161 and the outer section 162 of the reaction unit 163 may be composed of the honeycomb structure with the Cu—Zn catalyst carried thereon or may be filled with the pellets of the Cu—Zn catalyst.

In the reformer unit 160 of the ninth embodiment thus constructed, the inner section 161 is adjacent to the outer section 162. This arrangement allows heat exchange between the inner section 161 and the outer section 162. The inner section 161 corresponds to the upper stream portion in the reaction unit 163, where the oxidation reaction vigorously proceeds to generate a large amount of heat. The outer section 162 corresponds to the lower stream portion in the reaction unit 163, where only the steam reforming reaction mainly proceeds to require heat. In the reformer unit 160, heat is transmitted from the inner section 161 generating a large amount of heat to the outer section 162 requiring heat (see the dotted arrows in FIG. 27). There is accordingly no excessive temperature rise in the inner section 161 corresponding to the upper stream side.

In the reformer unit 160, the outer section 162 corresponding to the lower stream side receives the heat transmitted from the adjoining inner section 161. Unlike the prior art reformer unit, there is accordingly no significant temperature drop on the lower stream side. The whole reaction unit in the reformer unit 160 is thus kept in the highly active state of the steam reforming reaction. This enhances the rate of the steam reforming reaction.

Figure 28:
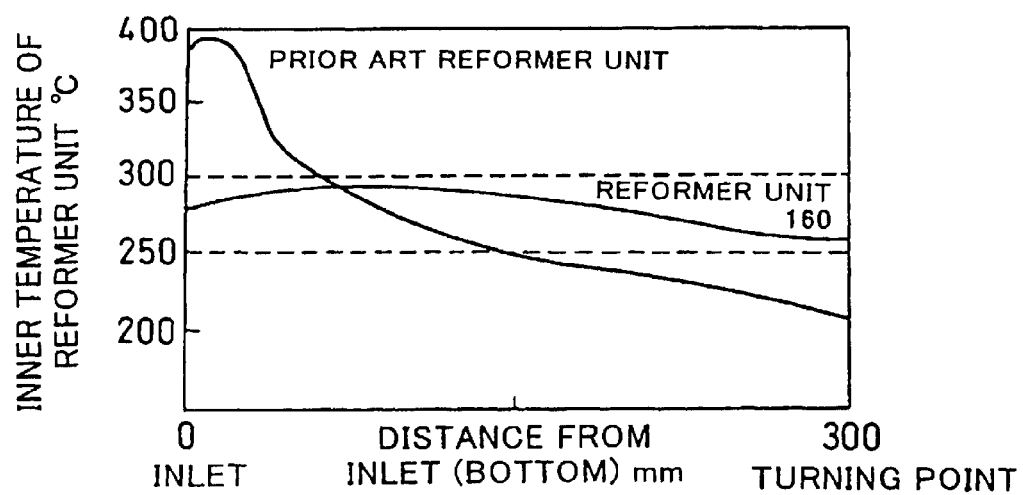
FIG. 28 is a graph showing internal temperature distributions of the reformer unit 160 and a prior art reformer unit.

FIG. 28 is a graph showing the internal temperature distributions from one end connecting with the second fuel supply conduit 64 to the other end with regard to the reformer unit 160 described above and a prior art reformer unit that has a fixed direction of the internal gas flow in a reaction unit. Unlike the prior art reformer unit, in the reformer unit 160, there is no excessive temperature rise on the upper stream side with the heat produced by the oxidation reaction. There is also no significant temperature drop on the lower stream side. The internal temperature of the reformer unit is thus favorably kept in the temperature range of 250 to 300° C. As described above, in the reformer unit 160 of this embodiment, there is no abrupt temperature rise in the vicinity of the inlet. This advantageously prevents the potential troubles due to the temperature rise, for example, deterioration of the catalyst and formation of by-products. Like the embodiments discussed above, this arrangement significantly improves the durability of the reformer unit.

Figure 29:
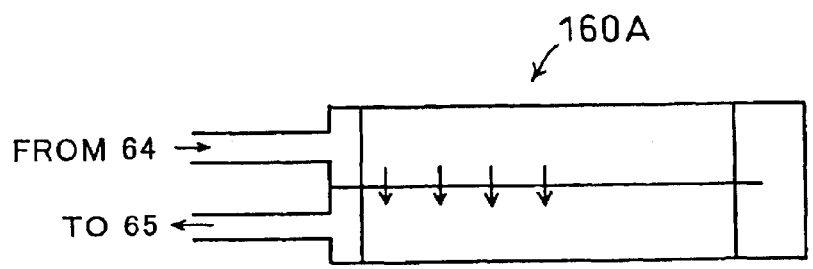
FIG. 29 schematically illustrates the structure of a reformer unit 160A in a modified example of the ninth embodiment.

The reformer unit 160 of the ninth embodiment discussed above has the dual tubular structure including the inner section 161 and the outer section 162, where the direction of the gas flow in the inner section 161 is reverse to the direction of the gas flow in the outer section 162. The reformer unit of this arrangement is, however, not restricted to the dual tubular structure. In the generalized structure, a turning area is provided in the middle of a flow path which the crude fuel gas and the air pass through, and the upper stream side and the lower stream side are arranged to be adjacent to each other to allow heat exchange therebetween. This arrangement exerts the same effects as those discussed in the ninth embodiment. For example, the reformer unit may have a folded flow path, where the direction of the gas flow on the upper stream side is reverse to the direction of the gas flow on the lower stream side, instead of the dual tubular structure. FIG. 29 shows a reformer unit 160A of such structure. This structure also enables heat to be transmitted from the upper stream side to the adjoining lower stream side (see the arrows in FIG. 29), thus homogenizing the internal temperature.

Figure 30:
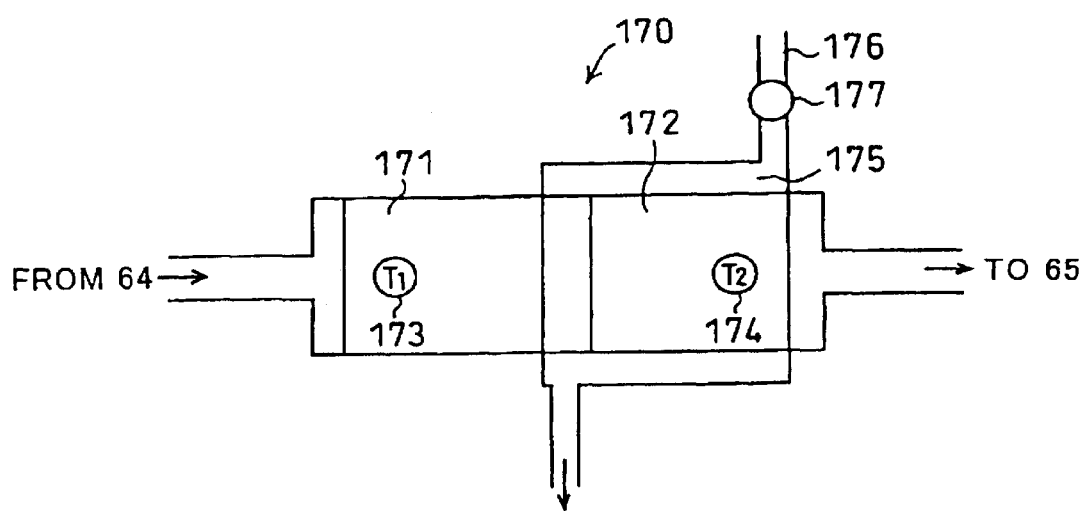
FIG. 30 is a sectional view schematically illustrating the structure of a reformer unit 170 in a tenth embodiment.

The structure of heating the lower stream portion of the reformer unit with hot combustion exhaust discharged from the evaporator 32 is described below as a tenth embodiment. FIG. 30 is a sectional view schematically illustrating the structure of a reformer unit 170 in the tenth embodiment. The reformer unit 170 of the tenth embodiment is included in a fuel cells system having a similar structure to that of the fuel cells system 20 shown in FIG. 1. The reformer unit 170 includes two reaction units 171 and 172 of the honeycomb structures with the Cu—Zn catalyst carried on the surface thereof. The division of the reformer unit 170 into two reaction units enables the gas separated by each cell of the honeycomb structure in the reaction unit 171 on the upper stream side to be mixed again in the course of the flow path, and thus homogenizes the conditions of the gas passing through the inside of the reaction unit 170. The reformer unit 170 connects with the second fuel supply conduit 64 that receives the air supply from the air supply conduit 39, and receives the supply of the crude fuel gas mixed with the air. The supply of the crude fuel gas that contains the air and is led from the second fuel supply conduit 64 passes through the reaction units 171 and 172 in this sequence. The resulting hydrogen rich gaseous fuel is then discharged to the third fuel supply conduit 65.

The reaction units 171 and 172 are respectively provided with temperature sensors 173 and 174. These temperature sensors 173 and 174 are connected to the control unit 50. Pieces of information regarding the internal temperatures of the reaction units 171 and 172 are sent to the control unit 50. As discussed later, the results of the measurement with the temperature sensor 173 are used to prevent an excessive temperature rise inside the reaction unit 171, whereas the results of the measurement with the temperature sensor 174 are used to prevent an excessive temperature drop inside the reaction unit 172. It is accordingly desirable that the temperature sensor 173 is located on the upper stream side of the reaction unit 171 and the temperature sensor 174 is located on the lower stream side of the reaction unit 172.

A combustion exhaust inlet 175, into which combustion exhaust discharged from the evaporator 32 is introduced, is disposed at a specific position on the circumferential part of the reformer unit 170, which corresponds to the reaction unit 172. As described previously, the evaporator 32 receives a supply of combustion exhaust from the burner 26 via the compressor unit 28 and heats and vaporizes methanol and water with the amount of heat in the combustion exhaust. The combustion exhaust discharged from the compressor unit 28 after consuming the internal heat in the evaporator 32 to heat and vaporize methanol and water still has a certain amount of heat. In the reformer unit 170 of this embodiment, this combustion exhaust is led into the combustion exhaust inlet 175 and used to heat the reaction unit 172 on the lower stream side.

The fuel cells system including the reformer unit 170 of this embodiment has a combustion exhaust flow conduit 176 that leads the combustion exhaust discharged from the evaporator 32 to the combustion exhaust inlet 175. A mass flow controller 177 is disposed in the combustion exhaust flow conduit 176 to regulate the flow rate of the combustion exhaust led into the combustion exhaust inlet 175. The mass flow controller 177 is connected to the control unit 50. The control unit 50 regulates the flow rate of the combustion exhaust led into the combustion exhaust inlet 175. The temperature of the combustion exhaust led from the evaporator 32 to the combustion exhaust inlet 175 is approximately 300° C. The internal temperature of the reaction unit 172 is adjusted by controlling the driving state of the mass flow controller 177 and regulating the flow rate of the combustion exhaust supplied to the combustion exhaust inlet 175. The combustion exhaust led into the combustion exhaust inlet 175 is used to heat the reaction unit 172 and then discharged from the fuel cells system.

In the reaction unit 171 on the upper stream side of the reformer unit 170 of this embodiment, the amount of heat produced by the oxidation reaction compensates the amount of heat required for the steam reforming reaction proceeding in the reaction unit 171. In the reaction unit 172 on the lower stream side, on the other hand, the heat required for the steam reforming reaction proceeding in the reaction unit 172 is supplied by both the heat produced by the oxidation reaction proceeding on the upper stream side and the heat included in the combustion exhaust led into the combustion exhaust inlet 175. In the fuel cells system including the reformer unit 170 of this embodiment, the control unit 50 controls the driving amount of the blower 38, which takes in the air to be supplied to the reformer unit 170, based on the results of the measurement with the temperature sensor 173 and regulates the flow rate of the air supplied to the reformer unit 170 to make the internal temperature of the reaction unit 171 not higher than 300° C. In the fuel cells system of this embodiment, the control unit 50 also controls the driving amount of the mass flow controller 177 based on the results of the measurement with the temperature sensor 174 and regulates the flow rate of the combustion exhaust introduced into the combustion exhaust inlet 176 to make the internal temperature of the reaction unit 172 not lower than 250° C.

In the reformer unit 170 of the tenth embodiment thus constructed, the reaction unit 172 on the lower stream side is heated with the combustion exhaust. It is accordingly not necessary that the amount of heat produced by the oxidation reaction compensates all the amount of heat required for the steam reforming reaction proceeding in the reformer unit 170. Namely this arrangement decreases the flow rate of the air supplied to the reformer unit 170 and subjected to the oxidation reaction, thus suppressing the progress of the oxidation reaction proceeding on the upper stream side. The flow rate of the air supplied to the reformer unit 170 is regulated, based on the observed internal temperature of the reaction unit 171. This arrangement effectively prevents an excessive temperature rise in the reaction unit 171 where the oxidation reaction vigorously proceeds.

In the reformer unit 170, the internal heat of the combustion exhaust led into the combustion exhaust inlet 175 is transmitted to the reaction unit 172 on the lower stream side. Unlike the prior art reformer unit, there is accordingly no significant temperature drop on the lower stream side. The whole reaction unit in the reformer unit 170 is thus kept in the highly active state of the steam reforming reaction. This enhances the rate of the steam reforming reaction. The heat of the combustion exhaust, which is wasted in the prior art structure, is utilized to heat the reaction unit 172. This arrangement accordingly does not lower the energy efficiency for heating the reaction unit 172.

Figure 31:
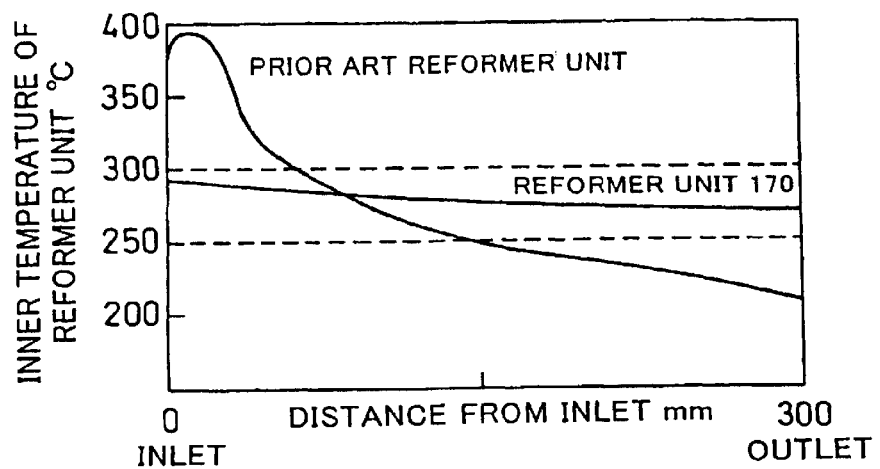
FIG. 31 is a graph showing internal temperature distributions of the reformer unit 170 and a prior art reformer unit.

FIG. 31 is a graph showing the internal temperature distributions from the upper stream side that receives the supply of the crude fuel gas containing the air to the lower stream side with regard to the reformer unit 170 described above and a prior art reformer unit where the amount of heat produced by the oxidation reaction compensates all the amount of heat required for the steam reforming reaction. Unlike the prior art reformer unit, in the reformer unit 170, there is no excessive temperature rise on the upper stream side with the heat produced by the oxidation reaction. There is also no significant temperature drop on the lower stream side. The internal temperature of the reformer unit is thus favorably kept in the temperature range of 250 to 300° C. As described above, in the reformer unit 170 of this embodiment, there is no abrupt temperature rise in the vicinity of the inlet. This advantageously prevents the potential troubles due to the temperature rise, for example, deterioration of the catalyst and formation of by-products. Like the embodiments discussed above, this arrangement significantly improves the durability of the reformer unit.

The reformer unit 170 of the tenth embodiment discussed above includes the two reaction units 171 and 172 composed of the honeycomb structures. The reformer unit may be filled with pellets with the catalyst carried thereon, instead of the honeycomb structure. In this case, the reformer unit may not be divided into two sections but may uniformly be filled with the pellets.

Any hot gas other than the combustion exhaust discharged from the evaporator 32 may alternatively be used to heat the lower stream portion. For example, in the fuel cells system including the reformer unit 170 of this embodiment, in the case where the heat source that supplies heat required for the evaporator 32 is different from the driving source of the compressor unit 28 that supplies the compressed air to the cathodes of the fuel cells 40, the hot gas used to heat the lower stream portion may be the gaseous exhaust discharged from either one of the heat source and the driving source. The gas discharged from another high-temperature constituent of the fuel cells system may be used instead, as long as the gas has energy usable to keep the internal temperature of the reformer unit in the temperature range of 250 to 300° C. Instead of using the hot gaseous exhaust discharged from the high-temperature constituent, another available structure circulates a specific fluid between the high-temperature constituent and the reformer unit and supplies the thermal energy of the high-temperature constituent to the reformer unit by means of the circulated fluid.

Figure 32:
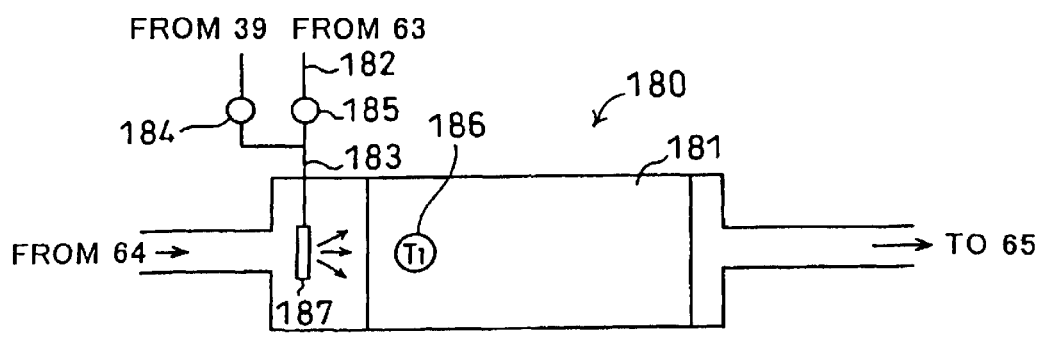
FIG. 32 schematically illustrates the structure of a reformer unit 180 in an eleventh embodiment.

The structure of supplying part of the crude fuel in the liquid form to the upper stream side of the reaction unit is described below as an eleventh embodiment. FIG. 32 schematically illustrates the structure of a reformer unit 180 in the eleventh embodiment. The reformer unit 180 of the eleventh embodiment is included in a fuel cells system having a similar structure to that of the fuel cells system shown in FIG. 1. The reformer unit 180 has a single reaction unit 181 of a honeycomb structure with the Cu—Zn catalyst carried on the surface thereof. The reformer unit 180 connects with the second fuel supply conduit 64 to receive the supply of the crude fuel gas, and additionally receives the supply of a mixed solution of methanol and water (hereinafter referred to as the liquid crude fuel). The liquid crude fuel is led into the evaporator 32 via the first fuel supply conduit 63 as described previously. The first fuel supply conduit 63 branches off to a crude fuel branch path 182 to supply the liquid crude fuel to the reformer unit 180. In the structure of this embodiment, the air supply conduit 39 does not join the second fuel supply conduit 64 but meets the crude fuel branch path 182 to form a crude fuel conduit 183. The crude fuel conduit 183 is connected to the upper stream end of the reformer unit 180 to supply the liquid crude fuel mixed with the air to the reformer unit 180.

Mass flow controllers 184 and 185 are respectively disposed in the air supply conduit 39 and the crude fuel branch path 182 to regulate the flow rate of the air and the quantity of the liquid crude fuel supplied to the reformer unit 180. These mass flow controllers 184 and 185 are connected to the controller 50, which control the driving amounts thereof. An injection nozzle 187 formed as an end structure of the crude fuel conduit 183 is located in the vicinity of the upper stream end of the reaction unit 181 in the reformer unit 180. The liquid crude fuel mixed with the air is sprayed from this injection nozzle 187 toward the end of the reaction unit 181 by utilizing the air pressure and is fed over a wide area in the cross section at the end of the reaction unit 181. The injection nozzle 187 may not be formed as a nozzle but may have any shape that allows the liquid to be sprayed over a wide area. In the reformer unit 180, a temperature sensor 186 is disposed in the vicinity of the upper stream end of the reaction unit 181. The temperature sensor 186 is connected to the control unit 50. Information regarding the temperature on the upper stream side of the reaction unit 181 is input into the control unit 50.

As described above, when the supplies of the crude fuel gas and the air are fed into the reformer unit, the oxidation reaction vigorously proceeds to raise the temperature on the upper stream side where the concentration of oxygen is high. In the structure of this embodiment, on the other hand, the liquid crude fuel is sprayed toward the upper stream end of the reaction unit 181, so as to regulate the temperature on the upper stream side. The liquid crude fuel sprayed to the reaction unit 181, which has been heated to high temperatures, removes heat from the reaction unit 181 and is heated and vaporized. The temperature on the upper stream side of the reaction unit 181 is accordingly controlled not to higher than a preset level by regulating the supply of the liquid crude fuel.

In the process of producing the hydrogen rich gaseous fuel in the reformer unit 180 of this arrangement, the supply of the liquid crude fuel to the reformer unit 180 and its quantity are controlled, based on the internal temperature of the reaction unit 181 measured by the temperature sensor 186. The total quantity of methanol supplied to the reformer unit 180 depends upon the magnitude of the loading connected to the fuel cells 40, that is, the quantity of the gaseous fuel to be supplied to the fuel cells 40. The quantity of methanol flown through the first fuel supply conduit 63 and supplied to the reformer unit 180 in the liquid form is regulated, based on the results of the measurement with the temperature sensor 186. In accordance with a concrete procedure, when the temperature of the reaction unit 181 exceeds a preset level (300° C. in this embodiment), the liquid crude fuel is sprayed from the injection nozzle 187. The quantity of the liquid crude fuel sprayed from the injection nozzle 187 is regulated to make the temperature of the reaction unit 181 not higher than the preset level. While the temperature of the reaction unit 181 is not higher than the preset level, only the air is sprayed from the injection nozzle 187.

In the reformer unit 180 of the eleventh embodiment thus constructed, the liquid is sprayed and vaporized inside the reformer unit 180, so as to cool down the upper stream side of the reaction unit 181. This arrangement effectively prevents an excessive temperature rise on the upper stream side of the reaction unit 181 with the heat produced by the oxidation reaction. The liquid sprayed in the reformer unit 180 to cool down the upper stream portion of the reaction unit 181 is the liquid crude fuel that undergoes the steam reforming reaction and the oxidation reaction proceeding in the reformer unit 180. The injection of the liquid accordingly does not affect the reactions proceeding in the reformer unit 180.

Figure 33:
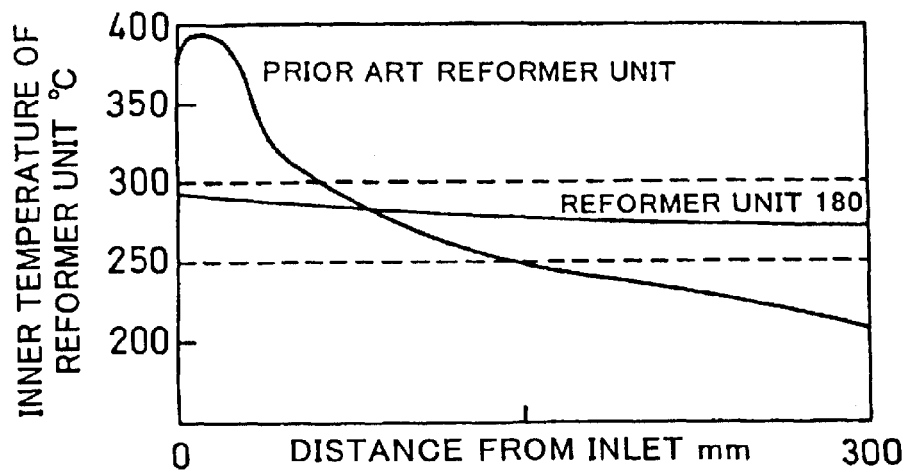
FIG. 33 is a graph showing internal temperature distributions of the reformer unit 180 and a prior art reformer unit.

FIG. 33 is a graph showing the internal temperature distributions from the upper stream side that receives the supply of the crude fuel gas containing the air to the lower stream side with regard to the reformer unit 180 described above and a prior art reformer unit where all the quantity of methanol required to produce a desired quantity of the gaseous fuel is supplied via the evaporator 32. Unlike the prior art reformer unit, in the reformer unit 180, there is no excessive temperature rise on the upper stream side with the heat produced by the oxidation reaction. The internal temperature of the reformer unit is thus favorably kept in the temperature range of 250 to 300° C. As described above, in the reformer unit 180 of this embodiment, there is no abrupt temperature rise in the vicinity of the inlet. This advantageously prevents the potential troubles due to the temperature rise, for example, deterioration of the catalyst and formation of by-products. Like the embodiments discussed above, this arrangement significantly improves the durability of the reformer unit.

While the temperature on the upstream side of the reformer unit 180 rises excessively and an increasing quantity of the liquid crude fuel is sprayed from the injection nozzle 187, a decrease in required electric power for the loading connected to the fuel cells 40 may cause methanol supplied to the reformer unit 180 to be in excess and produce the gaseous fuel over the required quantity. In the fuel cells system including the reformer unit 180 of this embodiment, the gaseous fuel exhaust discharged from the fuel cells 40 is used as the fuel for combustion in the burner 26. This accordingly does not lower the total energy efficiency in the system even in such cases.

In the reformer unit 180 of this embodiment, the mixed solution of methanol and water is sprayed from the injection nozzle 187 to cool down the upper stream portion of the reaction unit 181. Only either methanol or water may be sprayed instead. In this case, there is a branch path from either the methanol flow conduit 60 or the water flow conduit 62, instead of the first fuel supply conduit 63. Methanol or water is flown through this branch path and sprayed from a nozzle like the injection nozzle 187. This arrangement also enables the sprayed liquid to remove heat for vaporization on the upper stream side of the reaction unit 181 and thus exerts the similar effects to those of the reformer unit 180 of the eleventh embodiment discussed above.

Figure 34:
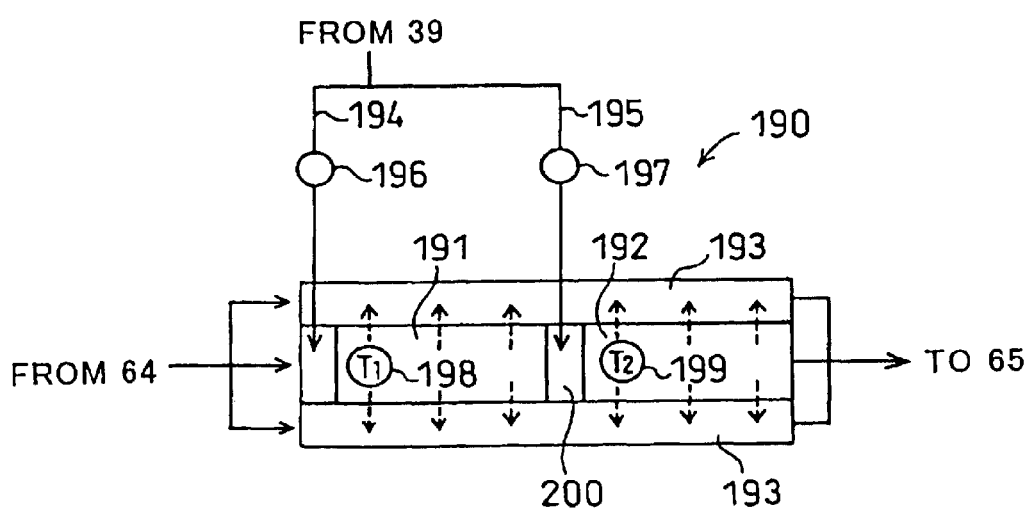
FIG. 34 schematically illustrates the structure of a reformer unit 190 in a twelfth embodiment.

The following describes a twelfth embodiment, where a reaction unit in which both the steam reforming reaction and the oxidation reaction proceed is arranged to be adjacent to a reaction unit in which only the steam reforming reaction proceeds to allow heat exchange therebetween and thereby prevent an excessive temperature rise with the heat produced by the oxidation reaction. FIG. 34 schematically illustrates the structure of a reformer unit 190 in the twelfth embodiment. The reformer unit 190 of the twelfth embodiment is included in a fuel cells system having a similar structure to that of the fuel cells system 20 shown in FIG. 1. The reformer unit 190 is formed in a substantially cylindrical shape and has three reaction units 191, 192, and 193 composed of the honeycomb structures. The reaction unit 193 is formed along the inner wall of the reformer unit 190, and the reaction units 191 and 192 are formed inside the reaction unit 193. The reaction unit 191 is located on the upper stream side and the reaction unit 192 is located on the lower stream side. There is a certain space 200 formed therebetween.

In the reformer unit 190, all the reaction units 191, 192, and 193 have the Cu—Zn catalyst carried on the surface thereof. The reaction unit 193 connects with the second fuel supply conduit 64 to receive the supply of the crude fuel gas, while not receiving the air supply. Only the steam reforming reaction accordingly proceeds in the reaction unit 193. The second fuel supply conduit 64 connects with the reaction unit 191 as well as the reaction unit 193. The crude fuel gas supplied to the reaction unit 191 passes through the inside of the reaction unit 191 and the reaction unit 192 in this sequence. The air supply conduit 39 branches off to air branch paths 194 and 195, which are respectively connected with the upper stream portions of the reaction unit 191 and the reaction unit 192. The air is flown through these air branch paths 194 and 195 and is fed to the respective reaction units. Both the steam reforming reaction and the oxidation reaction accordingly proceed in the reaction unit 191 and the reaction unit 192. Both the hydrogen rich gas produced through the steam reforming reaction and the oxidation reaction in the reaction units 191 and 192 and the hydrogen rich gas produced through the steam reforming reaction in the reaction unit 193 are output to the third fuel supply conduit 65 and led to the CO reduction unit 36.

Mass flow controllers 196 and 197 are respectively disposed in the air branch paths 194 and 195 branching off from the air supply conduit 39 to regulate the flow rates of the air supplied to the reaction units 191 and 192. These mass flow controllers 196 and 197 are connected to the control unit 50, which regulates the flow rates of the air supplied to the respective reaction units. Temperature sensors 198 and 199 are provided in the respective upper stream portions of the reaction units 191 and 192 to measure the internal temperatures of the respective reaction units. These temperature sensors 198 and 199 are connected to the control unit 50. The observed internal temperatures of the respective reaction units are input into the control unit 50. The control unit 50 regulates the flow rates of the air supplied to the respective reaction units, based on the results of the measurements input from the respective temperature sensors.

In the reaction units 191 and 192 of the reformer unit 190 of this embodiment, the amount of heat produced by the oxidation reaction proceeding therein compensates the amount of heat required for the steam reforming reaction also proceeding therein. In the circumferential reaction unit 193, on the other hand, the heat required for the steam reforming reaction proceeding therein is supplied by the heat produced by the oxidation reaction proceeding in the adjoining inner reaction units 191 and 192 (see the dotted arrows in FIG. 34). In the fuel cells system including the reformer unit 190 of this embodiment, the control unit 50 controls the driving amounts of the mass flow controller 196 and 197, which regulate the flow rates of the air supplied to the reaction units 191 and 192, based on the results of the measurements with the temperature sensors 198 and 199, and thereby regulates the flow rates of the air to keep the internal temperatures of the reaction units 191 and 192 not higher than 300° C.

In the reformer unit 190 of the twelfth embodiment thus constructed, the heat produced by the oxidation reaction proceeding in the reaction units 191 and 192 is also consumed in the adjoining reaction unit 193 where only the endothermic reaction proceeds. This arrangement effectively prevents an excessive temperature rise in the upper stream portions of the reaction units 191 and 192 where the oxidation reaction vigorously proceeds. The flow rates of the air supplied to the reaction units 191 and 192 are regulated, based on the internal temperatures of the respective reaction units. The internal temperature of each reaction unit is thus kept to be not higher than the preset level.

In the reformer unit 190 of this embodiment, the air flow is separately supplied to the reaction units 191 and 192. This arrangement enables the exothermic oxidation reaction to proceed in the reaction unit 192, which is located on the downstream side of the reaction unit 191. Unlike the prior art reformer unit, there is accordingly no significant temperature drop on the lower stream side. The whole reaction unit in the reformer unit 190 is thus kept in the highly active state of the steam reforming reaction. This enhances the rate of the steam reforming reaction.

Figure 35:
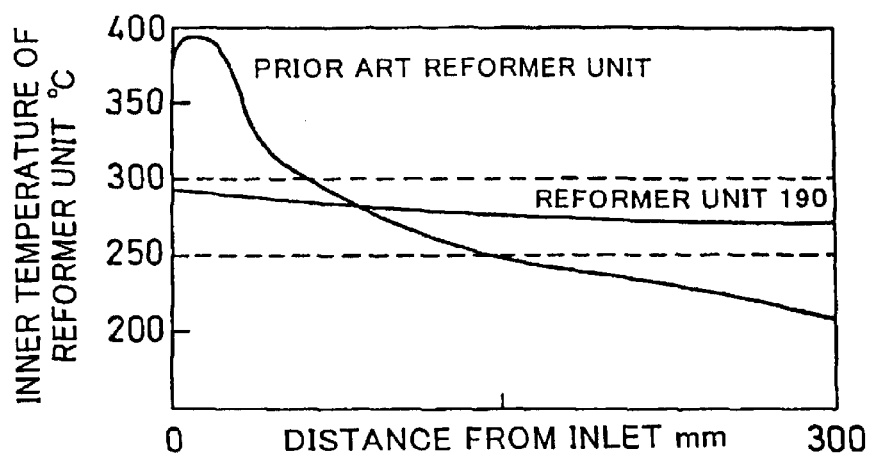
FIG. 35 is a graph showing internal temperature distributions of the reformer unit 190 and a prior art reformer unit.

FIG. 35 is a graph showing the internal temperature distributions from the upper stream side that receives the supply of the crude fuel gas to the lower stream side with regard to the reformer unit 190 described above and a prior art reformer unit including only one reaction unit where both the steam reforming reaction and the oxidation reaction proceed. Unlike the prior art reformer unit, in the reformer unit 190, there is no excessive temperature rise on the upper stream side with the heat produced by the oxidation reaction. There is also no significant temperature drop on the lower stream side. The internal temperature of the reformer unit is thus favorably kept in the temperature range of 250 to 300° C. As described above, in the reformer unit 190 of this embodiment, there is no abrupt temperature rise in the vicinity of the inlet. This advantageously prevents the potential troubles due to the temperature rise, for example, deterioration of the catalyst and formation of by-products. Like the embodiments discussed above, this arrangement significantly improves the durability of the reformer unit.

In the reformer unit 190 of the twelfth embodiment discussed above, the air flow is separately supplied to the inner reaction units 191 and 192 where both the steam reforming reaction and the oxidation reaction proceed. This effectively prevents a significant temperature drop on the lower stream side. The modified arrangement of supplying the air flow only to the upper stream side still has some effects of preventing an excessive temperature rise on the upper stream side.

Figure 36:
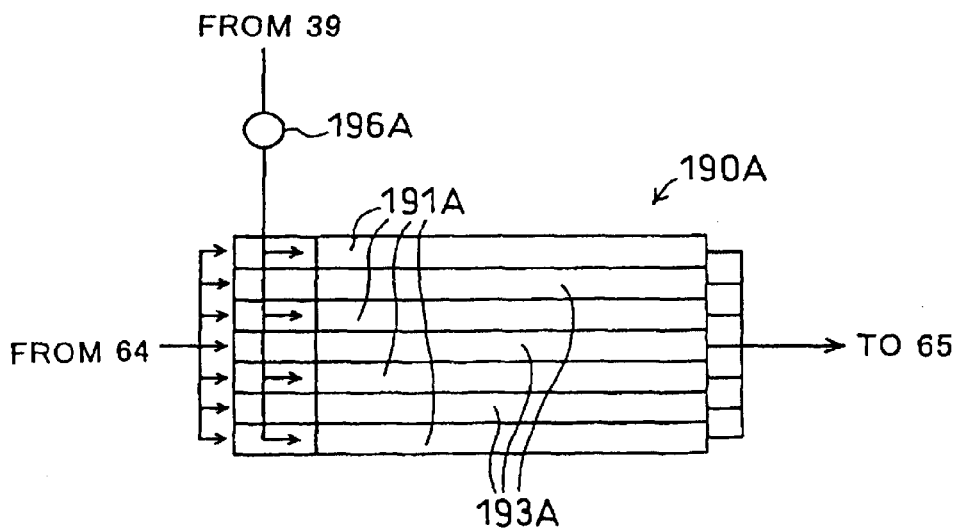
FIG. 36 schematically illustrates the structure of a reformer unit 190A in one modified example of the twelfth embodiment.

The reformer unit 190 of the twelfth embodiment has the dual tubular structure including the inner reaction units where both the steam reforming reaction and the oxidation reaction proceed and the circumferential reaction unit where only the steam reforming reaction proceeds. The following describes a stack structure where these two different reaction units are alternately laid one upon another as one modified example of the twelfth embodiment. FIG. 36 schematically illustrates the structure of a reformer unit 190A in the modified example of the twelfth embodiment. Like the reformer unit 190, the reformer unit 190A is included in a fuel cells system having a similar structure to that of the fuel cells system 20 shown in FIG. 1. In the following description, the constituents identical with those of the reformer unit 190 are expressed by the like numerals with a suffix A.

The reformer unit 190A includes a plurality of flat reaction units 191A and 193A, which are alternately laid one upon another. These reaction units 191A and 193A are composed on the honeycomb structures with the Cu—Zn catalyst carried on the surface thereof. The supply of the crude fuel gas flown through the second fuel supply conduit 64 is fed to each reaction unit. The air supply conduit 39 branches off to connect with the respective upper stream portions of the reaction units 191A and supply the air flow to the respective reaction units 191A. The flow rate of the air supplied to the plurality of reaction units 191A is regulated by a mass flow controller 196A disposed in the air supply conduit 39. In the same manner as discussed in the twelfth embodiment, the regulation is based on the results of the measurements with temperature sensors (not shown) located in the upper stream portions of the respective reaction units 191A.

In the reformer unit 190A of the modified example of the twelfth embodiment thus constructed, like the reformer unit 190 of the twelfth embodiment, the heat evolved through the oxidation reaction is consumed by the steam reforming reaction proceeding in the adjoining reaction unit. This arrangement effectively prevents an excessive temperature rise on the upstream side where the oxidation reaction vigorously proceeds. Like the reformer unit 190, this prevents the potential troubles, for example, deterioration of the catalyst and formation of by-products, and significantly improves the durability of the reformer unit.

Figure 37A:
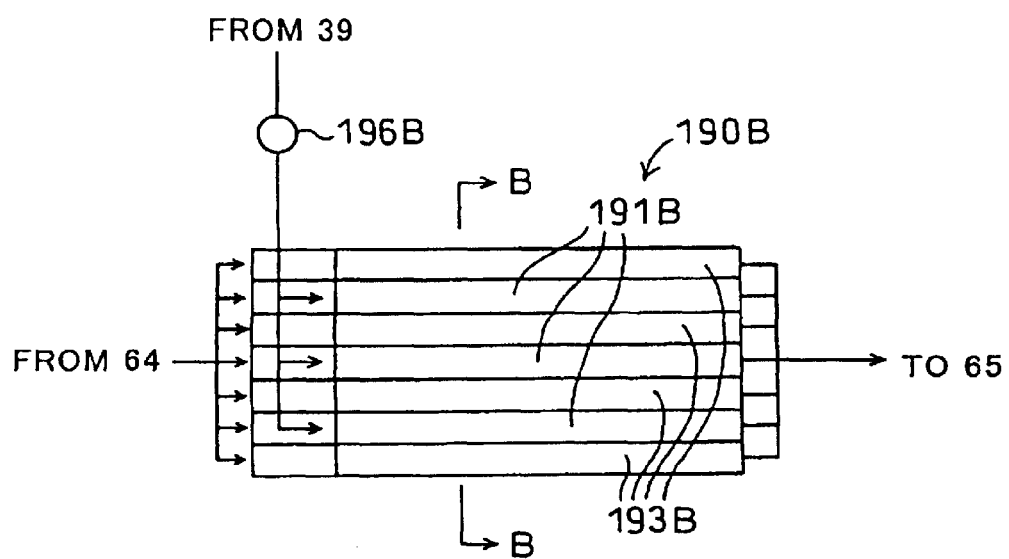
FIG. 37 schematically illustrates the structure of a reformer unit 190B in another modified example of the twelfth embodiment.
Figure 37B:
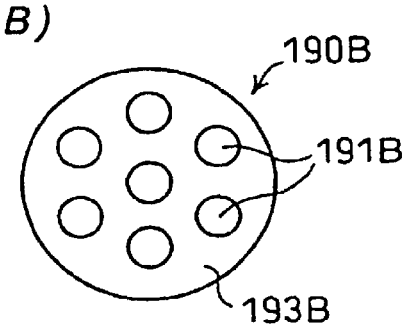
Figure 38:
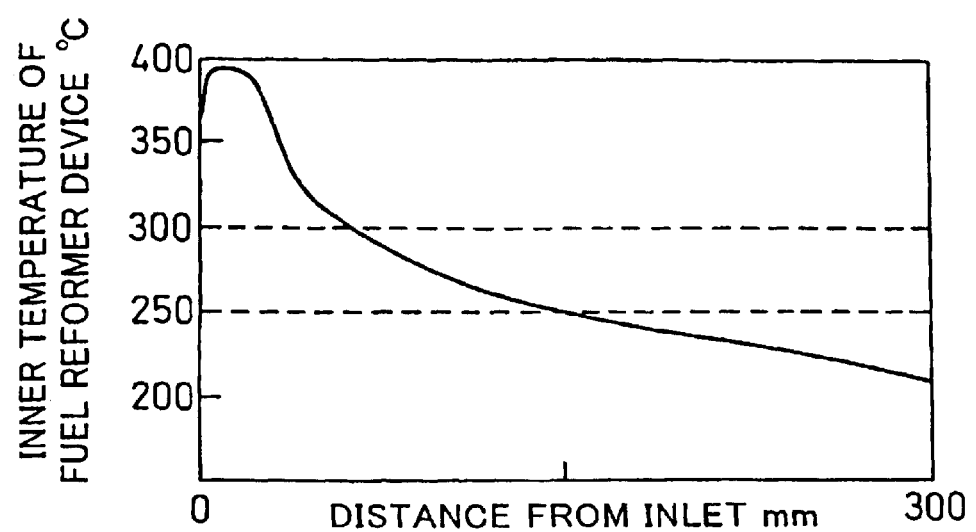
FIG. 38 is a graph showing a temperature distribution inside of a prior art fuel reformer device.

The following describes a reformer unit 190B having a multi-tubular structure as a second modified example of the twelfth embodiment. FIG. 37 is a sectional view schematically illustrating the structure of the reformer unit 190B in the second modified example of the twelfth embodiment. FIG. 37(A) is a vertical sectional view of the reformer unit 190B, and FIG. 37(B) is a cross sectional view taken on the line B–B in FIG. 37(A). Like the reformer unit 190, the reformer unit 190B is included in a fuel cells system having a similar structure to that of the fuel cells system 20 shown in FIG. 1. In the following description, the constituents identical with those of the reformer unit 190 are expressed by the like numerals with a suffix B.

The reformer unit 190B is formed in a substantially cylindrical shape and includes reaction units 191B and a reaction unit 193B. Each reaction unit 191B has a substantially cylindrical shape of a small diameter in bottom face. Seven reaction units 191B are included in the reformer unit 190B. The residual space in the reformer unit 190B other than that occupied by the reaction units 191B is occupied by the reaction unit 193B. The reaction units 191B and 193B are composed of the honeycomb structures with the Cu—Zn catalyst carried on the surface thereof. The supply of the crude fuel gas flown through the second fuel supply conduit 64 is fed to each reaction unit. The air supply conduit 39 branches off to connect with the respective upper stream portions of the reaction units 191B and supply the air flow to the respective reaction units 191B. The flow rate of the air supplied to the plurality of reaction units 191B is regulated by a mass flow controller 196B disposed in the air supply conduit 39. In the same manner as discussed in the twelfth embodiment, the regulation is based on the results of the measurements with temperature sensors (not shown) located in the upper stream portions of the respective reaction units 191B.

In the reformer unit 190B of the modified example of the twelfth embodiment thus constructed, like the reformer unit 190 of the twelfth embodiment, the heat evolved through the oxidation reaction is consumed by the steam reforming reaction proceeding in the adjoining reaction unit. This arrangement effectively prevents an excessive temperature rise on the upstream side where the oxidation reaction vigorously proceeds. Like the reformer unit 190, this prevents the potential troubles, for example, deterioration of the catalyst and formation of by-products, and significantly improves the durability of the reformer unit.

In the reformer units 190, 190A, and 190B described above, the oxidation reaction proceeds only in the selected reaction units. While a fixed amount of heat is required for the steam reforming reaction proceeding in the reformer unit, the reduction in area of the vigorous oxidation reaction causes the quantity of the catalyst to be insufficient relative to the quantity of the oxygen supply. This reduces the rate of the oxidation reaction proceeding in the area that receives the supply of oxygen. This arrangement extends the area of the vigorous oxidation reaction to the lower stream portion and effectively prevents a significant temperature drop in the lower stream portion of the reformer unit.

In the reformer units 190A and 190B of the modified examples of the twelfth embodiment discussed above, like the reformer unit 190, the air flow may be supplied to not only the upper stream area but an intermediate area in the reformer unit. This arrangement more effectively prevents a significant temperature drop in the lower stream portion of the reformer unit. The reformer units 190, 190A, and 190B have the reaction units of the honeycomb structures. In a modified structure, the reformer unit may be filled with pellets with the catalyst carried thereon. In this modified structure, the arrangement of the reaction unit where both the steam reforming reaction and the oxidation reaction proceed adjacent to the reaction unit where only the steam reforming reaction proceeds effectively prevents an excessive temperature rise on the upper stream portion of the reaction unit.

In all the first through the twelfth embodiments discussed above, the respective reformer units use the Cu—Zn catalyst. This single catalyst accelerates both the steam reforming reaction expressed by Equation (4) and the oxidation reaction expressed by Equation (5). Any catalyst that accelerates both the steam reforming reaction and the oxidation reaction (for example, Pd—Zn catalyst) may be used instead of the Cu—Zn catalyst. The presence of such a catalyst in any of the reformer units of the embodiments ensures the similar effect of preventing an excessive temperature rise in a partial area of the reformer unit.

In the above embodiments, the single catalyst is used to accelerate both the steam reforming reaction and the oxidation reaction. In any of the above embodiments, however, different catalysts may be used to respectively accelerate the steam reforming reaction and the oxidation reaction. Another catalyst for accelerating the oxidation reaction may be used in addition to the Cu—Zn catalyst. In the case of using a plurality of different catalysts, as long as these catalysts are mixed well in the reformer unit to assure the progress of both the oxidation reaction expressed by Equation (5) and the steam reforming reaction expressed by Equation (4) at a sufficient efficiency in a specific are receiving the supply of oxygen, the application of such catalysts in the structures of the respective embodiments ensures the similar effect of preventing an excessive temperature rise in a partial area of the reformer unit. Available examples for the another catalyst to accelerate the oxidation reaction include metals, such as palladium, platinum, nickel, rhodium, chromium, tungsten, rhenium, gold, silver, and iron, and alloys of such metals and other metals.

In the embodiments discussed above, methanol is used as the crude fuel. Another hydrocarbon may alternatively be used as the crude fuel that undergoes the steam reforming reaction and the oxidation reaction. In the case where the crude fuel other than methanol is selected, the reformer unit includes the catalyst suitable for the selected crude fuel in any of the structures of the above embodiments. This arrangement also ensures the similar effect of preventing an excessive temperature rise in a partial area of the reformer unit.

The Cu—Zn catalyst included in any of the reformer units of the first through the twelfth embodiments discussed above is a known catalyst for accelerating the steam reforming reaction of methanol. As described previously, the Cu—Zn catalyst deteriorates at high temperatures over 300° C. The Cu—Zn catalyst is accordingly not usable as the catalyst for accelerating the steam reforming reaction when a hydrocarbon having a high reaction temperature of the steam reforming reaction is applied for the crude fuel. The Cu—Zn catalyst, however, favorably works as the catalyst of accelerating the steam reforming reaction when methanol having a lower reaction temperature of the steam reforming reaction than the other hydrocarbons is applied for the crude fuel. The technique of utilizing the Cu—Zn catalyst as the oxidation catalyst is generally not known to those skilled in the art. The Cu—Zn catalyst is readily oxidized (copper is oxidized to deteriorate). In the presence of oxygen, the Cu—Zn catalyst is immediately oxidized to lose its catalytic activity, and is thus not generally applicable for the oxidation catalyst. In the case of using the Cu—Zn catalyst in the presence of methanol, however, methanol is oxidized prior to copper because of the difference in free energy for oxidation. The Cu—Zn catalyst itself is accordingly not oxidized but effectively functions to accelerate both the steam reforming reaction and the oxidation reaction.

The use of the single Cu—Zn catalyst accelerates both the steam reforming reaction and the oxidation reaction and advantageously simplifies the structure of the reformer unit. The use of the Cu—Zn catalyst for accelerating the oxidation reaction of methanol ensures the additional effect of lowering the concentration of carbon monoxide included in the hydrogen rich gaseous fuel produced by the reformer unit. The following describes carbon monoxide produced in the reformer unit. The Cu—Zn catalyst has the activity of slightly promoting the reaction of Equation (6) shown below in the presence of carbon dioxide and hydrogen:

$$CO_2 + H2 \rightarrow CO + H_2O \tag{6}$$

When the Cu—Zn catalyst accelerates the steam reforming reaction of methanol alone or simultaneously with the oxidation reaction of methanol, hydrogen and carbon dioxide are produced as discussed previously. With an increase in quantities of hydrogen and carbon dioxide thus produced, the reaction of Equation (6) slightly proceeds to produce carbon monoxide. The gaseous fuel produced by the reformer unit accordingly contains a certain amount of carbon monoxide.

Using the Cu—Zn catalyst to reform methanol accompanies production of a certain amount of carbon monoxide. As discussed in the above embodiments, in the case where the Cu—Zn catalyst is used to accelerate the oxidation reaction of methanol simultaneously with the steam reforming reaction, substantially no carbon monoxide is produced through this oxidation reaction. This effectively prevents an increase in concentration of carbon monoxide included in the gaseous fuel. The oxidation reaction of methanol accelerated in the presence of the Cu—Zn catalyst is expressed by Equation (5) given previously. This reaction mainly consists of the reactions expressed by Equations (7) and (8) given below. The reaction of Equation (5) thus proceeds as a whole:

$$CH_3OH + (\tfrac{1}{2})O_2 \rightarrow HCHO + H_2O \tag{7}$$

$$HCHO + H_2O \rightarrow CO_2 + 2H_2 \tag{8}$$

As shown by Equations (7) and (8), the oxidation reaction of methanol accelerated in the presence of the Cu—Zn catalyst is mainly via a reaction path that does not produce carbon monoxide. The oxidation reaction accelerated in the presence of the conventionally known oxidation catalyst, for example, the platinum catalyst, on the other hand, mainly consists of the reactions expressed by Equations (9) and (10) given below. The reaction of Equation (5) thus proceeds as a whole. In this case, carbon monoxide is produced in the middle of the reaction. When the oxidation reaction of methanol is accelerated by the conventionally known oxidation catalyst, for example, the platinum catalyst, part of carbon monoxide thus produced remains in the resulting gaseous fuel produced in the reformer unit. This raises the concentration of carbon monoxide included in the gaseous fuel.

$$CH_3OH \rightarrow CO + 2H2 \tag{9}$$

$$CO + (\tfrac{1}{2})O_2 \rightarrow CO_2 \tag{10}$$

When the Cu—Zn catalyst is used to accelerate both the steam reforming reaction and the oxidation reaction of methanol as discussed in the above embodiments, the oxidation reaction is via the reaction path that does not produce carbon monoxide. Compared with the prior art technique that uses a known oxidation catalyst, such as platinum, to accelerate the oxidation reaction of methanol and the Cu—Zn catalyst to accelerate the steam reforming reaction, this technique significantly lowers the concentration of carbon monoxide included in the resulting gaseous fuel. In the prior art technique that utilizes both the Cu—Zn catalyst and a known oxidation catalyst like platinum to respectively accelerate the steam reforming reaction of methanol and the oxidation reaction of methanol, carbon monoxide of not lower than 1.5 to 2% generally remains in the resulting gaseous fuel. In the technique of the present invention that utilizes only the Cu—Zn catalyst to accelerate both the steam reforming reaction and the oxidation reaction of methanol, on the other hand, the concentration of carbon monoxide remaining in the resulting gaseous fuel is as low as 0.5%.

Carbon monoxide remaining in the gaseous fuel supplied to the fuel cells is adsorbed by the platinum-containing catalytic layer formed on the electrolyte membrane to interfere with the progress of the electrochemical reactions. In the fuel cells systems of the embodiments discussed above, the CO reduction unit is arranged after the reformer unit to reduce the concentration of carbon monoxide included in the gaseous fuel supplied to the fuel cells. The application of the Cu—Zn catalyst to accelerate both the oxidation reaction and the steam reforming reaction of methanol and produce the gaseous fuel having a low concentration of carbon monoxide in the reformer unit advantageously reduces the load required for the CO reduction unit (that is, the amount of carbon monoxide to be oxidized in the CO reduction unit). This arrangement enables the gaseous fuel having a sufficiently low concentration of carbon monoxide to be supplied to the fuel cells even with the small-sized CO reduction unit. The CO reduction unit may be even omitted in the case where the gaseous fuel produced in the reformer unit has a sufficiently low concentration of carbon monoxide. The arrangement of using the Cu—Zn catalyst for accelerating both the steam reforming reaction and the oxidation reaction of methanol lowers the concentration of carbon monoxide included in the gaseous fuel produced in the reformer unit and thereby ensures the size reduction of the whole fuel cells system including this reformer unit.

The Cu—Zn catalyst used in the above embodiments is prepared from copper oxide (CuO) and zinc oxide (ZnO). Another substance may be added in the process of coprecipitating these materials. For example, 2 to 5% of alumina may be added in the process of coprecipitating copper oxide and zinc oxide to prepare the Cu—Zn catalyst. This composition enhances the heat resistance of the Cu—Zn catalyst and improves the dispersion of copper and zinc oxide of the catalyst.

In the above description, the Cu—Zn catalyst, which is prepared from copper oxide and zinc oxide, is used as the catalyst for accelerating both the steam reforming reaction and the oxidation reaction of methanol. A diversity of copper-containing catalysts other than the Cu—Zn catalyst may alternatively be used to accelerate the steam reforming reaction and the oxidation reaction of methanol and produce a gaseous fuel having a low concentration of carbon monoxide. For example, the catalyst for accelerating both the reactions may be obtained from a combination of copper oxide and chromium oxide ($Cr_2O_3$), a combination of a copper oxide and silicon oxide ($SiO_2$), or a combination of copper oxide and an oxide of another metal. Such copper-containing catalysts may be manufactured by any methods suitable for the materials, for example, the impregnation method, the kneading, method, and the ion exchange method, as well as the coprecipitation method described previously.

The present invention is not restricted to the above embodiments or their modifications, but there may be many other modifications, changes, and alterations without departing from the scope or spirit of the main characteristics of the present invention.

INDUSTRIAL APPLICABILITY

As described above, the fuel reformer device of the present invention is applied in fields of manufacture and sale of fuel cells as well as in fields of manufacture and sale of electric vehicles with such fuel cells mounted thereon.

What is claimed is:

1. A fuel reformer device in which a steam reforming reaction, which is endothermic and produces hydrogen from a crude fuel and steam, and an oxidation reaction, which is exothermic and oxidizes the crude fuel, proceed and heat generated by the oxidation reaction is utilized for a progress of the steam reforming reaction, said fuel reformer device comprising:
   a catalytic section that includes a catalyst for accelerating the steam reforming reaction and the oxidation reaction;
   a crude fuel gas supply unit that flows a supply of a crude fuel gas containing the crude fuel, steam, and oxygen into said catalytic section;
   a gaseous fuel output unit that causes a hydrogen rich gaseous fuel, which is produced through the steam reforming reaction and the oxidation reaction proceeding in said catalytic section, to be output from said catalytic section; and
   a gas flow velocity regulation unit that regulates a flow velocity of the crude fuel gas to be higher in an area on a side receiving the supply of the crude fuel gas than in an area on a side outputting the gaseous fuel in said catalytic section, so as to enable the heat generated by the oxidation reaction proceeding in the area on the side receiving the supply of the crude fuel gas to be sufficiently transmitted to the area on the side outputting the gaseous fuel.

2. A fuel reformer device in accordance with claim 1, wherein said gas flow velocity regulation unit makes a total sectional area of a flow path, through which the crude fuel gas flows, smaller on the side receiving the supply of the crude fuel gas than on the side outputting the gaseous fuel in said catalytic section.

3. A fuel reformer device in which a steam reforming reaction, which is endothermic and produces hydrogen from a crude fuel and steam, and an oxidation reaction, which is exothermic and oxidizes the crude fuel, proceed and heat generated by the oxidation reaction is utilized for a progress of the steam reforming reaction, said fuel reformer device comprising:
   a catalytic section that includes a catalyst for accelerating the steam reforming reaction and the oxidation reaction;
   a crude fuel gas supply unit that flows a supply of a crude fuel gas containing the crude fuel, steam, and oxygen into said catalytic section;
   a gaseous fuel output unit that causes a hydrogen rich gaseous fuel, which is produced through the steam reforming reaction and the oxidation reaction proceeding in said catalytic section, to be output from said catalytic section; and
   a gas flow direction inversion unit that changes a site receiving the supply of the crude fuel gas by means of said crude fuel gas supply unit and a site outputting the gaseous fuel by means of said gaseous fuel output unit with each other in said catalytic section, so as to invert a gas flow in said catalytic section.

4. A fuel reformer device in accordance with claim 3, wherein said catalytic section comprises an end temperature measurement unit that measures a temperature at a preset position in the site receiving the supply of the crude fuel gas by means of said crude fuel gas supply unit in said catalytic section, and
   said gas flow direction inversion unit changes the site receiving the supply of the crude fuel gas by means of said crude fuel gas supply unit and the site outputting the gaseous fuel by means of said gaseous fuel output unit with each other, based on the observed temperature by said end temperature measurement unit.

5. A fuel reformer device in accordance with claim 3, wherein the crude fuel is methanol, and
   the catalyst for accelerating the steam reforming reaction and the oxidation reaction is a single copper-containing catalyst.

6. A fuel reformer device in accordance with claim 4, wherein the crude fuel is methanol, and
   the catalyst for accelerating the steam reforming reaction and the oxidation reaction is a single copper-containing catalyst.

7. A fuel reformer device in which a steam reforming reaction, which is endothermic and produces hydrogen from a crude fuel and steam, and an oxidation reaction, which is exothermic and oxidizes the crude fuel, proceed and heat generated by the oxidation reaction is utilized for a progress of the steam reforming reaction, said fuel reformer device comprising:
   a catalytic section which particles with a catalyst for accelerating the steam reforming reaction and the oxidation reaction are sealed in;
   a crude fuel gas supply-unit that flows a supply of a crude fuel gas containing the crude fuel, steam, and oxygen into said catalytic section;
   a gaseous fuel output unit that causes a hydrogen rich gaseous fuel, which is produced through the steam reforming reaction and the oxidation reaction proceeding in said catalytic section, to be output from said catalytic section; and a catalyst stirrer unit that stirs the particles with the catalyst in said catalytic section.

8. A fuel reformer device in accordance with claim 7, wherein said catalyst stirrer unit is disposed in said crude fuel gas supply unit and injects a gas containing at least one of the crude fuel, steam, and oxygen into said catalytic section, so as to stir the particles with the catalyst in said catalytic section.

9. A fuel reformer device in accordance with claim 7, wherein the crude fuel is methanol, and the catalyst for accelerating the steam reforming reaction and the oxidation reaction is a single copper-containing catalyst.

10. A fuel reformer device in accordance with claim 8, wherein the crude fuel is methanol, and the catalyst for accelerating the, steam reforming reaction and the oxidation reaction is a single copper-containing catalyst.

11. A fuel reformer device in which a steam reforming reaction, which is endothermic and produces hydrogen from a crude fuel and steam, and an oxidation reaction, which is exothermic and oxidizes the crude fuel, proceed and heat generated by the oxidation reaction is utilized for a progress of the steam reforming reaction, said fuel reformer device comprising:

a catalytic section that includes a catalyst for accelerating the steam reforming reaction and the oxidation reaction;

a crude fuel gas supply unit that flows a supply of a crude fuel gas containing the crude fuel and steam into said catalytic section;

an oxidizing gas supply unit that flows a supply of an oxidizing gas containing oxygen into said catalytic section;

a gaseous fuel output unit that causes a hydrogen rich gaseous fuel, which is produced through the steam reforming reaction and the oxidation reaction proceeding in said catalytic section, to be output from said catalytic section; and a heat homogenization unit that makes a feeding side receiving the supply of the crude fuel gas and the supply of the oxidizing gas adjoin to an output side outputting the gaseous fuel in said catalytic section, so as to enable heat exchange between the feeding side and the output side, wherein said catalytic section comprises a turning area in a flow conduit of the crude fuel gas formed inside thereof, and an inlet and an outlet of said flow conduit are arranged to be adjacent to each other.

12. A fuel reformer device in accordance with claim 11, wherein the crude fuel is methanol, and the catalyst for accelerating the steam reforming reaction and the oxidation reaction is a single copper-containing catalyst.

13. A fuel reformer device in which a steam reforming reaction, which is endothermic and produces hydrogen from a crude fuel and steam, and an oxidation reaction, which is exothermic and oxidizes the crude fuel, proceed and heat generated by the oxidation reaction is utilized for a progress of the steam reforming reaction, said fuel reformer device comprising:

a catalytic section that includes a catalyst for accelerating the steam reforming reaction and the oxidation reaction;

a crude fuel gas supply unit that flows a supply of a crude fuel gas containing the crude fuel and steam into said catalytic section;

an oxidizing gas supply unit that flows a supply of an oxidizing gas containing oxygen into said catalytic section;

a gaseous fuel output unit that causes a hydrogen rich gaseous fuel, which is produced through the steam reforming reaction and the oxidation reaction proceeding in said catalytic section, to be output from said catalytic section; and a heating unit that heats a part other than an area on a side receiving the supply of the oxidizing gas by means of a hot gas discharged from a predetermined member, which is a constituent of a system including said fuel reformer device.

14. A fuel reformer device in accordance with claim 13, wherein the crude fuel is methanol, and the catalyst for accelerating the steam reforming reaction and the oxidation reaction is a single copper-containing catalyst.

15. A fuel reformer device in which a steam reforming reaction, which is endothermic and produces hydrogen from a crude fuel and steam, and an oxidation reaction, which is exothermic and oxidizes the crude fuel, proceed and heat generated by the oxidation reaction is utilized for a progress of the steam reforming reaction, said fuel reformer device comprising:

a catalytic section that includes a catalyst for accelerating the steam reforming reaction and the oxidation reaction;

a crude fuel gas supply unit that flows a supply of a crude fuel gas containing the crude fuel and steam into said catalytic section;

an oxidizing gas supply unit that flows a supply of an oxidizing gas containing oxygen into said catalytic section;

a gaseous fuel output unit that causes a hydrogen rich gaseous fuel, which is produced through the steam reforming reaction and the oxidation reaction proceeding in said catalytic section, to be output from said catalytic section; and an end cooling unit that sprays a liquid containing at least one of the crude fuel and water into an area on a side receiving the supply of the crude fuel gas and the supply of the oxidizing gas.

16. A fuel reformer device in accordance with claim 15, wherein the crude fuel is methanol, and the catalyst for accelerating the steam reforming reaction and the oxidation reaction is a single copper-containing catalyst.

17. A fuel reformer device in which a steam reforming reaction, which is endothermic and produces hydrogen from a crude fuel and steam, and an oxidation reaction, which is exothermic and oxidizes the crude fuel, proceed and heat generated by the oxidation reaction is utilized for a progress of the steam reforming reaction, said fuel reformer device comprising:

a catalytic section that comprises a first reaction unit including a catalyst for accelerating the steam reforming reaction and the oxidation reaction and a second reaction unit including a catalyst for accelerating the steam reforming reaction;

a crude fuel gas supply unit that flows a supply of a crude fuel gas containing the crude fuel and steam into said catalytic section;

an oxidizing gas supply unit that flows a supply of an oxidizing gas containing oxygen into said first reaction unit; and a gaseous fuel output unit that causes a hydrogen rich gaseous fuel, which is produced through the steam reforming reaction and the oxidation reaction proceeding in said catalytic section, to be output from said catalytic section, wherein said first reaction unit and said second reaction unit are arranged to be adjacent to each other in said catalytic section such that there is an overlapped area at least seen from a direction perpendicular to the flow of the gaseous fuel, and heat exchange is performed between said first reaction unit and said second reaction unit.

18. A fuel reformer device in accordance with claim 17, wherein the crude fuel is methanol, and the catalyst included in said first reaction unit is a single copper-containing catalyst.

* * * * *